US012004243B2

United States Patent
Pan

(10) Patent No.: US 12,004,243 B2
(45) Date of Patent: Jun. 4, 2024

(54) METHOD AND APPARATUS FOR SUPPORTING UE-TO-NETWORK RELAY COMMUNICATION IN A WIRELESS COMMUNICATION SYSTEM

(71) Applicant: ASUSTek Computer Inc., Taipei (TW)

(72) Inventor: Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 338 days.

(21) Appl. No.: 17/551,584

(22) Filed: Dec. 15, 2021

(65) Prior Publication Data

US 2022/0210847 A1    Jun. 30, 2022

Related U.S. Application Data

(60) Provisional application No. 63/127,884, filed on Dec. 18, 2020, provisional application No. 63/127,904, filed on Dec. 18, 2020.

(51) Int. Cl.
*H04W 76/12*    (2018.01)
*H04W 76/25*    (2018.01)
*H04W 88/04*    (2009.01)

(52) U.S. Cl.
CPC ........... *H04W 76/12* (2018.02); *H04W 76/25* (2018.02); *H04W 88/04* (2013.01)

(58) Field of Classification Search
CPC ..... H04W 76/12; H04W 76/25; H04W 88/04; H04W 76/27; H04W 76/19; H04W 92/18; H04W 40/22; H04W 80/02; H04L 5/0053
See application file for complete search history.

(56) References Cited

U.S. PATENT DOCUMENTS

| 2020/0091991 A1* | 3/2020 | Fujishiro | H04W 68/02 |
| 2023/0284299 A1* | 9/2023 | Paladugu | H04W 76/14 370/329 |

OTHER PUBLICATIONS

Notice of Submission of Opinion from Korean Intellectual Property Office in corresponding Korean Application No. 10-2021-0179724, dated Jul. 19, 2023.
3GPP TS 38.331 V16.2.0 (Sep. 2020), 3rd Generation Partnership Project; Technical Specification Group Radio Access Network; NR; Radio Resource Control (RRC) protocol specification (Release 16), 650 Route des Lucioles-Sophia Antipolis Valbonne, France. 925 pages. Submitted 19 pages due to size.
Oppo, "Left issues on CP procedure for sidelink relay", Document for Discussion, Decision, Agenda Item: 8.7.3, R2-2008777, 3GPP TSG-RAN WG2 #112-e, E-meeting, Nov. 2020.

* cited by examiner

*Primary Examiner* — Fred A Casca
(74) *Attorney, Agent, or Firm* — Cooper Legal Group LLC

(57) ABSTRACT

A method and device are disclosed for a relay User Equipment (UE). The relay UE connects with a remote UE or serving the remote UE for a relay communication with a network node. The relay UE receives a message on a PC5 RLC channel from the remote UE, wherein the PC5 RLC channel is associated with a Uu SRB1 for the remote UE or a Uu SRB on which the remote UE transmitting RRC signalling in RRC_CONNECTED. The relay UE initiates or performs a RRC connection resume procedure with the network node in response to reception of the message on the PC5 RLC channel or when data is available for transmission from the relay UE to the network node on a Uu RLC channel associated with the Uu SRB1 for the remote UE or the Uu SRB on which the remote UE transmitting RRC signalling in RRC_CONNECTED.

20 Claims, 23 Drawing Sheets

METHOD AND APPARATUS FOR SUPPORTING UE-TO-NETWORK RELAY COMMUNICATION IN A WIRELESS COMMUNICATION SYSTEM

CROSS-REFERENCE TO RELATED APPLICATIONS

The present Application claims the benefit of U.S. Provisional Patent Application Ser. Nos. 63/127,884 and 63/127,904 filed on Dec. 18, 2020, the entire disclosures of which are incorporated herein in its entirety by reference.

FIELD

This disclosure generally relates to wireless communication networks, and more particularly, to a method and apparatus for supporting UE-to-network relay communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for a relay User Equipment (UE). In one embodiment, the relay UE connects with a remote UE or serving the remote UE for a relay communication with a network node. Furthermore, the relay UE receives a message on a PC5 Radio Link Control (RLC) channel from the remote UE, wherein the PC5 RLC channel is associated with a Uu SRB1 for the remote UE or a Uu Signalling Radio Bearer (SRB) on which the remote UE transmitting Radio Resource Control (RRC) signalling in RRC_CONNECTED. Also, the relay UE initiates or performs a RRC connection resume procedure with the network node in response to reception of the message on the PC5 RLC channel or when data is available for transmission from the relay UE to the network node on a Uu RLC channel associated with the Uu SRB1 for the remote UE or the Uu SRB on which the remote UE transmitting RRC signalling in RRC_CONNECTED.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 38.331 V16.2.0, "NR; Radio Resource Control (RRC) protocol specification (Release 16)"; TS 38.300 V16.1.0, "NR; NR and NG-RAN Overall Description; Stage 2 (Release 16)"; TR 23.752 V0.5.1, "Study on system enhancement for Proximity based Services (ProSe) in the 5G System (5GS) (Release 17)"; TS 38.321 V16.2.1, "NR Medium Access Control (MAC) protocol specification (Release 16)"; TR 38.836 V0.2.0, "Study on NR sidelink relay; (Release 17)"; and TS 23.287 V16.4.0, "Architecture enhancements for 5G System (5GS) to support Vehicle-to-Everything (V2X) services (Release 16)". The standards and documents listed above are hereby expressly incorporated by reference in their entirety.

Figure 1:
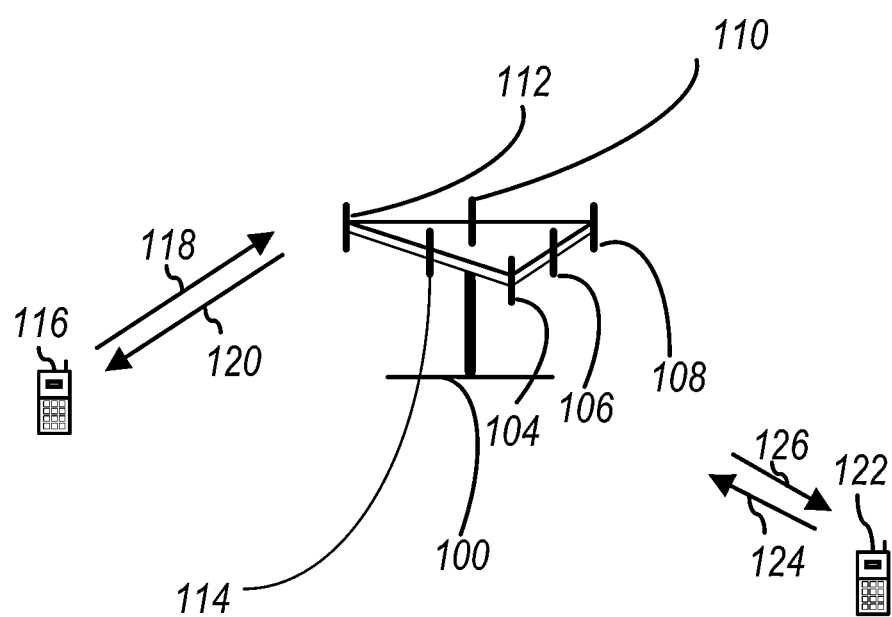
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
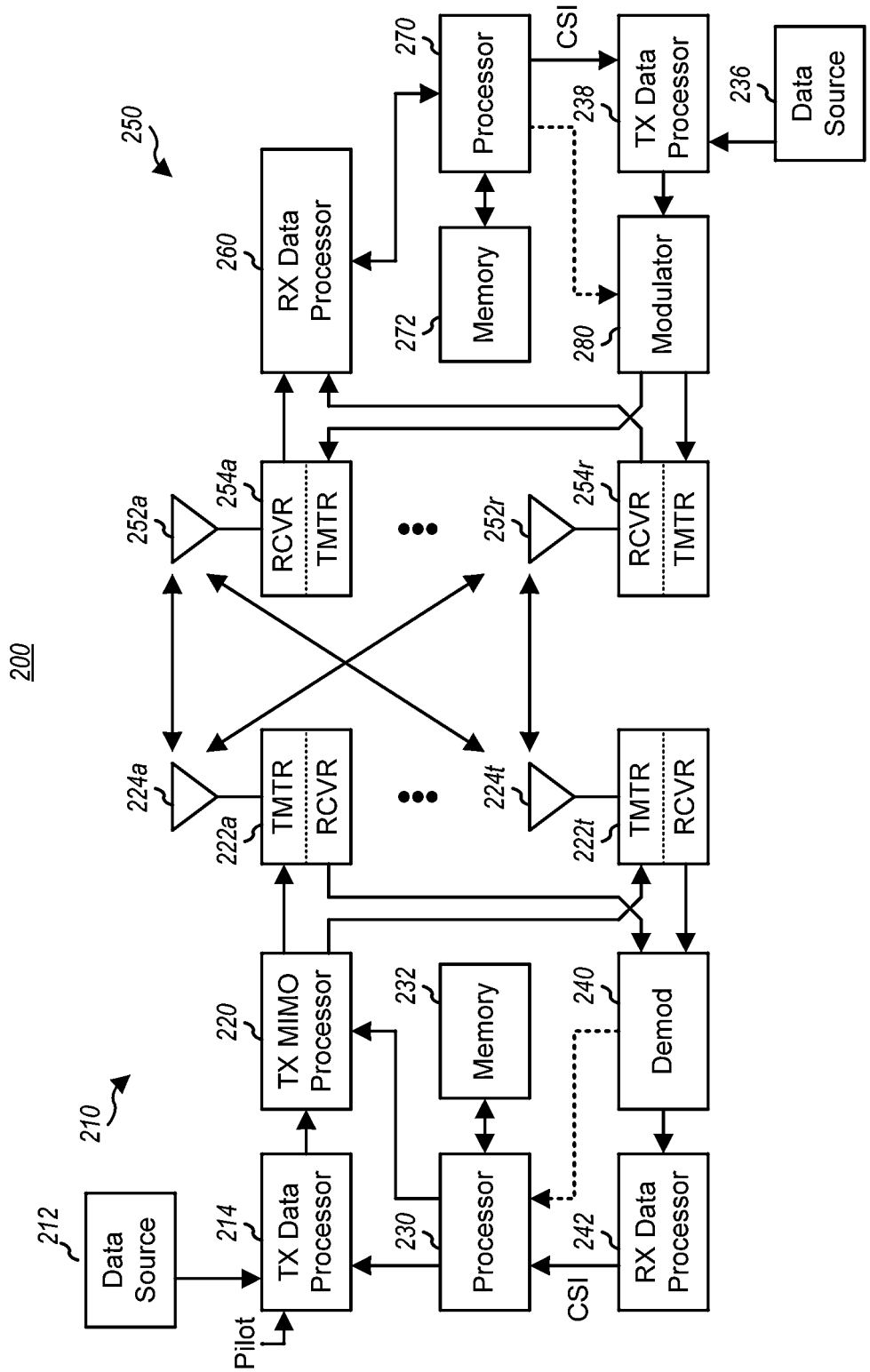
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250.

Processor 230 then determines which pre-coding matrix to use for determining the beamforming weights then processes the extracted message.

Figure 3:
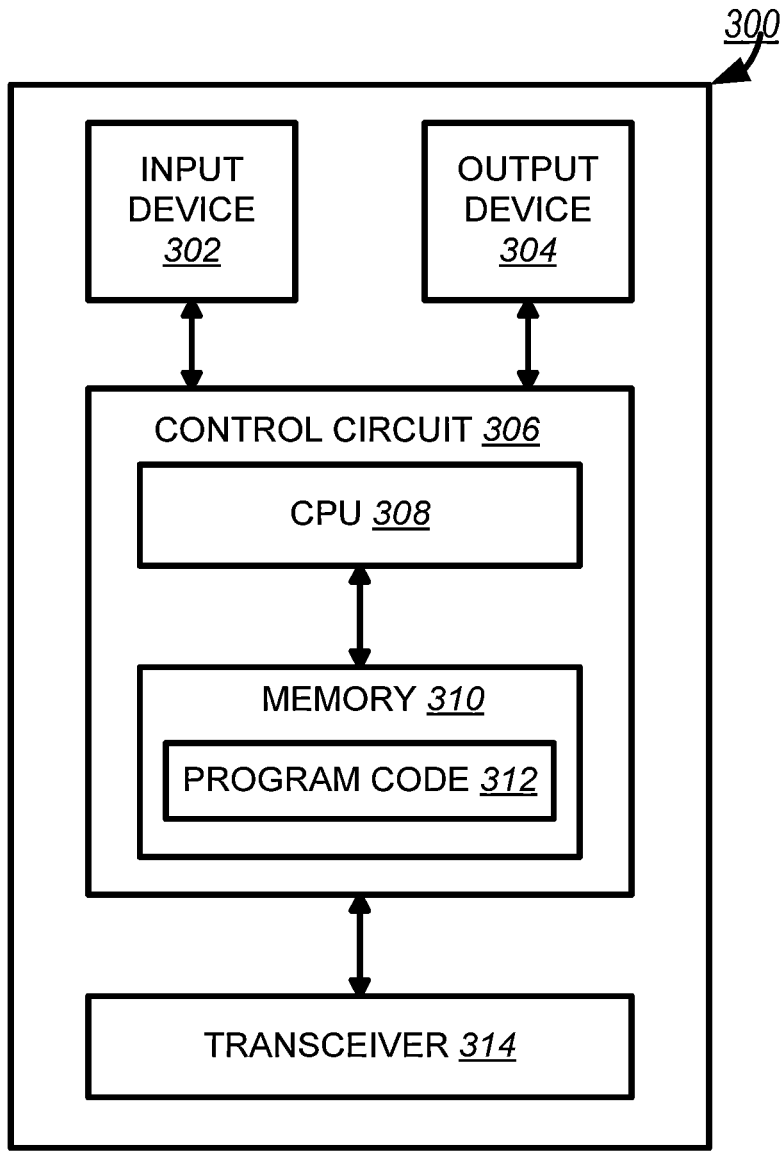
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
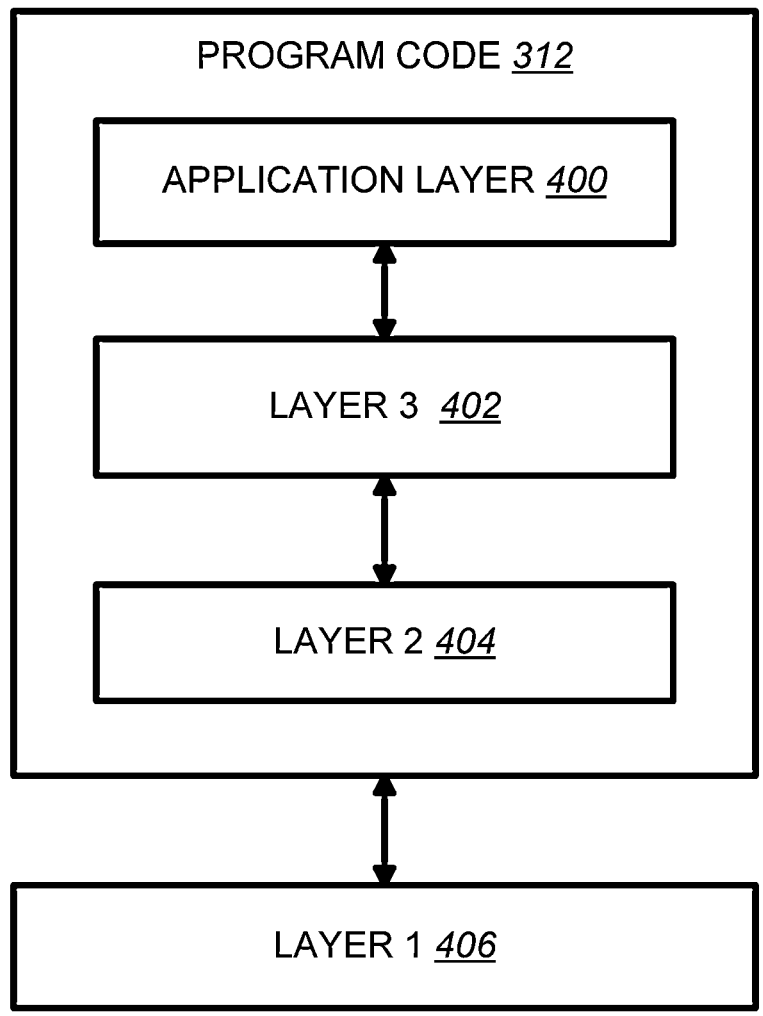
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Figure 5:
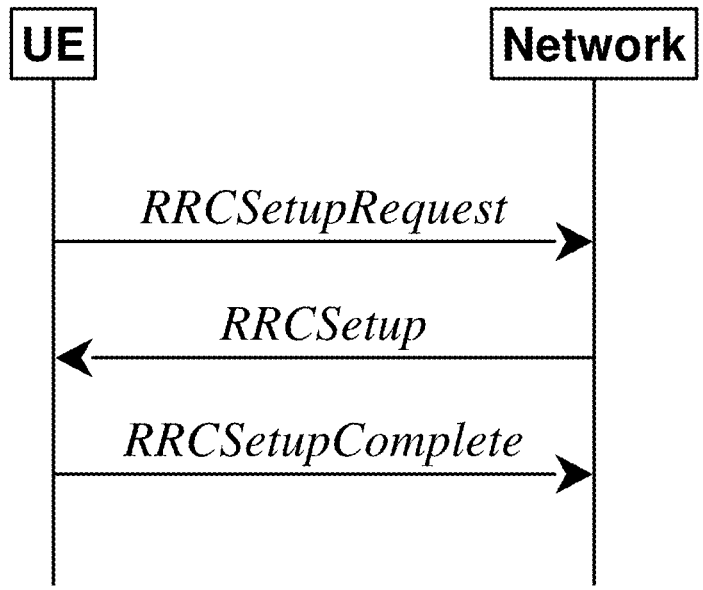
FIG. 5 is a reproduction of FIG. 5.3.3.1-1 of 3GPP TS 38.331 V16.2.0.

3GPP TS 38.331 introduced the following:
5.3.3 RRC Connection Establishment
5.3.3.1 General FIG. 5.3.3.1-1 of 3GPP TS 38.331 V16.2.0, Entitled "RRC Connection Establishment, Successful", is Reproduced as FIG. 5

[ . . . ]
The purpose of this procedure is to establish an RRC connection. RRC connection establishment involves SRB1 establishment. The procedure is also used to transfer the initial NAS dedicated information/message from the UE to the network.
The network applies the procedure e.g. as follows:
 When establishing an RRC connection;
 When UE is resuming or re-establishing an RRC connection, and the network is not able to retrieve or verify the UE context. In this case, UE receives RRCSetup and responds with RRCSetupComplete.
5.3.3.1a Conditions for Establishing RRC Connection for Sidelink Communication
For NR sidelink communication, an RRC connection establishment is initiated only in the following cases:
 1> if configured by upper layers to transmit NR sidelink communication and related data is available for transmission:
  2> if the frequency on which the UE is configured to transmit NR sidelink communication is included in sl-FreqInfoList within SIB12 provided by the cell on which the UE camps; and if the valid version of SIB12 does not include sl-TxPoolSelectedNormal for the concerned frequency;
For V2X sidelink communication, an RRC connection is initiated only when the conditions specified for V2X sidelink communication in subclause 5.3.3.1a of TS 36.331 [10] are met.
 NOTE: Upper layers initiate an RRC connection. The interaction with NAS is left to UE implementation.
5.3.3.2 Initiation
The UE initiates the procedure when upper layers request establishment of an RRC connection while the UE is in RRC_IDLE and it has acquired essential system information as described in 5.2.2.1, or for sidelink communication as specified in sub-clause 5.3.3.1a.
The UE shall ensure having valid and up to date essential system information as specified in clause 5.2.2.2 before initiating this procedure.
Upon initiation of the procedure, the UE shall:
 1> if the upper layers provide an Access Category and one or more Access Identities upon requesting establishment of an RRC connection:
  2> perform the unified access control procedure as specified in 5.3.14 using the Access Category and Access Identities provided by upper layers;
   3> if the access attempt is barred, the procedure ends;
 1> apply the default L1 parameter values as specified in corresponding physical layer specifications except for the parameters for which values are provided in SIB1;
 1> apply the default MAC Cell Group configuration as specified in 9.2.2;
 1> apply the CCCH configuration as specified in 9.1.1.2;
 1> apply the timeAlignmentTimerCommon included in SIB1;
 1> start timer T300;
 1> initiate transmission of the RRCSetupRequest message in accordance with 5.3.3.3;
5.3.3.3 Actions Related to Transmission of RRCSetupRequest Message
The UE shall set the contents of RRCSetupRequest message as follows:
 1> set the ue-Identity as follows:
  2> if upper layers provide a 5G-S-TMSI:
   3> set the ue-Identity to ng-5G-S-TMSI-Part1;
  2> else:
   3> draw a 39-bit random value in the range 0 . . . $2^{39}-1$ and set the ue-Identity to this value;
 NOTE 1: Upper layers provide the 5G-S-TMSI if the UE is registered in the TA of the current cell.
 1> set the establishmentCause in accordance with the information received from upper layers;
The UE shall submit the RRCSetupRequest message to lower layers for transmission.
The UE shall continue cell re-selection related measurements as well as cell re-selection evaluation. If the conditions for cell re-selection are fulfilled, the UE shall perform cell re-selection as specified in 5.3.3.6.
5.3.3.4 Reception of the RRCSetup by the UE
The UE shall perform the following actions upon reception of the RRCSetup:
 1> if the RRCSetup is received in response to an RRCReestablishmentRequest; or
 1> if the RRCSetup is received in response to an RRCResumeRequest or RRCResumeRequest1:
  2> discard any stored UE Inactive AS context and suspendConfig;

2> discard any current AS security context including the $K_{RRCenc}$ key, the $K_{RRCint}$ key, the $K_{UPint}$ key and the $K_{UPenc}$ key;
2> release radio resources for all established RBs except SRB0, including release of the RLC entities, of the associated PDCP entities and of SDAP;
2> release the RRC configuration except for the default L1 parameter values, default MAC Cell Group configuration and CCCH configuration;
2> indicate to upper layers fallback of the RRC connection;
2> stop timer T380, if running;
1> perform the cell group configuration procedure in accordance with the received masterCellGroup and as specified in 5.3.5.5;
1> perform the radio bearer configuration procedure in accordance with the received radioBearerConfig and as specified in 5.3.5.6;
1> if stored, discard the cell reselection priority information provided by the cellReselectionPriorities or inherited from another RAT;
1> stop timer T300, T301 or T319 if running;
1> if T390 is running:
  2> stop timer T390 for all access categories;
  2> perform the actions as specified in 5.3.14.4;
1> if T302 is running:
  2> stop timer T302;
  2> perform the actions as specified in 5.3.14.4;
1> stop timer T320, if running;
1> if the RRCSetup is received in response to an RRCResumeRequest, RRCResumeRequest1 or RRCSetupRequest:
  2> if T331 is running:
    3> stop timer T331;
    3> perform the actions as specified in 5.7.8.3;
  2> enter RRC_CONNECTED;
  2> stop the cell re-selection procedure;
1> consider the current cell to be the PCell;
1> set the content of RRCSetupComplete message as follows:
  2> if upper layers provide a 5G-S-TMSI:
    3> if the RRCSetup is received in response to an RRCSetupRequest:
      4> set the ng-5G-S-TMSI-Value to ng-5G-S-TMSI-Part2;
    3> else:
      4> set the ng-5G-S-TMSI-Value to ng-5G-S-TMSI;
  2> set the selectedPLMN-Identity to the PLMN or SNPN selected by upper layers (TS 24.501 [23]) from the PLMN(s) included in the plmn-IdentityList or the PLMN(s) or SNPN(s) included in the npn-IdentityInfoList in SIB1;
  2> if upper layers provide the 'Registered AMF':
    3> include and set the registeredAMF as follows:
      4> if the PLMN identity of the 'Registered AMF' is different from the PLMN selected by the upper layers:
        5> include the plmnIdentity in the registeredAMF and set it to the value of the PLMN identity in the 'Registered AMF' received from upper layers;
      4> set the amf-Identifier to the value received from upper layers;
    3> include and set the guami-Type to the value provided by the upper layers;
  2> if upper layers provide one or more S-NSSAI (see TS 23.003 [21]):
    3> include the s-NSSAI-List and set the content to the values provided by the upper layers;
  2> set the dedicatedNAS-Message to include the information received from upper layers;
  2> if connecting as an IAB-node:
    3> include the iab-NodeIndication;
  2> if the SIB1 contains idleModeMeasurementsNR and the UE has NR idle/inactive measurement information concerning cells other than the PCell available in VarMeasIdleReport; or
  2> if the SIB1 contains idleModeMeasurementsEUTRA and the UE has E-UTRA idle/inactive measurement information available in VarMeasIdleReport:
    3> include the idleMeasAvailable;
  2> if the UE has logged measurements available for NR and if the RPLMN is included in plmn-IdentityList stored in VarLogMeasReport:
    3> include the logMeasAvailable in the RRCSetupComplete message;
  2> if the UE has Bluetooth logged measurements available and if the RPLMN is included in plmn-IdentityList stored in VarLogMeasReport:
    3> include the logMeasAvailableBT in the RRCSetupComplete message;
  2> if the UE has WLAN logged measurements available and if the RPLMN is included in plmn-IdentityList stored in VarLogMeasReport:
    3> include the logMeasAvailableWLAN in the RRCSetupComplete message;
  2> if the UE has connection establishment failure or connection resume failure information available in VarConnEstFailReport and if the RPLMN is equal to plmnIdentity stored in VarConnEstFailReport:
    3> include connEstFailInfoAvailable in the RRCSetupComplete message;
  2> if the UE has radio link failure or handover failure information available in VarRLF-Report and if the RPLMN is included in plmn-IdentityList stored in VarRLF-Report:
    3> if reconnectCellId in VarRLF-Report is not set:
      4> set timeUntilReconnection in VarRLF-Report to the time that elapsed since the last radio link or handover failure;
      4> set nrReconnectCellId in reconnectCellId in VarRLF-Report to the global cell identity and the tracking area code of the PCell;
    3> include rlf-InfoAvailable in the RRCSetupComplete message;
  2> if the UE supports RLF report for inter-RAT MRO NR as defined in TS 36.306 [62], and if the UE has radio link failure or handover failure information available in VarRLF-Report of TS 36.331 [10]:
    3> if reconnectCellId in VarRLF-Report of TS 36.331[10] is not set:
      4> set timeUntilReconnection in VarRLF-Report of TS 36.331[10] to the time that elapsed since the last radio link or handover failure in LTE;
      4> set nrReconnectCellId in reconnectCellId in VarRLF-Report of TS 36.331[10] to the global cell identity and the tracking area code of the PCell;
    3> if the UE is capable of cross-RAT RLF reporting and if the RPLMN is included in plmn-IdentityList stored in VarRLF-Report of TS 36.331 [10]

Figure 6:
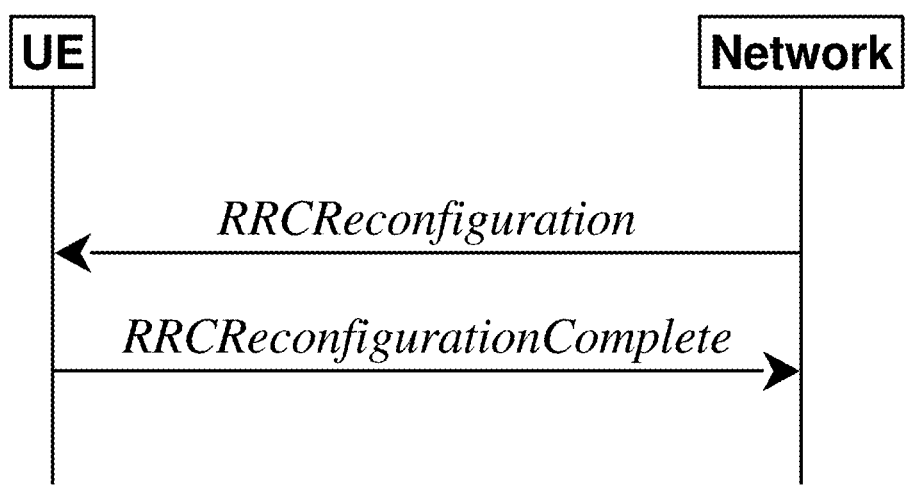
FIG. 6 is a reproduction of FIG. 5.3.5.1-1 of 3GPP TS 38.331 V16.2.0.

4> include rif-InfoAvailable in the RRCSetupComplete message;
2> if the UE supports storage of mobility history information and the UE has mobility history information available in VarMobilityHistoryReport:
3> include the mobilityHistoryAvail in the RRCSetupComplete message;
2> if the RRCSetup is received in response to an RRCResumeRequest, RRCResumeRequest1 or RRCSetupRequest:
3> if speedStateReselectionPars is configured in the SIB2:
4> include the mobilityState in the RRCSetupComplete message and set it to the mobility state (as specified in TS 38.304 [20]) of the UE just prior to entering RRC_CONNECTED state;
1> submit the RRCSetupComplete message to lower layers for transmission, upon which the procedure ends.
[ . . . ]
5.3.5 RRC Reconfiguration
5.3.5.1 General FIG. 5.3.5.1-1 of 3GPP TS 38.331 V16.2.0, Entitled "RRC Reconfiguration, Successful", is Reproduced as FIG. 6

[ . . . ]
5.3.8 RRC Connection Release
5.3.8.1 General

Figure 7:
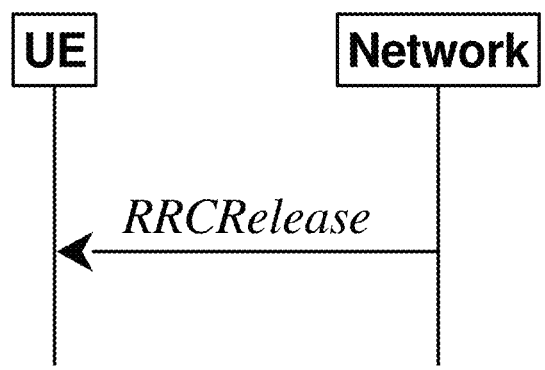
FIG. 7 is a reproduction of FIG. 5.3.8.1-1 of 3GPP TS 38.331 V16.2.0.

FIG. 5.3.8.1-1 of 3GPP TS 38.331 V16.2.0, Entitled "RRC Connection Release, Successful", is Reproduced as FIG. 7

Figure 8:
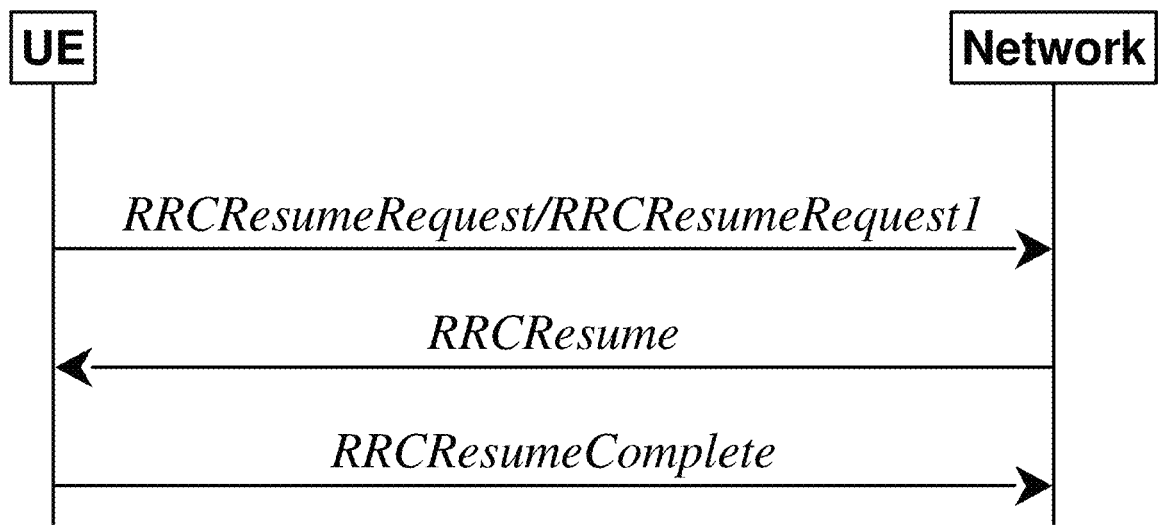
FIG. 8 is a reproduction of FIG. 5.3.13.1-1 of 3GPP TS 38.331 V16.2.0.

The purpose of this procedure is:
  to release the RRC connection, which includes the release of the established radio bearers as well as all radio resources; or
  to suspend the RRC connection only if SRB2 and at least one DRB or, for IAB, SRB2, are setup, which includes the suspension of the established radio bearers.
5.3.8.2 Initiation
The network initiates the RRC connection release procedure to transit a UE in RRC_CONNECTED to RRC_IDLE; or to transit a UE in RRC_CONNECTED to RRC_INACTIVE only if SRB2 and at least one DRB or, for IAB, SRB2, is setup in RRC_CONNECTED; or to transit a UE in RRC_INACTIVE back to RRC_INACTIVE when the UE tries to resume; or to transit a UE in RRC_INACTIVE to RRC_IDLE when the UE tries to resume. The procedure can also be used to release and redirect a UE to another frequency.
5.3.8.3 Reception of the RRCRelease by the UE
The UE shall:
1> delay the following actions defined in this sub-clause 60 ms from the moment the RRCRelease message was received or optionally when lower layers indicate that the receipt of the RRCRelease message has been successfully acknowledged, whichever is earlier;
1> stop timer T380, if running;
1> stop timer T320, if running;
1> if timer T316 is running:
2> stop timer T316;
2> clear the information included in VarRLF-Report, if any;
1> stop timer T350, if running;
1> if the AS security is not activated:
2> ignore any field included in RRCRelease message except waitTime;
2> perform the actions upon going to RRC_IDLE as specified in 5.3.11 with the release cause 'other' upon which the procedure ends;
1> if the RRCRelease message includes redirectedCarrierInfo indicating redirection to eutra:
2> if cnType is included:
3> after the cell selection, indicate the available CN Type(s) and the received cnType to upper layers;
NOTE 1: Handling the case if the E-UTRA cell selected after the redirection does not support the core network type specified by the cnType, is up to UE implementation.
2> if voiceFallbackIndication is included:
3> consider the RRC connection release was for EPS fallback for IMS voice (see TS 23.502 [43]);
1> if the RRCRelease message includes the cellReselectionPriorities:
2> store the cell reselection priority information provided by the cellReselectionPriorities;
2> if the t320 is included:
3> start timer T320, with the timer value set according to the value of t320;
1> else:
2> apply the cell reselection priority information broadcast in the system information;
1> if deprioritisationReq is included:
2> start or restart timer T325 with the timer value set to the deprioritisationTimer signalled;
2> store the deprioritisationReq until T325 expiry;
1> if the RRCRelease includes the measIdleConfig:
2> if T331 is running:
3> stop timer T331;
3> perform the actions as specified in 5.7.8.3;
2> if the measIdleConfig is set to setup:
3> store the received measIdleDuration in VarMeasIdleConfig;
3> start timer T331 with the value set to measIdleDuration;
3> if the measIdleConfig contains measIdleCarrierListNR:
4> store the received measIdleCarrierListNR in VarMeasIdleConfig;
3> if the measIdleConfig contains measIdleCarrierListEUTRA:
4> store the received measIdleCarrierListEUTRA in VarMeasIdleConfig;
3> if the measIdleConfig contains validityArealist:
4> store the received validityArealist in VarMeasIdleConfig;
1> if the RRCRelease includes suspendConfig:
2> apply the received suspendConfig;
2> remove all the entries within VarConditionalReconfig, if any;
2> for each measId, if the associated reportConfig has a reportType set to condTriggerConfig:
3> for the associated reportConfigId:
4> remove the entry with the matching reportConfigId from the reportConfigList within the VarMeasConfig;
3> if the associated measObjectId is only associated to a reportConfig with reportType set to condTriggerConfig:

4> remove the entry with the matching measObjectId from the measObjectList within the VarMeasConfig;
3> remove the entry with the matching measId from the measIdList within the VarMeasConfig;
2> reset MAC and release the default MAC Cell Group configuration, if any;
2> re-establish RLC entities for SRB1;
2> if the RRCRelease message with suspendConfig was received in response to an RRCResumeRequest or an RRCResumeRequest1:
3> stop the timer T319 if running;
3> in the stored UE Inactive AS context:
4> replace the $K_{gNB}$ and $K_{RRCint}$ keys with the current $K_{gNB}$ and $K_{RRCint}$ keys;
4> replace the C-RNTI with the temporary C-RNTI in the cell the UE has received the RRCRelease message;
4> replace the cellIdentity with the cellIdentity of the cell the UE has received the RRCRelease message;
4> replace the physical cell identity with the physical cell identity of the cell the UE has received the RRCRelease message;
2> else:
3> store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, the spCellConfigCommon within ReconfigurationWithSync of the NR PSCell (if configured) and all other parameters configured except for:
parameters within ReconfigurationWithSync of the PCell;
parameters within ReconfigurationWithSync of the NR PSCell, if configured;
parameters within MobilityControlInfoSCG of the E-UTRA PSCell, if configured;
servingCellConfigCommonSIB;
NOTE 2: NR sidelink communication related configurations and logged measurement configuration are not stored as UE Inactive AS Context, when UE enters RRC_INACTIVE.
2> suspend all SRB(s) and DRB(s), except SRB0;
2> indicate PDCP suspend to lower layers of all DRBs;
2> if the t380 is included:
3> start timer T380, with the timer value set to t380;
2> if the RRCRelease message is including the waitTime:
3> start timer T302 with the value set to waitTime;
3> inform upper layers that access barring is applicable for all access categories except categories '0' and '2';
2> if T390 is running:
3> stop timer T390 for all access categories;
3> perform the actions as specified in 5.3.14.4;
2> indicate the suspension of the RRC connection to upper layers;
2> enter RRC_INACTIVE and perform cell selection as specified in TS 38.304 [20];
1> else
2> perform the actions upon going to RRC_IDLE as specified in 5.3.11, with the release cause 'other'.
[ ... ]
5.3.13 RRC Connection Resume
5.3.13.1 General FIG. 5.3.13.1-1 of 3GPP TS 38.331 V16.2.0, Entitled "RRC Connection Resume, Successful", is Reproduced as FIG. 8

[ ... ]

Figure 9:
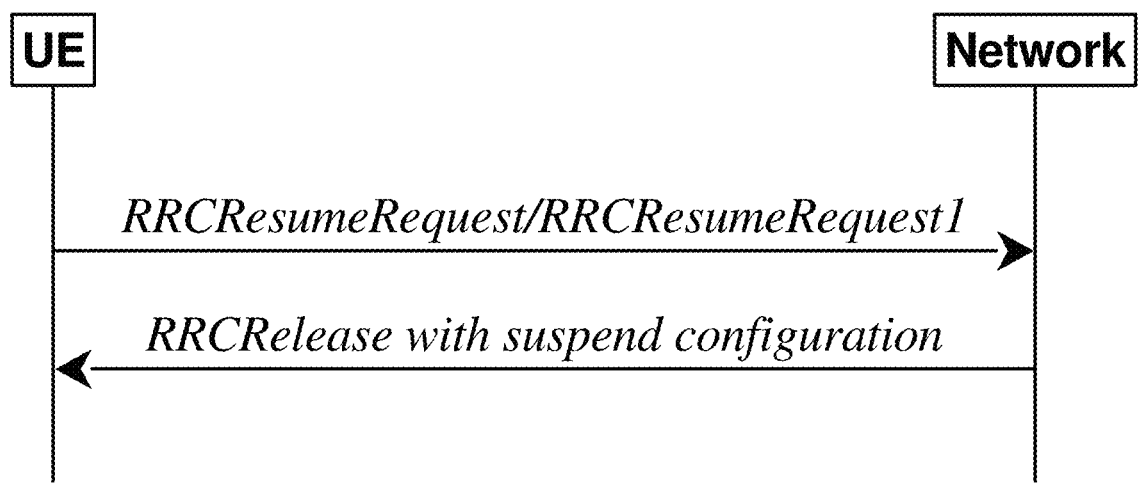
FIG. 9 is a reproduction of FIG. 5.3.13.1-4 of 3GPP TS 38.331 V16.2.0.

FIG. 5.3.13.1-4 of 3GPP TS 38.331 V16.2.0, Entitled "RRC Connection Resume Followed by Network Suspend, Successful", is Reproduced as FIG. 9

[ ... ]
The purpose of this procedure is to resume a suspended RRC connection, including resuming SRB(s) and DRB(s) or perform an RNA update.
[ ... ]
5.3.13.2 Initiation
The UE initiates the procedure when upper layers or AS (when responding to RAN paging, upon triggering RNA updates while the UE is in RRC_INACTIVE, or for sidelink communication as specified in sub-clause 5.3.13.1a) requests the resume of a suspended RRC connection. The UE shall ensure having valid and up to date essential system information as specified in clause 5.2.2.2 before initiating this procedure.
Upon initiation of the procedure, the UE shall:
1> if the resumption of the RRC connection is triggered by response to NG-RAN paging:
2> select '0' as the Access Category;
2> perform the unified access control procedure as specified in 5.3.14 using the selected Access Category and one or more Access Identities provided by upper layers;
3> if the access attempt is barred, the procedure ends;
1> else if the resumption of the RRC connection is triggered by upper layers:
2> if the upper layers provide an Access Category and one or more Access Identities:
3> perform the unified access control procedure as specified in 5.3.14 using the Access Category and Access Identities provided by upper layers;
4> if the access attempt is barred, the procedure ends;
2> set the resumeCause in accordance with the information received from upper layers;
1> else if the resumption of the RRC connection is triggered due to an RNA update as specified in 5.3.13.8:
2> if an emergency service is ongoing:
NOTE: How the RRC layer in the UE is aware of an ongoing emergency service is up to UE implementation.
3> select '2' as the Access Category;
3> set the resumeCause to emergency;
2> else:
3> select '8' as the Access Category;
2> perform the unified access control procedure as specified in 5.3.14 using the selected Access Category and one or more Access Identities to be applied as specified in TS 24.501 [23];

3> if the access attempt is barred:
   4> set the variable pendingRNA-Update to true;
   4> the procedure ends;
1> if the UE is in NE-DC or NR-DC:
   2> if the UE does not support maintaining SCG configuration upon connection resumption:
      3> release the MR-DC related configurations (i.e., as specified in 5.3.5.10) from the UE Inactive AS context, if stored;
1> if the UE does not support maintaining the MCG SCell configurations upon connection resumption:
   2> release the MCG SCell(s) from the UE Inactive AS context, if stored;
1> apply the default L1 parameter values as specified in corresponding physical layer specifications, except for the parameters for which values are provided in SIB1;
1> apply the default SRB1 configuration as specified in 9.2.1;
1> apply the default MAC Cell Group configuration as specified in 9.2.2;
1> release delayBudgetReportingConfig from the UE Inactive AS context, if stored;
1> stop timer T342, if running;
1> release overheatingAssistanceConfig from the UE Inactive AS context, if stored;
1> stop timer T345, if running;
1> release idc-AssistanceConfig from the UE Inactive AS context, if stored;
1> release drx-PreferenceConfig for all configured cell groups from the UE Inactive AS context, if stored;
1> stop all instances of timer T346a, if running;
1> release maxBW-PreferenceConfig for all configured cell groups from the UE Inactive AS context, if stored;
1> stop all instances of timer T346b, if running;
1> release maxCC-PreferenceConfig for all configured cell groups from the UE Inactive AS context, if stored;
1> stop all instances of timer T346c, if running;
1> release maxMIMO-LayerPreferenceConfig for all configured cell groups from the UE Inactive AS context, if stored;
1> stop all instances of timer T346d, if running;
1> release minSchedulingOffsetPreferenceConfig for all configured cell groups from the UE Inactive AS context, if stored;
1> stop all instances of timer T346e, if running;
1> release releasePreferenceConfig from the UE Inactive AS context, if stored;
1> stop timer T346f, if running;
1> apply the CCCH configuration as specified in 9.1.1.2;
1> apply the timeAlignmentTimerCommon included in SIB1;
1> start timer T319;
1> set the variable pendingRNA-Update to false;
1> initiate transmission of the RRCResumeRequest message or RRCResumeRequest1 in accordance with 5.3.13.3.

5.3.13.3 Actions Related to Transmission of RRCResumeRequest or RRCResumeRequest1 Message The UE shall set the contents of RRCResumeRequest or RRCResumeRequest1 message as follows:
1> if field useFullResumeID is signalled in SIB1:
   2> select RRCResumeRequest1 as the message to use;
   2> set the resumeIdentity to the stored fullI-RNTI value;
1> else:
   2> select RRCResumeRequest as the message to use;
   2> set the resumeIdentity to the stored shortI-RNTI value;
1> restore the RRC configuration, RoHC state, the stored QoS flow to DRB mapping rules and the $K_{gNB}$ and $K_{RRCint}$ keys from the stored UE Inactive AS context except for the following:
masterCellGroup;
mrdc-SecondaryCellGroup, if stored; and
pdcp-Config;
1> set the resumeMAC-I to the 16 least significant bits of the MAC-1 calculated:
   2> over the ASN.1 encoded as per clause 8 (i.e., a multiple of 8 bits) VarResumeMAC-Input;
   2> with the $K_{RRCint}$ key in the UE Inactive AS Context and the previously configured integrity protection algorithm; and
   2> with all input bits for COUNT, BEARER and DIRECTION set to binary ones;
1> derive the $K_{gNB}$ key based on the current $K_{gNB}$ key or the NH, using the stored nextHopChainingCount value, as specified in TS 33.501 [11];
1> derive the $K_{RRCenc}$ key, the $K_{RRCint}$ key, the $K_{UPint}$ key and the $K_{UPenc}$ key;
1> configure lower layers to apply integrity protection for all radio bearers except SRB0 using the configured algorithm and the $K_{RRCint}$ key and $K_{UPint}$ key derived in this subclause immediately, i.e., integrity protection shall be applied to all subsequent messages received and sent by the UE;
NOTE 1: Only DRBs with previously configured UP integrity protection shall resume integrity protection.
1> configure lower layers to apply ciphering for all radio bearers except SRB0 and to apply the configured ciphering algorithm, the $K_{RRCenc}$ key and the $K_{UPenc}$ key derived in this subclause, i.e. the ciphering configuration shall be applied to all subsequent messages received and sent by the UE;
1> re-establish PDCP entities for SRB1;
1> resume SRB1;
1> submit the selected message RRCResumeRequest or RRCResumeRequest1 for transmission to lower layers.
NOTE 2: Only DRBs with previously configured UP ciphering shall resume ciphering. If lower layers indicate an integrity check failure while T319 is running, perform actions specified in 5.3.13.5.

The UE shall continue cell re-selection related measurements as well as cell re-selection evaluation. If the conditions for cell re-selection are fulfilled, the UE shall perform cell re-selection as specified in 5.3.13.6.
[ . . . ]
5.3.13.8 RNA Update
In RRC_INACTIVE state, the UE shall:
   1> if T380 expires; or
   1> if RNA Update is triggered at reception of SIB1, as specified in 5.2.2.4.2:
      2> initiate RRC connection resume procedure in 5.3.13.2 with resumeCause set to rna-Update;
   1> if barring is alleviated for Access Category '8' or Access Category '2', as specified in 5.3.14.4:
      2> if upper layers do not request RRC the resumption of an RRC connection, and
      2> if the variable pendingRNA-Update is set to true:
         3> initiate RRC connection resume procedure in 5.3.13.2 with resumeCause value set to rna-Update.

If the UE in RRC_INACTIVE state fails to find a suitable cell and camps on the acceptable cell to obtain limited service as defined in TS 38.304 [20], the UE shall:

1> perform the actions upon going to RRC_IDLE as specified in 5.3.11 with release cause 'other'.

NOTE: It is left to UE implementation how to behave when T380 expires while the UE is camped neither on a suitable nor on an acceptable cell.

5.3.13.9 Reception of the RRCRelease by the UE

The UE shall:

1> perform the actions as specified in 5.3.8.

[ . . . ]

6.2.1 General Message Structure

[ . . . ]

UL-CCCH-Message

The UL-CCCH-Message class is the set of 48-bits RRC messages that may be sent from the UE to the Network on the uplink CCCH logical channel.

```
-- ASN1START
-- TAG-UL-CCCH-MESSAGE-START
UL-CCCH-Message ::=      SEQUENCE {
    message              UL-CCCH-MessageType
}
UL-CCCH-MessageType ::=  CHOICE {
    c1                   CHOICE {
        ...
        rrcSystemInfoRequest    RRCSystemInfoRequest
    },
    messageClassExtension    SEQUENCE { }
}
-- TAG-UL-CCCH-MESSAGE-STOP
-- ASN1STOP
```

[ . . . ]

6.2.2 Message Definitions

[ . . . ]

RRCResumeRequest

The RRCResumeRequest message is used to request the resumption of a suspended RRC connection or perform an RNA update.

Signalling radio bearer: SRB0
    RLC-SAP: TM
    Logical channel: CCCH
    Direction: UE to Network

| RRCResumeRequest message |
| --- |
| ```-- ASN1START
-- TAG-RRCRESUMEREQUEST-START
RRCResumeRequest ::=      SEQUENCE {
    rrcResumeRequest      RRCResumeRequest-IEs
}
RRCResumeRequest-IEs ::=  SEQUENCE {
    resumeIdentity        ShortI-RNTI-Value,
    resumeMAC-I           BIT STRING (SIZE (16)),
    resumeCause           ResumeCause,
    spare                 BIT STRING (SIZE (1))
}
-- TAG-RRCRESUMEREQUEST-STOP
-- ASN1STOP``` |

| RRCResumeRequest-IEs field descriptions |
| --- |
| resumeCause<br>Provides the resume cause for the RRC connection resume request as provided by the upper layers or RRC. |

| RRCResumeRequest-IEs field descriptions |
| --- |
| The network is not expected to reject an RRCResumeRequest due to unknown cause value being used by the UE.<br>resumeIdentity<br>UE identity to facilitate UE context retrieval at gNB.<br>resumeMAC-I<br>Authentication token to facilitate UE authentication at gNB. The 16 least significant bits of the MAC-I calculated using the AS security configuration as specified in 5.3.13.3. |

RRCResumeRequest1

The RRCResumeRequest1 message is used to request the resumption of a suspended RRC connection or perform an RNA update.

Signalling radio bearer: SRB0
    RLC-SAP: TM
    Logical channel: CCCH1
    Direction: UE to Network

| RRCResumeRequest1 message |
| --- |
| ```-- ASN1START
-- TAG-RRCRESUMEREQUEST1-START
RRCResumeRequest1 ::=      SEQUENCE {
    rrcResumeRequest1      RRCResumeRequest1-IEs
}
RRCResumeRequest1-IEs ::=  SEQUENCE {
    resumeIdentity         I-RNTI-Value,
    resumeMAC-I            BIT STRING (SIZE (16)),
    resumeCause            ResumeCause,
    spare                  BIT STRING (SIZE (1))
}
-- TAG-RRCRESUMEREQUEST1-STOP
-- ASN1STOP``` |

| RRCResumeRequest1-IEs field descriptions |
| --- |
| resumeCause<br>Provides the resume cause for the RRCResumeRequest1 as provided by the upper layers or RRC.<br>A gNB is not expected to reject an RRCResumeRequest1 due to unknown cause value being used by the UE.<br>resumeIdentity<br>UE identity to facilitate UE context retrieval at gNB.<br>resumeMAC-I<br>Authentication token to facilitate UE authentication at gNB. The 16 least significant bits of the MAC-I calculated using the AS security configuration as specified in 5.3.13.3. |

[ . . . ]

RRCResume

The RRCResume message is used to resume the suspended RRC connection.

Signalling radio bearer: SRB1
    RLC-SAP: AM
    Logical channel: DCCH
    Direction: Network to UE

| RRCResume message |
| --- |
| ```-- ASN1START
-- TAG-RRCRESUME-START
RRCResume ::=                SEQUENCE {
    rrc-TransactionIdentifier    RRC-TransactionIdentifier,
    criticalExtensions           CHOICE {
        rrcResume                RRCResume-IEs,
        criticalExtensionsFuture SEQUENCE { }
    }
}``` |

| RRCResume message | |
|---|---|
| } | |
| RRCResume-IEs ::= | SEQUENCE { |
| radioBearerConfig | RadioBearerConfig |
| OPTIONAL, -- Need M | |
| masterCellGroup | OCTET STRING (CONTAINING CellGroupConfig) |
| OPTIONAL, -- Need M | |
| measConfig | MeasConfig |
| OPTIONAL, -- Need M | |
| fullConfig | ENUMERATED {true} |
| OPTIONAL, -- Need N | |
| lateNonCriticalExtension | OCTET STRING |
| OPTIONAL, | |
| nonCriticalExtension | RRCResume-v1560-IEs |
| OPTIONAL | |
| } | |
| RRCResume-v1560-IEs ::= | SEQUENCE { |
| radioBearerConfig2 | OCTET STRING (CONTAINING RadioBearerConfig) |
| OPTIONAL, -- Need M | |
| sk-Counter | SK-Counter |
| OPTIONAL, -- Need N | |
| nonCriticalExtension | RRCResume-v1610-IEs |
| OPTIONAL | |
| } | |
| RRCResume-v1610-IEs ::= | SEQUENCE { |
| idleModeMeasurementReq-r16 | ENUMERATED {true} |
| OPTIONAL, -- Need N | |
| restoreMCG-SCells-r16 | ENUMERATED {true} |
| OPTIONAL, -- Need N | |
| restoreSCG-r16 | ENUMERATED {true} |
| OPTIONAL, -- Need N | |
| mrdc-SecondaryCellGroup-r16 | CHOICE { |
| nr-SCG-r16 | OCTET STRING (CONTAINING RRCReconfiguration), |
| eutra-SCG-r16 | OCTET STRING |
| } | |
| OPTIONAL, -- Cond RestoreSCG | |
| needForGapsConfigNR-r16 | SetupRelease {NeedForGapsConfigNR-r16} |
| OPTIONAL, -- Need M | |
| nonCriticalExtension | SEQUENCE{ } |
| OPTIONAL | |
| } | |
| -- TAG-RRCRESUME-STOP | |
| -- ASN1STOP | |

[ . . . ]

RRCResumeComplete

The RRCResumeComplete message is used to confirm the successful completion of an RRC connection resumption.

Signalling radio bearer: SRB1
RLC-SAP: AM
Logical channel: DCCH
Direction: UE to Network

| RRCResumeComplete message | |
|---|---|
| -- ASN1START | |
| -- TAG-RRCRESUMECOMPLETE-START | |
| RRCResumeComplete ::= | SEQUENCE { |
| rrc-TransactionIdentifier | RRC-TransactionIdentifier, |
| criticalExtensions | CHOICE { |
| rrcResumeComplete | RRCResumeComplete-IEs, |
| criticalExtensionsFuture | SEQUENCE { } |
| } | |
| } | |
| RRCResumeComplete-IEs ::= | SEQUENCE { |
| dedicatedNAS-Message | DedicatedNAS-Message |
| OPTIONAL, | |
| selectedPLMN-Identity | INTEGER (1..maxPLMN) |
| OPTIONAL, | |
| uplinkTxDirectCurrentList | UplinkTxDirectCurrentList |
| OPTIONAL, | |
| lateNonCriticalExtension | OCTET STRING |
| OPTIONAL, | |
| nonCriticalExtension | RRCResumeComplete-v1610-IEs |
| OPTIONAL | |
| } | |
| RRCResumeComplete-v1610-IEs ::= | SEQUENCE { |
| idleMeasAvailable-r16 | ENUMERATED {true} |
| OPTIONAL, | |
| measResultIdleEUTRA-r16 | MeasResultIdleEUTRA-r16 |
| OPTIONAL, | |
| measResultIdleNR-r16 | MeasResultIdleNR-r16 |
| OPTIONAL, | |
| scg-Response-r16 | CHOICE { |
| nr-SCG-Response | OCTET STRING (CONTAINING RRCReconfigurationComplete), |
| eutra-SCG-Response | OCTET STRING |
| } | |
| OPTIONAL, | |
| ue-MeasurementsAvailable-r16 | UE-MeasurementsAvailable-r16 |
| OPTIONAL, | |
| mobilityHistoryAvail-r16 | ENUMERATED {true} |
| OPTIONAL, | |
| mobilityState-r16 | ENUMERATED {normal, medium, high, spare} |
| OPTIONAL, | |
| needForGapsInfoNR-r16 | NeedForGapsInfoNR-r16 |

| RRCResumeComplete message |
|---|
| OPTIONAL,<br>  nonCriticalExtension            SEQUENCE{ }<br>OPTIONAL<br>}<br>-- TAG-RRCRESUMECOMPLETE-STOP<br>-- ASN1STOP<br>[...] |

RRCRelease

The RRCRelease message is used to command the release of an RRC connection or the suspension of the RRC connection.

Signalling radio bearer: SRB1
RLC-SAP: AM
Logical channel: DCCH
Direction: Network to UE

| RRCRelease message |
|---|
| -- ASN1START<br>-- TAG-RRCRELEASE-START<br>...<br>RRCRelease-IEs ::=         SEQUENCE {<br>...<br>  suspendConfig             SuspendConfig<br>OPTIONAL,  -- Need R<br>...<br>}<br>...<br>SuspendConfig ::=          SEQUENCE {<br>  fullI-RNTI                I-RNTI-Value,<br>  shortI-RNTI              ShortI-RNTI-Value,<br>  ran-PagingCycle         PagingCycle,<br>  ran-NotificationAreaInfo   RAN-NotificationAreaInfo<br>OPTIONAL,  -- Need M<br>  t380                        PeriodicRNAU-TimerValue<br>OPTIONAL,  -- Need R<br>  nextHopChainingCount      NextHopChainingCount,<br>  ...<br>}<br>[...]<br>-- TAG-RRCRELEASE-STOP<br>-- ASN1STOP |

| RRCRelease-IEs field descriptions |
|---|
| suspendConfig<br>Indicates configuration for the RRC_INACTIVE state.<br>The network does not configure suspendConfig when the network redirect the UE to an inter-RAT carrier frequency or if the UE is configured with a DAPS bearer. |

[ . . . ]

RRCSetup

The RRCSetup message is used to establish SRB1.

Signalling radio bearer: SRB0
RLC-SAP: TM
Logical channel: CCCH
Direction: Network to UE

| RRCSetup message |
|---|
| -- ASN1START<br>-- TAG-RRCSETUP-START<br>RRCSetup ::=             SEQUENCE {<br>  rrc-TransactionIdentifier    RRC-TransactionIdentifier,<br>  criticalExtensions           CHOICE {<br>    rrcSetup                  RRCSetup-IEs,<br>    criticalExtensionsFuture     SEQUENCE { }<br>  }<br>}<br>RRCSetup-IEs ::=           SEQUENCE {<br>  radioBearerConfig          RadioBearerConfig,<br>  masterCellGroup           OCTET STRING (CONTAINING<br>                                      CellGroupConfig},<br>  lateNonCriticalExtension     OCTET STRING<br>OPTIONAL,<br>  nonCriticalExtension         SEQUENCE{ }<br>OPTIONAL<br>}<br>-- TAG-RRCSETUP-STOP<br>-- ASN1STOP |

| RRCSetup-IEs field descriptions |
|---|
| masterCellGroup<br>The network configures only the RLC bearer for the SRB1, mac-CellGroupConfig, physicalCellGroupConfig and spCellConfig.<br>radioBearerConfig<br>Only SRB1 can be configured in RRC setup. |

RRCSetupComplete

The RRCSetupComplete message is used to confirm the successful completion of an RRC connection establishment.

Signalling radio bearer: SRB1
RLC-SAP: AM
Logical channel: DCCH
Direction: UE to Network

| RRCSetupComplete message |
|---|
| -- ASN1START<br>-- TAG-RRCSETUPCOMPLETE-START<br>RRCSetupComplete ::=        SEQUENCE {<br>  rrc-TransactionIdentifier    RRC-TransactionIdentifier,<br>  criticalExtensions           CHOICE {<br>    rrcSetupComplete          RRCSetupComplete-IEs, |

| RRCSetupComplete message | | |
|---|---|---|
| criticalExtensionsFuture | SEQUENCE { } | |
| } | | |
| } | | |
| RRCSetupComplete-IEs ::= | SEQUENCE { | |
|   selectedPLMN-Identity | INTEGER (1..maxPLMN), | |
|   registeredAMF | RegisteredAMF | OPTIONAL, |
|   guami-Type | ENUMERATED {native, mapped} | OPTIONAL, |
|   s-NSSAI-List | SEQUENCE (SIZE (1..maxNrofS-NSSAI)) OF S-NSSAI | OPTIONAL, |
|   dedicatedNAS-Message | DedicatedNAS-Message, | |
|   ng-5G-S-TMSI-Value | CHOICE { | |
|     ng-5G-S-TMSI | NG-5G-S-TMSI, | |
|     ng-5G-S-TMSI-Part2 | BIT STRING (SIZE (9)) | |
|   } | | OPTIONAL, |
|   lateNonCriticalExtension | OCTET STRING | OPTIONAL, |
|   nonCriticalExtension | RRCSetupComplete-v1610-IEs | OPTIONAL |
| } | | |
| RRCSetupComplete-v1610-IEs ::= | SEQUENCE { | |
|   iab-NodeIndication-r16 | ENUMERATED {true} | OPTIONAL, |
|   idleMeasAvailable-r16 | ENUMERATED {true} | OPTIONAL, |
|   ue-MeasurementsAvailable-r16 | UE-MeasurementsAvailable-r16 | OPTIONAL, |
|   mobilityHistoryAvail-r16 | ENUMERATED {true} | OPTIONAL, |
|   mobilityState-r16 | ENUMERATED {normal, medium, high, spare} | OPTIONAL, |
|   nonCriticalExtension | SEQUENCE{ } | OPTIONAL |
| } | | |
| RegisteredAMF ::= | SEQUENCE { | |
|   plmn-Identity | PLMN-Identity | OPTIONAL, |
|   amf-Identifier AMF- | Identifier | |
| } | | |
| -- TAG-RRCSETUPCOMPLETE-STOP | | |
| -- ASN1STOP | | |

| RRCSetupComplete-IEs field descriptions |
|---|
| guami-Type |
| This field is used to indicate whether the GUAMI included is native (derived from native 5G-GUTI) or mapped (from EPS, derived from EPS GUTI) as specified in TS 24.501 [23]. |
| iab-NodeIndication |
| This field is used to indicate that the connection is being established by an IAB-node [2]. |
| idleMeasAvailable |
| Indication that the UE has idle/inactive measurement report available. |
| mobilityState |
| This field indicates the UE mobility state (as defined in TS 38.304 [20], clause 5.2.4.3) just prior to UE going into RRC_CONNECTED state. The UE indicates the value of medium and high when being in Medium-mobility and High-mobility states respectively. Otherwise the UE indicates the value normal. |
| ng-5G-S-TMSI-Part2 |
| The leftmost 9 bits of 5G-S-TMSI. |
| registeredAMF |
| This field is used to transfer the GUAMI of the AMF where the UE is registered, as provided by upper layers, see TS 23.003 [21]. |
| selectedPLMN-Identity |
| Index of the PLMN or SNPN selected by the UE from the plmn-IdentityList or npn-IdentityInfoList fields included in SIB1. |

RRCSetupRequest
The RRCSetupRequest message is used to request the establishment of an RRC connection.
    Signalling radio bearer: SRB0
    RLC-SAP: TM
    Logical channel: CCCH
    Direction: UE to Network

| RRCSetupRequest message |
|---|
| -- ASN1START |
| -- TAG-RRCSETUPREQUEST-START |

| RRCSetupRequest message | |
|---|---|
| RRCSetupRequest ::= | SEQUENCE { |
|   rrcSetupRequest | RRCSetupRequest-IEs |
| } | |
| RRCSetupRequest-IEs ::= | SEQUENCE { |
|   ue-Identity | InitialUE-Identity, |
|   establishmentCause | EstablishmentCause, |
|   spare | BIT STRING (SIZE (1)) |
| } | |
| InitialUE-Identity ::= | CHOICE { |
|   ng-5G-S-TMSI-Part1 | BIT STRING (SIZE (39)), |
|   randomValue | BIT STRING (SIZE (39)) |
| } | |
| EstablishmentCause ::= | ENUMERATED { |
| | emergency, highPriorityAccess, |
| | mt-Access, mo-Signalling, |
| | mo-Data, mo-VoiceCall, mo-VideoCall, |
| | mo-SMS, mps-PriorityAccess, mcs-PriorityAccess, |
| | spare6, spare5, spare4, spare3, spare2, spare1} |
| -- TAG-RRCSETUPREQUEST-STOP | |
| -- ASN1STOP | |

| RRCSetupRequest-IEs field descriptions |
|---|
| establishmentCause |
| Provides the establishment cause for the RRCSetupRequest in accordance with the information received from upper layers. gNB is not expected to reject an RRCSetupRequest due to unknown cause value being used by the UE. |
| ue-Identity |
| UE identity included to facilitate contention resolution by lower layers. |

| InitialUE-Identity field descriptions |
| --- |
| ng-5G-S-TMSI-Part1<br>The rightmost 39 bits of 5G-S-TMSI.<br>randomValue<br>Integer value in the range 0 to $2^{39}$-1. |

[ ... ]

6.3.2 Radio Resource Control Information Elements

[ ... ]

ResumeCause

The IE ResumeCause is used to indicate the resume cause in RRCResumeRequest and RRCResumeRequest1.

| ResumeCause information element |
| --- |
| -- ASN1START<br>-- TAG-RESUMECAUSE-START<br>ResumeCause ::= ENUMERATED (emergency, highPriorityAccess,<br>mt-Access, mo-Signalling,<br>       mo-Data, mo-VoiceCall, mo-VideoCall,<br>mo-SMS, rna-Update, mps-PriorityAccess,<br>       mcs-PriorityAccess, spare1, spare2, spare3,<br>spare4, spare5 }<br>-- TAG-RESUMECAUSE-STOP<br>-- ASN1STOP |

[ ... ]

7.4 UE Variables

[ ... ]

VarResumeMAC-Input

The UE variable VarResumeMAC-Input specifies the input used to generate the resumeMAC-I during RRC Connection Resume procedure.

| VarResumeMAC-Input variable |
| --- |
| -- ASN1START<br>-- TAG-VARRESUMEMAC-INPUT-START<br>VarResumeMAC-Input ::= SEQUENCE {<br>   sourcePhysCellId         PhysCellId,<br>   targetCellIdentity        CellIdentity,<br>   source-c-RNTI            RNTI-Value<br>}<br>-- TAG-VARRESUMEMAC-INPUT-STOP<br>-- ASN1STOP |

| VarResumeMAC-Input field descriptions |
| --- |
| targetCellIdentity<br>An input variable used to calculate the resumeMAC-I.<br>Set to the cellIdentity of the first PLMN-<br>Identity included in the PLMN-IdentityInfoList broadcasted in SIB1<br>of the target cell i.e. the cell the UE is trying to resume.<br>source-c-RNTI<br>Set to C-RNTI that the UE had in the PCell it was connected<br>to prior to suspension of the RRC connection.<br>sourcePhysCellId<br>Set to the physical cell identity of the PCell the UE was connected<br>to prior to suspension of the RRC connection. |

3GPP TS 38.300 introduced the following:

9.2.2 Mobility in RRC_INACTIVE 9.2.2.1 Overview

[ ... ]

A UE in the RRC_INACTIVE state is required to initiate RNA update procedure when it moves out of the configured RNA. When receiving RNA update request from the UE, the receiving gNB triggers the XnAP Retrieve UE Context procedure to get the UE context from the last serving gNB and may decide to send the UE back to RRC_INACTIVE state, move the UE into RRC_CONNECTED state, or send the UE to RRC_IDLE. In case of periodic RNA update, if the last serving gNB decides not to relocate the UE context, it fails the Retrieve UE Context procedure and sends the UE back to RRC_INACTIVE, or to RRC_IDLE directly by an encapsulated RRCRelease message.

[ ... ]

3GPP TR 23.752 introduced the following:

6.7 Solution #7: Indirect Communication Via Layer 2 UE-to-Network Relay UE 6.7.1 Introduction The solution addresses the following aspect highlighted in key issue #3 (Support UE-to-Network Relay UE):

How to transfer data between the Remote UE and the network over the UE-to-Network Relay UE.

The solution proposes a protocol architecture to support a Layer 2 UE-to-Network Relay UE (see Annex A).

This solution works only for NR/5GC network relays. It does not apply when the UE-to-Network Relay UE is out of coverage of NR/5GC.

6.7.2 Functional Description 6.7.2.1 General

In this clause, the protocol architecture supporting a L2 UE-to-Network Relay UE is provided. The L2 UE-to-Network Relay UE provides forwarding functionality that can relay any type of traffic over the PC5 link.

The L2 UE-to-Network Relay UE provides the functionality to support connectivity to the 5GS for Remote UEs. A UE is considered to be a Remote UE if it has successfully established a PC5 link to the L2 UE-to-Network Relay UE. A Remote UE can be located within NG-RAN coverage or outside of NG-RAN coverage.

6.7.2.2 Control and User Plane Protocols

The control and user plane protocols stacks are based on the architectural reference model described in Annex A.

6.7.2.3 Network Selection

Network selection comprises PLMN selection and access network selection. Access network selection for a Remote UE comprises UE-to-Network relay discovery and selection. The Remote UE performs PLMN selection in accordance with the PLMN selected by the UE-to-Network Relay. The Relay UE provides serving PLMN information and other PLMNs information in System Information to the Remote UE in order to perform PLMN selection during discovery.

Editor's note: It is FFS which and how many PLMNs a L2 UE-to-Network Relay is expected to support and advertise. For instance whether it is only its registered PLMN, its registered PLMN and equivalent to the registered PLMN or it can be (hard) configured to include any PLMN similar to MOCN configuration.

The Remote UE and UE-to-Network Relay UE are by definition served by the same NG-RAN.

6.7.2.4 Authorization and Provisioning

In order to enable a (Remote) UE out of coverage to gain connectivity to the network, it is important to allow such UE by means of (pre)configuration to discover potential UE-to-Network Relay UEs through which it could gain access to the 5GS. To do so:

Parameters for UE-to-Network Relay UE discovery and for communication over NR PC5 may be made available to the Remote UE as follows:

Pre-configured in the ME and/or configured in the UICC;

Provided or updated by the PCF to the UE in the serving PLMN.

It is also important that a UE be authorized to operate as a UE-to-Network Relay UE. A UE may only operate as a UE-to-Network Relay UE when served by the network.

Parameters for a UE to operate as a UE-to-Network Relay UE, for discovery of Remote UEs over NR PC5 and for communication over NR PC5 may be made available to the UE as follows:

Pre-configured in the ME and/or configured in the UICC;
Provided or updated by the PCF to the UE in the serving PLMN.

It should be possible for the HPLMN PCF to provide authorization for a UE to operate as a Remote UE or as a UE-to-Network Relay UE on a per PLMN basis. It should also be possible for the Serving PLMN to provide/revoke such authorization in which case it shall override any corresponding information provided by the HPLMN.

PCF based service authorization and provisioning solution for Layer-2 UE-to-Network Relay could reuse Solution #35.

6.7.2.5 Registration and Connection Management 6.7.2.5.1 Registration Management Registration Management for the UE-to-Network Relay UE follows the principles and procedures defined in TS 23.501 [6] and TS 23.502 [8]. The UE-to-Network Relay is served by a first AMF.

Registration Management for the Remote UE follows the principles and procedures defined in TS 23.501 [6] and TS 23.502 [8]. The Remote UE is served by a second AMF that may or may not be the same as the first AMF.

NOTE: The UE is authorized to act as a UE-to-Network Relay only if the Network (including RAN/CN) does not restrict it, e.g. authorization, Unified Access Control, and Remote UE and UE-to-Network Relay are in the same rPLMN or ePLMN.

6.7.2.5.2 Connection Management

Connection Management for the UE-to-Network Relay UE follows at least the principles and procedures defined in TS 23.501 [6] and TS 23.502 [8].

Connection Management for the Remote UE follows the principles and procedures defined in TS 23.501 [6] and TS 23.502 [8].

The UE-to-Network Relay may only relay data/signaling for the Remote UE(s) when the UE-to-Network Relay is in CM-CONNECTED/RRC Connected states. If the UE-to-Network Relay in CM_IDLE state receives the PC5 connection request from the Remote UE for relay, the UE-to-Network Relay shall trigger Service Request procedure to enter CM_CONNECTED state before relaying the signalling.

If any Remote UE connected to the UE-to-Network Relay UE is CM-CONNECTED, the UE-to-Network Relay UE should remain CM-CONNECTED state.

If all Remote UEs connected to the UE-to-Network Relay UE enter CM-IDLE, the UE-to-Network Relay UE may enter CM-IDLE state.

NOTE: The applied state needs to be coordinated and confirmed by RAN WG2. Impact on RRC Inactive will also be studied by RAN WG2.

When Remote UE is CM-IDLE or CM-CONNECTED, Relay UE and Remote UE keeps the PC5 link. For paging Remote UE, the concluded solution in clause 6.6.2 of TR 23.733 [26] can be reused based on the assumption that option 2 of TR 36.746 [27] is adopted by RAN WG2.

Editor's note: Whether paging option 2 of TR 36.746 [27] will be adopted for 5G ProSe by RAN WG2 needs to be confirmed by RAN group.

6.7.2.5.3 NAS Level Congestion Control

The UE-to-Network Relay may experience NAS level congestion control, as specified in clause 5.19.7 of TS 23.501 [6].

When NAS Mobility Management congestion control is activated, i.e. the UE-to-Network Relay receives Mobility Management back-off timer from the AMF, the UE-to-Network Relay is not able to properly serve the Remote UE after the UE-to-Network Relay enters CM_IDLE state. In that case, the UE-to-Network Relay needs to inform the Remote UE that there is a Mobility Management back-off timer running at the UE-to-Network Relay, so that the Remote UE is able to (re)select to another UE-to-Network Relay.

The Remote UE may also subject to NAS level congestion control. The existing behavior defined in TS 23.501 [6] shall apply.

6.7.2.6 QoS

As shown in Annex A, the NAS endpoints between a Remote UE and the network are as currently specified such that the operation via a UE-to-Network Relay UE should be transparent to the network NAS, with the exception of authorization/provisioning identified in clause 6.7.2.4.

This means that the 5GS flow-based QoS concept in particular should be reused between the Remote UE and the network, with necessary adaptation over the radio interface i.e. PC5 (for the Remote UE and UE-to-Network Relay UE) and Uu (for the UE-to-Network Relay UE). RAN performs QoS enforcement for PC5 interface and Uu interfaces when it gets QoS profile from the CN. For example, RAN performs QoS enforcement with AS layer configuration with necessary adaptation over PC5 interface and Uu interface. In other words, QoS flows established between the network and the Remote UE will be mapped to PC5 "radio bearers" seen by the Remote UE and to normal Uu radio bearers seen by the network, whereby the UE-to-Network Relay UE performs the necessary adaptation between Uu and PC5.

Editor's note: How to perform AS layer configuration for PC5 interface and Uu interface depends on RAN.

6.7.2.7 Mobility 6.7.2.7.1 Mobility Restrictions

The Remote UE is expected to operate within the boundaries of the Mobility Restrictions applicable to the UE to Network Relay UE.

Mobility restriction in CM-IDLE state is executed by the UE based on the information received from the network. For the UE-to-Network Relay case, the Remote UE may not obtain the mobility restrictions related information if Remote UE is out of coverage. The Remote UE can get the mobility restrictions related information, e.g., tracking area, from the Relay UE, and the Remote UE itself performs network selection and access control in CM_IDLE state based on the received information.

RAT Restriction:
If Remote UE is restricted to use some RAT in a PLMN, the Remote UE is not allowed to access via UE-to-Network Relay using that RAT in that PLMN. If UE-to-Network Relay is restricted to use some RAT in a PLMN, the UE-to-Network Relay is not allowed to perform the Relay operation using that RAT in that PLMN.

Forbidden Area:
If UE-to-Network Relay is in Forbidden Area, it is not allowed to perform the Relay operation. If the UE-to-Network Relay operates in a Forbidden Area of the Remote UE, the Remote UE is not allowed to access the network via this UE-to-Network Relay.

A UE-to-Network Relay shall indicate to Remote UEs the Tracking Area of the cell to which the UE-to-Network Relay is connected. The indication is provided during discovery.

Service Area Restriction: Allowed Area, Non-Allowed Area
  Allowed Area applies as is for a UE-to-Network Relay and Remote UE. A UE-to-Network Relay (resp. Remote UE) is allowed to initiate communication with the network (resp. with the network via a UE-to-Network Relay) as allowed by subscription.
  A UE-to-Network Relay may only perform UE-to-Network Relay operation in an Allowed Area.
  Non-allowed Area applies as is for a UE-to-Network Relay and Remote UE. The UE (UE-to-Network Relay or Remote UE) and the network are not allowed to initiate Service Request or SM signalling to obtain user services (both in CM-IDLE and in CM-CONNECTED states). RM procedures for non-3GPP access aspects are not applicable for the Remote UE.
  When the UE-to-Network Relay UE enters a non-allowed Area and the UE-to-Network Relay cannot provide relay service, it may release the PC5 unicast connection with a cause code informing the remote UE of UE-to-Network Relay in Non-allowed area.
  NOTE 1: The above bullet on Service Area Restriction changing due to UE-to-Network Relay's mobility will be evaluated separately from other parts of solution #7.

Core Network Type Restriction:
  The CN type restriction applies as is to a UE-to-Network Relay and Remote UE. A UE-to-Network Relay or Remote UE may only operate as such when not restricted to use 5GC.

Closed Access Group Information:
  A UE permitted (resp. not permitted) to access a CAG cell is implicitly permitted (resp. not permitted) to access this CAG cell as a Remote UE via a UE-to-Network Relay. The Allowed CAG list and CAG-only indication of a UE apply to this UE when it is a Remote UE.
  A UE permitted (resp. not permitted) to access a CAG cell is implicitly permitted (resp. not permitted) to access this CAG cell as a UE-to-Network Relay. The Allowed CAG list and CAG-only indication of a UE apply to this UE when it operates as a UE-to-Network Relay.
  A UE-to-Network Relay shall indicate to Remote UEs the CAG identifiers of the CAG the UE-to-Network Relay is permitted to access via the cell to which it is connected. The indication is provided during discovery.
  A UE-to-Network Relay shall provide its CAG-only indication to Remote UE if the UE-to-Network Relay is only permitted to access a CAG cell. The CAG identifiers and CAG-only indication are provided to Remote UEs for UE-to-Network Relay selection during discovery procedure.
  A UE-to-Network Relay may send an update of the CAG identifiers and CAG-only indication to the remote UEs due to UE-to-Network Relay's mobility or UE-to-Network Relay's configuration change, e.g. UE Configuration Update procedure described in TS 23.502 [8] in clause 4.2.4.2. In this case, the Remote UE may tear down the PC5 connection and re-select another UE-to-Network Relay if the Remote UE determines that it is not allowed anymore to access the network via the current UE-to-Network Relay or may re-select the same UE-to-Network Relay if it is still allowed considering the new configuration.
  NOTE 2: The above two bullets on CAG identifiers changing and CAG-only indication will be evaluated separately from other part of solution 7.

6.7.2.7.2 Other

Mobility of a Remote UE within an NG-RAN node will be handled by the NG-RAN and the UE-to-Network Relay, allowing the Remote UE to maintain service when changing from a direct network connection to an indirect network connection (i.e. via L2 UE-to-Network Relay UE) and vice-versa without 5GC involvement.

Figure 10:
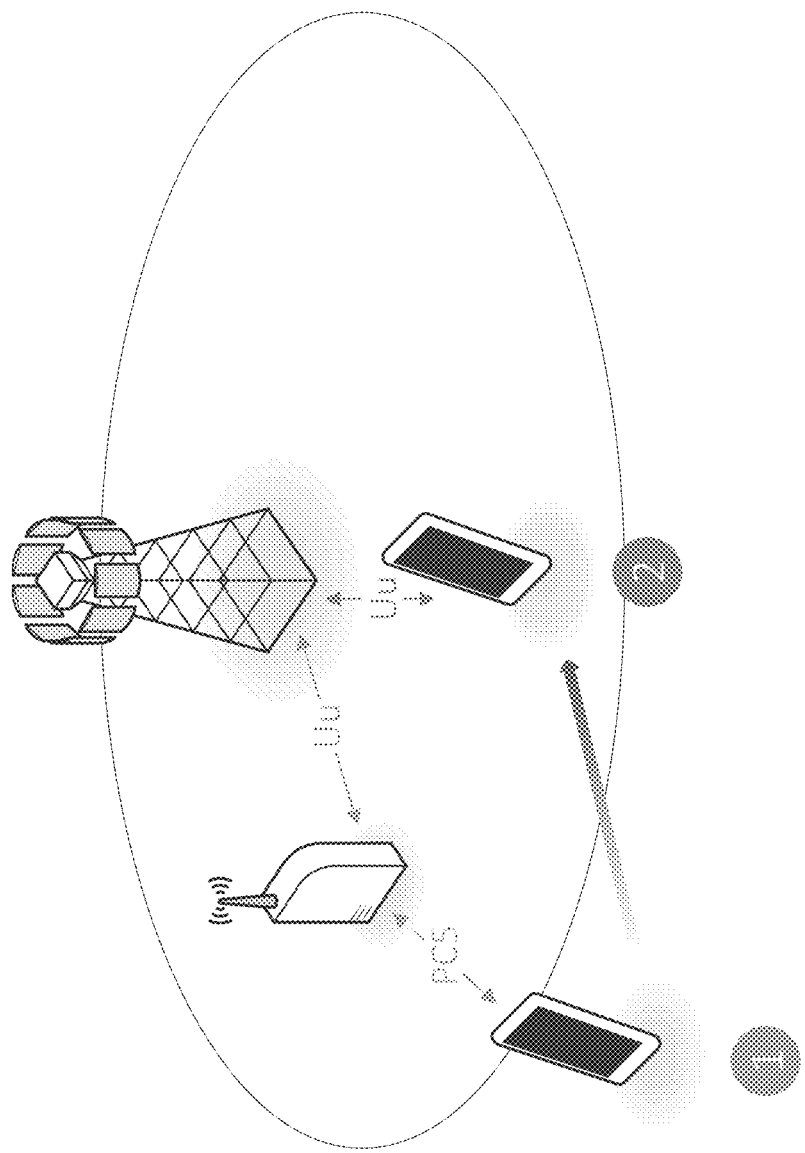
FIG. 10 is a reproduction of FIG. 6.7.2.6-1 of 3GPP TR 23.752 V0.5.1.

FIG. 6.7.2.6-1 of 3GPP TR 23.752 V0.5.1, Entitled "Intra-NG-RAN Mobility (No 5GC Involvement)", is Reproduced as FIG. 10

Inter-NG-RAN mobility is depicted below. Mobility is expected to be possible with no impact on NAS and most impact on lower layers i.e. RAN WG2.

Figure 11:
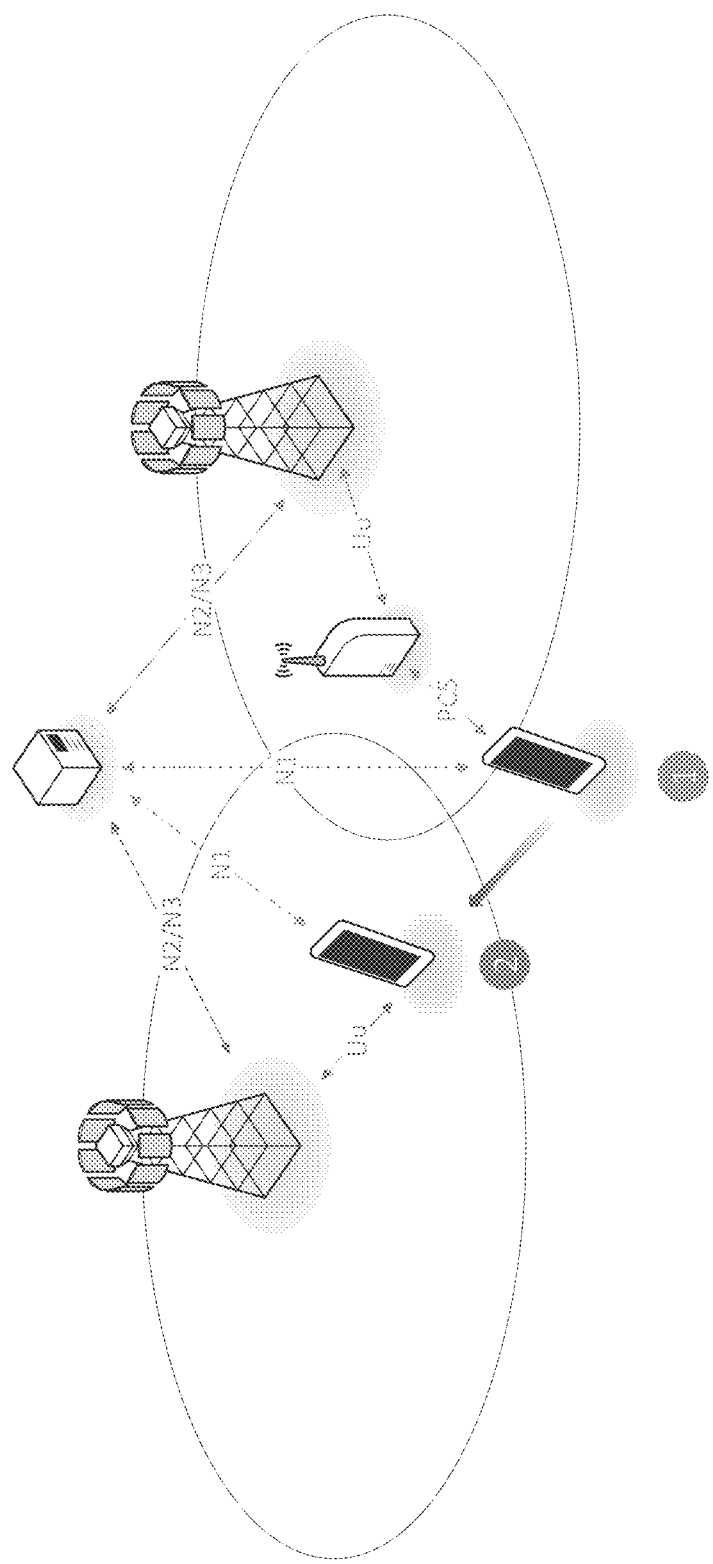
FIG. 11 is a reproduction of FIG. 6.7.2.6-2 of 3GPP TR 23.752 V0.5.1.

FIG. 6.7.2.6-2 of 3GPP TR 23.752 V0.5.1, Entitled "Inter-NG-RAN Mobility", is Reproduced as FIG. 11

6.7.2.8 Security

Security (confidentiality and integrity protection) is enforced at the PDCP layer between the endpoints at the Remote UE and the gNB. The PDCP traffic is relayed securely over two links, one between the Remote UE and the UE-to-Network Relay UE and the other between the UE-to-Network Relay UE to the gNB without exposing any of the Remote UE's plaintext data to the UE-to-Network Relay.

UP integrity protection is separated for direct PC5 communication and indirect communication. For indirect communication, the NG-RAN and Remote UE are the nodes that enforce the UP integrity protection for data transmission between NG-RAN and Remote UE.

For direct PC5 communication, the UE-to-Network Relay UE and Remote UE are the nodes that enforce the UP integrity protection for data transmission between UE-to-Network Relay UE and Remote UE.

NOTE: Further analysis of security requirements will be done in SA WG3.

6.7.2.9 UE-to-Network Relay Discovery and Selection

Model A and Model B can be applied for Layer-2 UE-to-Network Relay discovery. The detailed UE-to-Network Relay discovery and selection solution for Layer-2 UE-to-Network Relay could reuse Solution #19, with the difference that slicing and DNN information do not need to be considered. In addition, mobility restrictions related information such as CAG cell and TA may to be included in the discovery message.

Editor's note: How the Relay discovery can be performed with the PLMN selection for the Remote UE will be addressed in separate solution for KI #3.

6.7.2.10 Path Selection

For initial access, Remote UE may perform communication path selection between direct Uu path and indirect Uu path based on the link quality and the configured threshold (pre-configured or provided by NG-RAN). For example, if Uu link quality exceeds configured threshold, the direct Uu path is selected. Otherwise, the indirect Uu path is selected by performing the UE-to-Network Relay discovery and selection.

For path switch case, NG-RAN may perform communication path selection based on the signal level/quality of different paths, which may be based on the path switch solution.

Editor's note: The final solution should be coordinated with RAN WG, and the specific radio criteria and corresponding thresholds are subject to RAN WG definition.

6.7.3 Procedures

Figure 12:
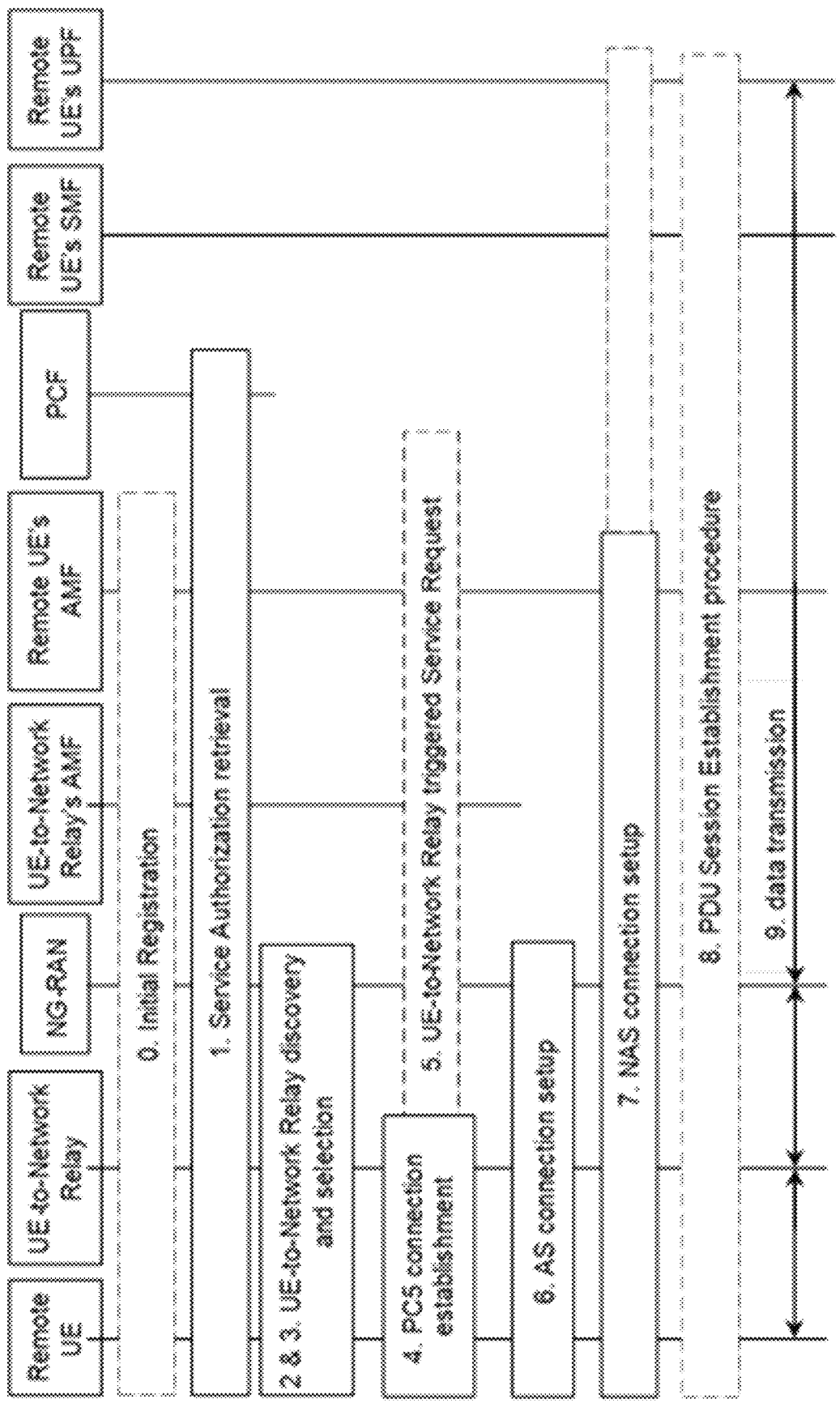
FIG. 12 is a reproduction of FIG. 6.7.3-1 of 3GPP TR 23.752 V0.5.1.

FIG. 6.7.3-1 of 3GPP TR 23.752 V0.5.1, Entitled "Connection Establishment for Indirect Communication Via UE-to-Network Relay UE", is Reproduced as FIG. 12

0. If in coverage, the Remote UE and UE-to-Network Relay UE may independently perform the initial registration to the network according to registration procedures in TS 23.502 [8]. The allocated 5G GUTI of the Remote UE is maintained when later NAS signalling between Remote UE and Network is exchanged via the UE-to-Network Relay UE.
NOTE 1: The current procedures shown here assume a single hop relay.
1. If in coverage, the Remote UE and UE-to-Network Relay UE independently get the service authorization for indirect communication from the network. Service authorization and parameters provisioning for UE-to-Network Relay operation are performed for the UE-to-Network Relay UE and Remote UE as specified in clause 6.7.2.4.
    If the Remote UE is not in coverage, the pre-configured information will be used. If needed, the PCF could update the authorization information after step 7.
If Remote UE has not performed the Initial Registration, the Remote UE can perform the Initial Registration via the Indirect Network Communication in step 7.
2-3. The Remote UE and UE-to-Network Relay UE perform UE-to-Network Relay UE discovery and selection. Relay UE can perform UE-to-Network Relay discovery in both CM_IDLE and CM_CM-CONNECTED.
For details of UE-to-Network Relay discovery and selection for Layer-2 UE-to-Network Relay see clause 6.7.2.9 and Solution #19, Solution #41.
4. Remote UE initiates a one-to-one communication connection with the selected UE-to-Network Relay UE over PC5 using the procedure as described in TS 23.287 [5].
5. If the UE-to-Network Relay UE is in CM_IDLE state, triggered by the communication request received from the Remote UE, the UE-to-Network Relay UE sends a Service Request message to its serving AMF.
    The Relay's AMF may perform authentication of the UE-to-Network Relay UE based on NAS message validation and if needed the AMF will check the subscription data.
How to keep the Relay UE in CM_CONNECTED state is proposed in the clause 6.7.2.5.2.
6. Remote UE sends AS messages to the NG-RAN via the UE-to-NW Relay UE, to establish an AS Connection with the same NG-RAN serving the Relay UE.
7. Remote UE sends a NAS message to the serving AMF. The NAS message is encapsulated in an RRC message that is sent over PC5 to the UE-to-Network Relay UE, and the UE-to-Network Relay UE forwards the message to the NG-RAN. The NG-RAN derives Remote UE's serving AMF and forwards the NAS message to this AMF.
    If Remote UE has not performed the initial registration to the network in step 0, the NAS message is initial registration message. Otherwise, the NAS message is either a service request message, or a mobility or periodic Registration message.
    Editor's note: How the UE-to-Network Relay UE forwards the message to the NG-RAN depends on RAN specified L2 relay method.
    If the Remote UE performs initial registration via the UE-to-Network relay, the Remote UE's serving AMF may perform authentication of the Remote UE based on NAS message validation and if needed the Remote UE's AMF checks the subscription data.
For service request case, User Plane connection for PDU Sessions can also be activated. The other steps follow the clause 4.2.3.2 in TS 23.502 [8].
8. Remote UE may trigger the PDU Session Establishment procedure as defined in clause 4.3.2.2 of TS 23.502 [8]. Remote UE allowed PDU session related attributes while operating via the UE-to-NW Relay UE are provided during the registration procedure or through pre-configuration as described in step 0.
9. The data is transmitted between Remote UE and UPF via UE-to-Network Relay UE and NG-RAN. The UE-to-Network Relay UE forwards all the data messages between the Remote UE and NG-RAN using RAN specified L2 relay method.
NOTE 2: If the UE-to-Network Relay disconnects, the NG-RAN will trigger the AN release procedure of the Remote UE and the Remote UE goes to CM-IDLE.
6.7.4 Impacts on Services, Entities and Interfaces
The solution has impacts in the following entities:
AMF:
    Not initiate the release of the signalling connection based on authorization of Relay UE. RAN:
    Needs to support L2 relay functionality for forwarding the signalling and user data of the Remote UE.
    (If paging option 2 of TR 36.746 [27] is confirmed by RAN WG2), RAN needs to handle paging request for Remote UE when the Relay UE is CM-CONNECTED.
UE-to-Network Relay UE:
    Needs to support L2 relay functionality for forwarding the signalling and user data between the Remote UE and RAN.
    (If paging option 2 of TR 36.746 [27] is confirmed by RAN WG2) need to monitor multiple paging occasions for itself and the remote UEs.
[ . . . ]
    3GPP TS 38.321 introduced the following:
5.1 Random Access Procedure
5.1.1 Random Access Procedure Initialization
The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-PreambleIndex different from 0b000000.
    NOTE 1: If a new Random Access procedure is triggered while another is already ongoing in the MAC entity, it is up to UE implementation whether to continue with the ongoing procedure or start with the new procedure (e.g. for SI request).
    NOTE 2: If there was an ongoing Random Access procedure that is triggered by a PDCCH order while the UE receives another PDCCH order indicating the same Random Access Preamble, PRACH mask index and uplink carrier, the Random Access procedure is considered as the same Random Access procedure as the ongoing one and not initialized again.

RRC configures the following parameters for the Random Access procedure:

prach-ConfigurationIndex: the available set of PRACH occasions for the transmission of the Random Access Preamble for Msg1. These are also applicable to the MSGA PRACH if the PRACH occasions are shared between 2-step and 4-step RA types;

prach-ConfigurationPeriodScaling-IAB: the scaling factor defined in TS 38.211 [8] and applicable to IAB-MTs, extending the periodicity of the PRACH occasions baseline configuration indicated by prach-ConfigurationIndex;

prach-ConfigurationFrameOffset-IAB: the frame offset defined in TS 38.211 [8] and applicable to IAB-MTs, altering the ROs frame defined in the baseline configuration indicated by prach-ConfigurationIndex;

prach-ConfigurationSOffset-IAB: the subframe/slot offset defined in TS 38.211 [8] and applicable to IAB-MTs, altering the ROs subframe or slot defined in the baseline configuration indicated by prach-ConfigurationIndex;

msgA-prach-ConfigurationIndex: the available set of PRACH occasions for the transmission of the Random Access Preamble for MSGA in 2-step RA type;

preambleReceivedTargetPower: initial Random Access Preamble power for 4-step RA type;

msgA-PreambleReceivedTargetPower: initial Random Access Preamble power for 2-step RA type;

rsrp-ThresholdSSB: an RSRP threshold for the selection of the SSB for 4-step RA type. If the Random Access procedure is initiated for beam failure recovery, rsrp-ThresholdSSB used for the selection of the SSB within candidateBeamRSList refers to rsrp-ThresholdSSB in BeamFailureRecoveryConfig IE;

rsrp-ThresholdCSI-RS: an RSRP threshold for the selection of CSI-RS for 4-step RA type. If the Random Access procedure is initiated for beam failure recovery, rsrp-ThresholdCSI-RS is equal to rsrp-ThresholdSSB in BeamFailureRecoveryConfig IE;

msgA-RSRP-ThresholdSSB: an RSRP threshold for the selection of the SSB for 2-step RA type;

rsrp-ThresholdSSB-SUL: an RSRP threshold for the selection between the NUL carrier and the SUL carrier;

msgA-RSRP-Threshold: an RSRP threshold for selection between 2-step RA type and 4-step RA type when both 2-step and 4-step RA type Random Access Resources are configured in the UL BWP;

msgA-TransMax: The maximum number of MSGA transmissions when both 4-step and 2-step RA type Random Access Resources are configured;

candidateBeamRSList: a list of reference signals (CSI-RS and/or SSB) identifying the candidate beams for recovery and the associated Random Access parameters;

recoverySearchSpaceId: the search space identity for monitoring the response of the beam failure recovery request;

powerRampingStep: the power-ramping factor;

msgA-PreamblePowerRampingStep: the power ramping factor for MSGA preamble;

powerRampingStepHighPriority: the power-ramping factor in case of prioritized Random Access procedure;

scalingFactorBI: a scaling factor for prioritized Random Access procedure;

ra-PreambleIndex: Random Access Preamble;

ra-ssb-OccasionMaskIndex: defines PRACH occasion(s) associated with an SSB in which the MAC entity may transmit a Random Access Preamble (see clause 7.4);

msgA-SSB-SharedRO-MaskIndex: Indicates the subset of 4-step RA type PRACH occasions shared with 2-step RA type PRACH occasions for each SSB. If 2-step RA type PRACH occasions are shared with 4-step RA type PRACH occasions and msgA-SSB-SharedRO-MaskIndex is not configured, then all 4-step RA type PRACH occasions are available for 2-step RA type (see clause 7.4);

ra-OccasionList: defines PRACH occasion(s) associated with a CSI-RS in which the MAC entity may transmit a Random Access Preamble;

ra-PreambleStartIndex: the starting index of Random Access Preamble(s) for on-demand SI request;

preambleTransMax: the maximum number of Random Access Preamble transmission;

ssb-perRACH-OccasionAndCB-PreamblesPerSSB: defines the number of SSBs mapped to each PRACH occasion for 4-step RA type and the number of contention-based Random Access Preambles mapped to each SSB;

msgA-CB-PreamblesPerSSB-PerSharedRO: defines the number of contention-based Random Access Preambles for 2-step RA type mapped to each SSB when the PRACH occasions are shared between 2-step and 4-step RA types;

msgA-SSB-PerRACH-OccasionAndCB-PreamblesPerSSB: defines the number of SSBs mapped to each PRACH occasion for 2-step RA type and the number of contention-based Random Access Preambles mapped to each SSB;

msgA-PUSCH-ResourceGroupA: defines MSGA PUSCH resources that the UE shall use when performing MSGA transmission using Random Access Preambles group A;

msgA-PUSCH-ResourceGroupB: defines MSGA PUSCH resources that the UE shall use when performing MSGA transmission using Random Access Preambles group B;

msgA-PUSCH-resource-Index: identifies the index of the PUSCH resource used for MSGA in case of contention-free Random Access with 2-step RA type;

if groupBconfigured is configured, then Random Access Preambles group B is configured for 4-step RA type.
  Amongst the contention-based Random Access Preambles associated with an SSB (as defined in TS 38.213 [6]), the first numberOfRA-PreamblesGroupA Random Access Preambles belong to Random Access Preambles group A. The remaining Random Access Preambles associated with the SSB belong to Random Access Preambles group B (if configured).

if groupB-ConfiguredTwoStepRA is configured, then Random Access Preambles group B is configured for 2-step RA type.
  Amongst the contention-based Random Access Preambles for 2-step RA type associated with an SSB (as defined in TS 38.213 [6]), the first msgA-numberOfRA-PreamblesGroupA Random Access Preambles belong to Random Access Preambles group A. The remaining Random Access Preambles associated with the SSB belong to Random Access Preambles group B (if configured).

NOTE 3: If Random Access Preambles group B is supported by the cell Random Access Preambles group B is included for each SSB.

if Random Access Preambles group B is configured for 4-step RA type:
  ra-Msg3SizeGroupA: the threshold to determine the groups of Random Access Preambles for 4-step RA type;
  msg3-DeltaPreamble: $\Delta_{PREAMBLE\_Msg3}$ in TS 38.213 [6];
  messagePowerOffsetGroupB: the power offset for preamble selection;
  numberOfRA-PreamblesGroupA: defines the number of Random Access Preambles in Random Access Preamble group A for each SSB.

if Random Access Preambles group B is configured for 2-step RA type:
  msgA-DeltaPreamble: $\Delta_{MsgA\_PUSCH}$ in TS 38.213 [6];
  msgA-messagePowerOffsetGroupB: the power offset for preamble selection configured as messagePowerOffsetGroupB included in GroupB-ConfiguredTwoStepRA;
  msgA-numberOfRA-PreamblesGroupA: defines the number of Random Access Preambles in Random Access Preamble group A for each SSB configured as numberofRA-PreamblesGroupA in GroupB-ConfiguredTwoStepRA;
  ra-MsgA-SizeGroupA: the threshold to determine the groups of Random Access Preambles for 2-step RA type.

the set of Random Access Preambles and/or PRACH occasions for SI request, if any;
the set of Random Access Preambles and/or PRACH occasions for beam failure recovery request, if any;
the set of Random Access Preambles and/or PRACH occasions for reconfiguration with sync, if any;
ra-ResponseWindow: the time window to monitor RA response(s) (SpCell only);
ra-ContentionResolution Timer: the Contention Resolution Timer (SpCell only);
msgB-ResponseWindow: the time window to monitor RA response(s) for 2-step RA type (SpCell only).

In addition, the following information for related Serving Cell is assumed to be available for UEs:
  if Random Access Preambles group B is configured:
    if the Serving Cell for the Random Access procedure is configured with supplementary uplink as specified in TS 38.331 [5], and SUL carrier is selected for performing Random Access Procedure:
      $P_{CMAX,f,c}$ of the SUL carrier as specified in TS 38.101-1 [14], TS 38.101-2 [15], and TS 38.101-3 [16].
    else:
      $P_{CMAX,f,c}$ of the NUL carrier as specified in TS 38.101-1 [14], TS 38.101-2 [15], and TS 38.101-3 [16].

The following UE variables are used for the Random Access procedure:
  PREAMBLE_INDEX;
  PREAMBLE_TRANSMISSION_COUNTER;
  PREAMBLE_POWER_RAMPING_COUNTER;
  PREAMBLE_POWER_RAMPING_STEP;
  PREAMBLE_RECEIVED_TARGET_POWER;
  PREAMBLE_BACKOFF;
  PCMAX;
  SCALING_FACTOR_BI;
  TEMPORARY_C-RNTI;
  RA_TYPE;
  POWER_OFFSET_2STEP_RA;
  MSGA_PREAMBLE_POWER_RAMPING_STEP.

When the Random Access procedure is initiated on a Serving Cell, the MAC entity shall:
  1> flush the Msg3 buffer;
  1> flush the MSGA buffer;
  1> set the PREAMBLE_TRANSMISSION_COUNTER to 1;
  1> set the PREAMBLE_POWER_RAMPING_COUNTER to 1;
  1> set the PREAMBLE_BACKOFF to 0 ms;
  1> set POWER_OFFSET_2STEP_RA to 0 dB;
  1> if the carrier to use for the Random Access procedure is explicitly signalled:
    2> select the signalled carrier for performing Random Access procedure;
    2> set the PCMAX to $P_{CMAX,f,c}$ of the signalled carrier.
  1> else if the carrier to use for the Random Access procedure is not explicitly signalled; and
  1> if the Serving Cell for the Random Access procedure is configured with supplementary uplink as specified in TS 38.331 [5]; and
  1> if the RSRP of the downlink pathloss reference is less than rsrp-ThresholdSSB-SUL:
    2> select the SUL carrier for performing Random Access procedure;
    2> set the PCMAX to $P_{CMAX,f,c}$ of the SUL carrier.
  1> else:
    2> select the NUL carrier for performing Random Access procedure;
    2> set the PCMAX to $P_{CMAX,f,c}$ of the NUL carrier.
  1> perform the BWP operation as specified in clause 5.15;
  1> if the Random Access procedure is initiated by PDCCH order and if the ra-PreambleIndex explicitly provided by PDCCH is not 0b000000; or
  1> if the Random Access procedure was initiated for SI request (as specified in TS 38.331 [5]) and the Random Access Resources for SI request have been explicitly provided by RRC; or
  1> if the Random Access procedure was initiated for SpCell beam failure recovery (as specified in clause 5.17) and if the contention-free Random Access Resources for beam failure recovery request for 4-step RA type have been explicitly provided by RRC for the BWP selected for Random Access procedure; or
  1> if the Random Access procedure was initiated for reconfiguration with sync and if the contention-free Random Access Resources for 4-step RA type have been explicitly provided in rach-ConfigDedicated for the BWP selected for Random Access procedure:
    2> set the RA_TYPE to 4-stepRA.
  1> else if the BWP selected for Random Access procedure is configured with both 2-step and 4-step RA type Random Access Resources and the RSRP of the downlink pathloss reference is above msgA-RSRP-Threshold; or
  1> if the BWP selected for Random Access procedure is only configured with 2-step RA type Random Access resources (i.e. no 4-step RACH RA type resources configured); or
  1> if the Random Access procedure was initiated for reconfiguration with sync and if the contention-free Random Access Resources for 2-step RA type have been explicitly provided in rach-ConfigDedicated for the BWP selected for Random Access procedure:
  2> set the RA_TYPE to 2-stepRA.
1> else:
  2> set the RA_TYPE to 4-stepRA.
1> perform initialization of variables specific to Random Access type as specified in clause 5.1.1a;
1> if RA_TYPE is set to 2-stepRA:
  2> perform the Random Access Resource selection procedure for 2-step RA type (see clause 5.1.2a).
1> else:
  2> perform the Random Access Resource selection procedure (see clause 5.1.2).
[ . . . ]
5.1.2 Random Access Resource Selection
If the selected RA_TYPE is set to 4-stepRA, the MAC entity shall:
  1> if the Random Access procedure was initiated for SpCell beam failure recovery (as specified in clause 5.17); and
  1> if the beamFailureRecoveryTimer (in clause 5.17) is either running or not configured; and
  1> if the contention-free Random Access Resources for beam failure recovery request associated with any of the SSBs and/or CSI-RSs have been explicitly provided by RRC; and
  1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
    2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
    2> if CSI-RS is selected, and there is no ra-PreambleIndex associated with the selected CSI-RS:
      3> set the PREAMBLE_INDEX to a ra-PreambleIndex corresponding to the SSB in candidateBeamRSList which is quasi-colocated with the selected CSI-RS as specified in TS 38.214 [7].
    2> else:
      3> set the PREAMBLE_INDEX to a ra-PreambleIndex corresponding to the selected SSB or CSI-RS from the set of Random Access Preambles for beam failure recovery request.
  1> else if the ra-PreambleIndex has been explicitly provided by PDCCH; and
  1> if the ra-PreambleIndex is not 0b000000:
    2> set the PREAMBLE_INDEX to the signalled ra-PreambleIndex;
    2> select the SSB signalled by PDCCH.
  1> else if the contention-free Random Access Resources associated with SSBs have been explicitly provided in rach-ConfigDedicated and at least one SSB with SS-RSRP above rsrp-ThresholdSSB amongst the associated SSBs is available:
    2> select an SSB with SS-RSRP above rsrp-ThresholdSSB amongst the associated SSBs;
    2> set the PREAMBLE_INDEX to a ra-PreambleIndex corresponding to the selected SSB.
  1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
    2> select a CSI-RS with CSI-RSRP above rsrp-ThresholdCSI-RS amongst the associated CSI-RSs;
    2> set the PREAMBLE_INDEX to a ra-PreambleIndex corresponding to the selected CSI-RS.
  1> else if the Random Access procedure was initiated for SI request (as specified in TS 38.331 [5]); and
  1> if the Random Access Resources for SI request have been explicitly provided by RRC:
    2> if at least one of the SSBs with SS-RSRP above rsrp-ThresholdSSB is available:
      3> select an SSB with SS-RSRP above rsrp-ThresholdSSB.
    2> else:
      3> select any SSB.
    2> select a Random Access Preamble corresponding to the selected SSB, from the Random Access Preamble(s) determined according to ra-PreambleStartIndex as specified in TS 38.331 [5];
    2> set the PREAMBLE_INDEX to selected Random Access Preamble.
  1> else (i.e. for the contention-based Random Access preamble selection):
    2> if at least one of the SSBs with SS-RSRP above rsrp-ThresholdSSB is available:
      3> select an SSB with SS-RSRP above rsrp-ThresholdSSB.
    2> else:
      3> select any SSB.
    2> if the RA_TYPE is switched from 2-stepRA to 4-stepRA:
      3> if a Random Access Preambles group was selected during the current Random Access procedure:
        4> select the same group of Random Access Preambles as was selected for the 2-step RA type.
      3> else:
        4> if Random Access Preambles group B is configured; and
        4> if the transport block size of the MSGA payload configured in the rach-ConfigDedicated corresponds to the transport block size of the MSGA payload associated with Random Access Preambles group B:
          5> select the Random Access Preambles group B.
        4> else:
          5> select the Random Access Preambles group A.
    2> else if Msg3 buffer is empty:
      3> if Random Access Preambles group B is configured:
        4> if the potential Msg3 size (UL data available for transmission plus MAC subheader and, where required, MAC CEs) is greater than ra-Msg3SizeGroupA and the pathloss is less than PCMAX (of the Serving Cell performing the Random Access Procedure)—preambleReceivedTargetPower-msg3—DeltaPreamble—messagePowerOffsetGroupB; or
        4> if the Random Access procedure was initiated for the CCCH logical channel and the CCCH SDU size plus MAC subheader is greater than ra-Msg3SizeGroupA:

5> select the Random Access Preambles group B.
4> else:
5> select the Random Access Preambles group A.
3> else:
4> select the Random Access Preambles group A.
2> else (i.e. Msg3 is being retransmitted):
3> select the same group of Random Access Preambles as was used for the Random Access Preamble transmission attempt corresponding to the first transmission of Msg3.
2> select a Random Access Preamble randomly with equal probability from the Random Access Preambles associated with the selected SSB and the selected Random Access Preambles group;
2> set the PREAMBLE_INDEX to the selected Random Access Preamble.
1> if the Random Access procedure was initiated for SI request (as specified in TS 38.331 [5]); and
1> if ra-AssociationPeriodIndex and si-RequestPeriod are configured:
2> determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to clause 8.1 of TS 38.213 [6] corresponding to the selected SSB).
1> else if an SSB is selected above:
2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to clause 8.1 of TS 38.213 [6], corresponding to the selected SSB; the MAC entity may take into account the possible occurrence of measurement gaps when determining the next available PRACH occasion corresponding to the selected SSB).
1> else if a CSI-RS is selected above:
2> if there is no contention-free Random Access Resource associated with the selected CSI-RS:
3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7] (the MAC entity shall select a PRACH occasion randomly with equal probability amongst the consecutive PRACH occasions according to clause 8.1 of TS 38.213 [6], corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
2> else:
3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1> perform the Random Access Preamble transmission procedure (see clause 5.1.3).
NOTE 1: When the UE determines if there is an SSB with SS-RSRP above rsrp-ThresholdSSB or a CSI-RS with CSI-RSRP above rsrp-ThresholdCSI-RS, the UE uses the latest unfiltered L1-RSRP measurement.
[ . . . ]
5.1.3 Random Access Preamble Transmission
The MAC entity shall, for each Random Access Preamble:
1> if PREAMBLE_TRANSMISSION_COUNTER is greater than one; and
1> if the notification of suspending power ramping counter has not been received from lower layers; and
1> if LBT failure indication was not received from lower layers for the last Random Access Preamble transmission; and
1> if SSB or CSI-RS selected is not changed from the selection in the last Random Access Preamble transmission:
2> increment PREAMBLE_POWER_RAMPING_COUNTER by 1.
1> select the value of DELTA_PREAMBLE according to clause 7.3;
1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA;
1> except for contention-free Random Access Preamble for beam failure recovery request, compute the RA-RNTI associated with the PRACH occasion in which the Random Access Preamble is transmitted;
1> instruct the physical layer to transmit the Random Access Preamble using the selected PRACH occasion, corresponding RA-RNTI (if available), PREAMBLE_INDEX, and PREAMBLE_RECEIVED_TARGET_POWER.
1> if LBT failure indication is received from lower layers for this Random Access Preamble transmission:
2> if lbt-FailureRecoveryConfig is configured:
3> perform the Random Access Resource selection procedure (see clause 5.1.2).
2> else:
3> increment PREAMBLE_TRANSMISSION_COUNTER by 1;
3> if PREAMBLE_TRANSMISSION_COUNTER=preambleTransMax+1:
4> if the Random Access Preamble is transmitted on the SpCell:
5> indicate a Random Access problem to upper layers;
5> if this Random Access procedure was triggered for SI request:
6> consider the Random Access procedure unsuccessfully completed.

4> else if the Random Access Preamble is transmitted on an SCell:
    5> consider the Random Access procedure unsuccessfully completed.
3> if the Random Access procedure is not completed:
    4> perform the Random Access Resource selection procedure (see clause 5.1.2). The RA-RNTI associated with the PRACH occasion in which the Random Access Preamble is transmitted, is computed as:

RA-RNTI=1+$s$_id+14×$t$_id+14×80×$f$_id+14×80×8×ul_carrier_id where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of p specified in clause 5.3.2 in TS 38.211 [8], f_id is the index of the PRACH occasion in the frequency domain (0≤f_id<8), and ul_carrier_id is the UL carrier used for Random Access Preamble transmission (0 for NUL carrier, and 1 for SUL carrier).
[ . . . ]
5.1.4 Random Access Response Reception
Once the Random Access Preamble is transmitted and regardless of the possible occurrence of a measurement gap, the MAC entity shall:
1> if the contention-free Random Access Preamble for beam failure recovery request was transmitted by the MAC entity:
    2> start the ra-ResponseWindow configured in BeamFailureRecoveryConfig at the first PDCCH occasion as specified in TS 38.213 [6] from the end of the Random Access Preamble transmission;
    2> monitor for a PDCCH transmission on the search space indicated by recoverySearchSpaceId of the SpCell identified by the C-RNTI while ra-ResponseWindow is running.
1> else:
    2> start the ra-ResponseWindow configured in RACH-ConfigCommon at the first PDCCH occasion as specified in TS 38.213 [6] from the end of the Random Access Preamble transmission;
    2> monitor the PDCCH of the SpCell for Random Access Response(s) identified by the RA-RNTI while the ra-ResponseWindow is running.
1> if notification of a reception of a PDCCH transmission on the search space indicated by recoverySearchSpaceId is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
    2> consider the Random Access procedure successfully completed.
1> else if a valid (as specified in TS 38.213 [6]) downlink assignment has been received on the PDCCH for the RA-RNTI and the received TB is successfully decoded:
    2> if the Random Access Response contains a MAC subPDU with Backoff Indicator:
        3> set the PREAMBLE_BACKOFF to value of the BI field of the MAC subPDU using Table 7.2-1, multiplied with SCALING_FACTOR_BI.
    2> else:
        3> set the PREAMBLE_BACKOFF to 0 ms.
    2> if the Random Access Response contains a MAC subPDU with Random Access Preamble identifier corresponding to the transmitted PREAMBLE_INDEX (see clause 5.1.3):
        3> consider this Random Access Response reception successful.
    2> if the Random Access Response reception is considered successful:
        3> if the Random Access Response includes a MAC subPDU with RAPID only:
            4> consider this Random Access procedure successfully completed;
            4> indicate the reception of an acknowledgement for SI request to upper layers.
        3> else:
            4> apply the following actions for the Serving Cell where the Random Access Preamble was transmitted:
                5> process the received Timing Advance Command (see clause 5.2);
                5> indicate the preambleReceivedTargetPower and the amount of power ramping applied to the latest Random Access Preamble transmission to lower layers (i.e. (PREAMBLE_POWER_RAMPING_COUNTER–1)×PREAMBLE_POWER_RAMPING_STEP);
                5> if the Random Access procedure for an SCell is performed on uplink carrier where puschConfig is not configured:
                    6> ignore the received UL grant.
                5> else:
                    6> process the received UL grant value and indicate it to the lower layers.
            4> if the Random Access Preamble was not selected by the MAC entity among the contention-based Random Access Preamble(s):
                5> consider the Random Access procedure successfully completed.
            4> else:
                5> set the TEMPORARY_C-RNTI to the value received in the Random Access Response;
                5> if this is the first successfully received Random Access Response within this Random Access procedure:
                    6> if the transmission is not being made for the CCCH logical channel:
                        7> indicate to the Multiplexing and assembly entity to include a C-RNTI MAC CE in the subsequent uplink transmission.
                    6> if the Random Access procedure was initiated for SpCell beam failure recovery:
                        7> indicate to the Multiplexing and assembly entity to include a BFR MAC CE or a Truncated BFR MAC CE in the subsequent uplink transmission.
                    6> obtain the MAC PDU to transmit from the Multiplexing and assembly entity and store it in the Msg3 buffer.
NOTE: If within a Random Access procedure, an uplink grant provided in the Random Access Response for the same group of contention-based Random Access Preambles has a different size than the first uplink grant allocated during that Random Access procedure, the UE behavior is not defined.
1> if ra-ResponseWindow configured in BeamFailureRecoveryConfig expires and if a PDCCH transmission on the search space indicated by recoverySearchSpaceId addressed to the C-RNTI has not been received on the Serving Cell where the preamble was transmitted; or 1> if ra-ResponseWindow configured in RACH-Config-Common expires, and if the Random Access Response containing Random Access Preamble identifiers that matches the transmitted PREAMBLE_INDEX has not been received:
  2> consider the Random Access Response reception not successful;
  2> increment PREAMBLE_TRANSMISSION_COUNTER by 1;
  2> if PREAMBLE_TRANSMISSION_COUNTER=preambleTransMax+1:
    3> if the Random Access Preamble is transmitted on the SpCell:
      4> indicate a Random Access problem to upper layers;
      4> if this Random Access procedure was triggered for SI request:
        5> consider the Random Access procedure unsuccessfully completed.
    3> else if the Random Access Preamble is transmitted on an SCell:
      4> consider the Random Access procedure unsuccessfully completed.
  2> if the Random Access procedure is not completed:
    3> select a random backoff time according to a uniform distribution between 0 and the PREAMBLE_BACKOFF;
    3> if the criteria (as defined in clause 5.1.2) to select contention-free Random Access Resources is met during the backoff time:
      4> perform the Random Access Resource selection procedure (see clause 5.1.2);
    3> else if the Random Access procedure for an SCell is performed on uplink carrier where pusch-Config is not configured:
      4> delay the subsequent Random Access transmission until the Random Access Procedure is triggered by a PDCCH order with the same ra-PreambleIndex, ra-ssb-OccasionMaskIndex, and UL/SUL indicator TS 38.212 [9].
    3> else:
      4> perform the Random Access Resource selection procedure (see clause 5.1.2) after the backoff time.

The MAC entity may stop ra-ResponseWindow (and hence monitoring for Random Access Response(s)) after successful reception of a Random Access Response containing Random Access Preamble identifiers that matches the transmitted PREAMBLE_INDEX.

HARQ operation is not applicable to the Random Access Response reception.

[ . . . ]

5.1.5 Contention Resolution

Once Msg3 is transmitted the MAC entity shall:
1> start the ra-ContentionResolutionTimer and restart the ra-ContentionResolutionTimer at each HARQ retransmission in the first symbol after the end of the Msg3 transmission;
1> monitor the PDCCH while the ra-ContentionResolutionTimer is running regardless of the possible occurrence of a measurement gap;
1> if notification of a reception of a PDCCH transmission of the SpCell is received from lower layers:
  2> if the C-RNTI MAC CE was included in Msg3:
    3> if the Random Access procedure was initiated for SpCell beam failure recovery (as specified in clause 5.17) and the PDCCH transmission is addressed to the C-RNTI; or
    3> if the Random Access procedure was initiated by a PDCCH order and the PDCCH transmission is addressed to the C-RNTI; or
    3> if the Random Access procedure was initiated by the MAC sublayer itself or by the RRC sublayer and the PDCCH transmission is addressed to the C-RNTI and contains a UL grant for a new transmission:
      4> consider this Contention Resolution successful;
      4> stop ra-ContentionResolutionTimer;
      4> discard the TEMPORARY_C-RNTI;
      4> consider this Random Access procedure successfully completed.
  2> else if the CCCH SDU was included in Msg3 and the PDCCH transmission is addressed to its TEMPORARY_C-RNTI:
    3> if the MAC PDU is successfully decoded:
      4> stop ra-ContentionResolutionTimer;
      4> if the MAC PDU contains a UE Contention Resolution Identity MAC CE; and
      4> if the UE Contention Resolution Identity in the MAC CE matches the CCCH SDU transmitted in Msg3:
        5> consider this Contention Resolution successful and finish the disassembly and demultiplexing of the MAC PDU;
        5> if this Random Access procedure was initiated for SI request:
          6> indicate the reception of an acknowledgement for SI request to upper layers.
        5> else:
          6> set the C-RNTI to the value of the TEMPORARY_C-RNTI;
        5> discard the TEMPORARY_C-RNTI;
        5> consider this Random Access procedure successfully completed.
      4> else:
        5> discard the TEMPORARY_C-RNTI;
        5> consider this Contention Resolution not successful and discard the successfully decoded MAC PDU.
1> if ra-ContentionResolutionTimer expires:
  2> discard the TEMPORARY_C-RNTI;
  2> consider the Contention Resolution not successful.
1> if the Contention Resolution is considered not successful:
  2> flush the HARQ buffer used for transmission of the MAC PDU in the Msg3 buffer;
  2> increment PREAMBLE_TRANSMISSION_COUNTER by 1;
  2> if PREAMBLE_TRANSMISSION_COUNTER=preambleTransMax+1:
    3> indicate a Random Access problem to upper layers.
    3> if this Random Access procedure was triggered for SI request:
      4> consider the Random Access procedure unsuccessfully completed.

2> if the Random Access procedure is not completed:
  3> if the RA_TYPE is set to 4-stepRA:
    4> select a random backoff time according to a uniform distribution between 0 and the PRE-AMBLE_BACKOFF;
    4> if the criteria (as defined in clause 5.1.2) to select contention-free Random Access Resources is met during the backoff time:
      5> perform the Random Access Resource selection procedure (see clause 5.1.2);
    4> else:
      5> perform the Random Access Resource selection procedure (see clause 5.1.2) after the backoff time.
  3> else (i.e. the RA_TYPE is set to 2-stepRA):
    4> if msgA-TransMax is applied (see clause 5.1.1a) and PREAMBLE_TRANSMISSION_COUNTER=msgA-TransMax+1:
      5> set the RA_TYPE to 4-stepRA;
      5> perform initialization of variables specific to Random Access type as specified in clause 5.1.1a;
      5> flush HARQ buffer used for the transmission of MAC PDU in the MSGA buffer;
      5> discard explicitly signalled contention-free 2-step RA type Random Access Resources, if any;
      5> perform the Random Access Resource selection as specified in clause 5.1.2.
    4> else:
      5> select a random backoff time according to a uniform distribution between 0 and the PRE-AMBLE_BACKOFF;
      5> if the criteria (as defined in clause 5.1.2a) to select contention-free Random Access Resources is met during the backoff time:
        6> perform the Random Access Resource selection procedure for 2-step RA type as specified in clause 5.1.2a.
      5> else:
        6> perform the Random Access Resource selection for 2-step RA type procedure (see clause 5.1.2a) after the backoff time.

5.1.6 Completion of the Random Access Procedure

Upon completion of the Random Access procedure, the MAC entity shall:
  1> discard any explicitly signalled contention-free Random Access Resources for 2-step RA type and 4-step RA type except the 4-step RA type contention-free Random Access Resources for beam failure recovery request, if any;
  1> flush the HARQ buffer used for transmission of the MAC PDU in the Msg3 buffer and the MSGA buffer.

Upon successful completion of the Random Access procedure initiated for DAPS handover, the target MAC entity shall:
  1> indicate the successful completion of the Random Access procedure to the upper layers.

3GPP TR 38.836 introduces the following:

4 Sidelink-Based UE-to-Network Relay 4.1 Scenarios, Assumptions and Requirements The UE-to-Network Relay enables coverage extension and power saving for the Remote UE. The coverage scenarios considered in this study are the following:

UE-to-Network Relay UE is in coverage and Remote UE is out of coverage
UE-to-Network Relay UE and Remote UE are both in coverage
For L3 UE-to-Network Relay, relay UE and remote UE can be in the same cell or different cells, after remote UE establishes connection via Relay UE
For L2 UE-to-Network Relay, it is supported as baseline that after remote UE connects via relay UE, relay UE and remote UE are controlled by the relay UE's serving cell
For L2 UE-to-Network Relay, both cases below are supported, i.e.
  Before remote connection via relay UE, relay UE and remote UE are in the same cell;
  Before remote connection via relay UE, relay UE and remote UE are in different cells;
The considered scenarios are reflected in FIG. 4.1-1.

Figure 13:
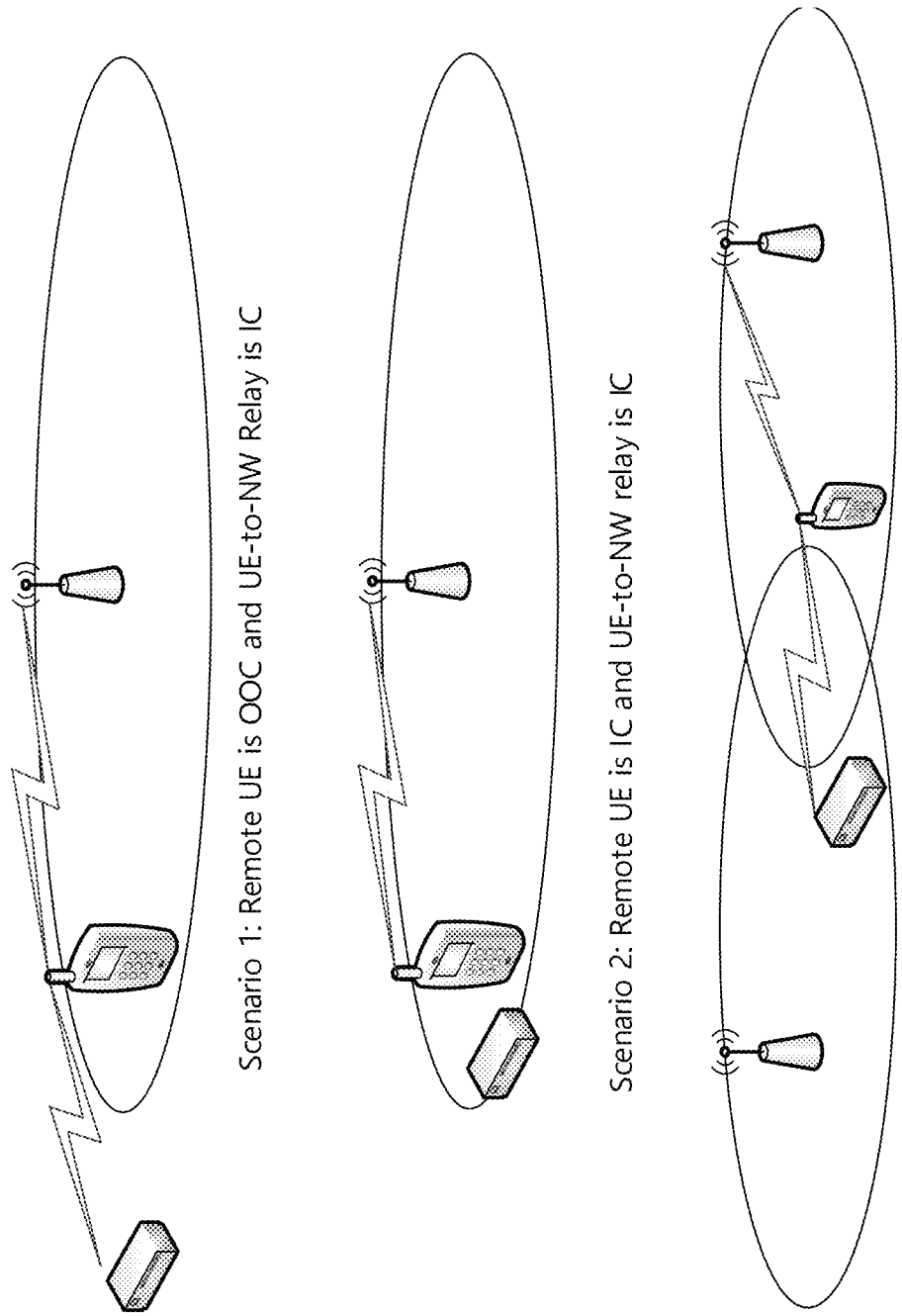
FIG. 13 is a reproduction of FIG. 4.1-1 of 3GPP TR 38.836 V1.0.0.

FIG. 4.1-1 of 3GPP TR 38.836 V0.2.0, Entitled "Scenarios for UE-to-Network Relay", is Reproduced as FIG. 13

NR Uu is assumed on the Uu link of the UE-to-Network Relay UE. NR sidelink is assumed on PC5 between the Remote UE(s) and the UE-to-Network Relay UE.

Cross-RAT configuration/control of UE (Remote UE or UE-to-Network Relay UE) is not considered, i.e., eNB/ng-eNB do not control/configure an NR Remote UE and UE-to-Network Relay UE. For UE-to-Network Relay, the study focuses on unicast data traffic between the Remote UE and the NW.

Configuring/scheduling of a UE (Remote UE or UE-to-Network Relay UE) by the SN to perform NR sidelink communication is out of scope of this study.

For UE-to-Network Relay, relaying of unicast data between the Remote UE and the network can occur after a PC5-RRC connection is established between the Relay UE and the Remote UE. The Uu RRC state of the relay UE and Remote UE can change when connected via PC5. Both Relay UE and Remote UE can perform relay discovery in any RRC state. A Remote UE can perform relay discovery while out of Uu coverage.

A Relay UE must be in RRC_CONNECTED to perform relaying of unicast data.

For L2 UE-to-Network Relay:
  Remote UE(s) must be in RRC_CONNECTED to perform transmission/reception of relayed unicast data.
  The Relay UE can be in RRC_IDLE, RRC_INACTIVE or RRC_CONNECTED as long as all the PC5-connected Remote UE(s) are in RRC_IDLE.
  The Relay UE can be in RRC_INACTIVE or RRC_CONNECTED as long as all the PC5-connected Remote UE(s) are in RRC_INACTIVE.

For L3 UE-to-Network Relay, both Relay UE and Remote UE can be in RRC_INACTIVE state. The requirement of service continuity is only for UE-to-Network Relay, but not for UE-to-UE Relay in this release.

RAN2 have studied the mobility scenario of "between direct (Uu) path and indirect (via the relay) path" for UE-to-Network relay. RAN2 focus on the mobility scenarios of intra-gNB cases in the study phase, and assume the inter-gNB cases will also be supported. For the inter-gNB cases, compared to the intra-gNB cases, potential different parts on Uu interface in details can be studied either in the SI phase or in the WI phase.RAN2 deprioritize work specific to the mobility scenario of "between indirect (via a first relay UE)

and indirect (via a second relay UE)" for path switching in the SI phase, which can be studied in the WI phase, if needed.

RAN2 deprioritize the group mobility scenario in the SI phase, which may be discussed in WI phase, if needed.

[ . . . ]

4.5 Layer-2 Relay
4.5.1 Architecture and Protocol Stack
4.5.1.1 Protocol Stack

The protocol stacks for the user plane and control plane of L2 UE-to-Network Relay architecture are described in FIG. 4.5.1.1-1 and FIG. 4.5.1.1-2 for the case where adaptation layer is not supported at the PC5 interface, and FIG. 4.5.1.1-3 and FIG. 4.5.1.1-4 for the case where adaptation layer is supported at the PC5 interface.

For L2 UE-to-Network Relay, the adaptation layer is placed over RLC sublayer for both CP and UP at the Uu interface between Relay UE and gNB. The Uu SDAP/PDCP and RRC are terminated between Remote UE and gNB, while RLC, MAC and PHY are terminated in each link (i.e. the link between Remote UE and UE-to-Network Relay UE and the link between UE-to-Network Relay UE and the gNB). Whether the adaptation layer is also supported at the PC5 interface between Remote UE and Relay UE is left to WI phase (assuming down-selection first before studying too much on the detailed PC5 adaptation layer functionalities).

Figure 14:
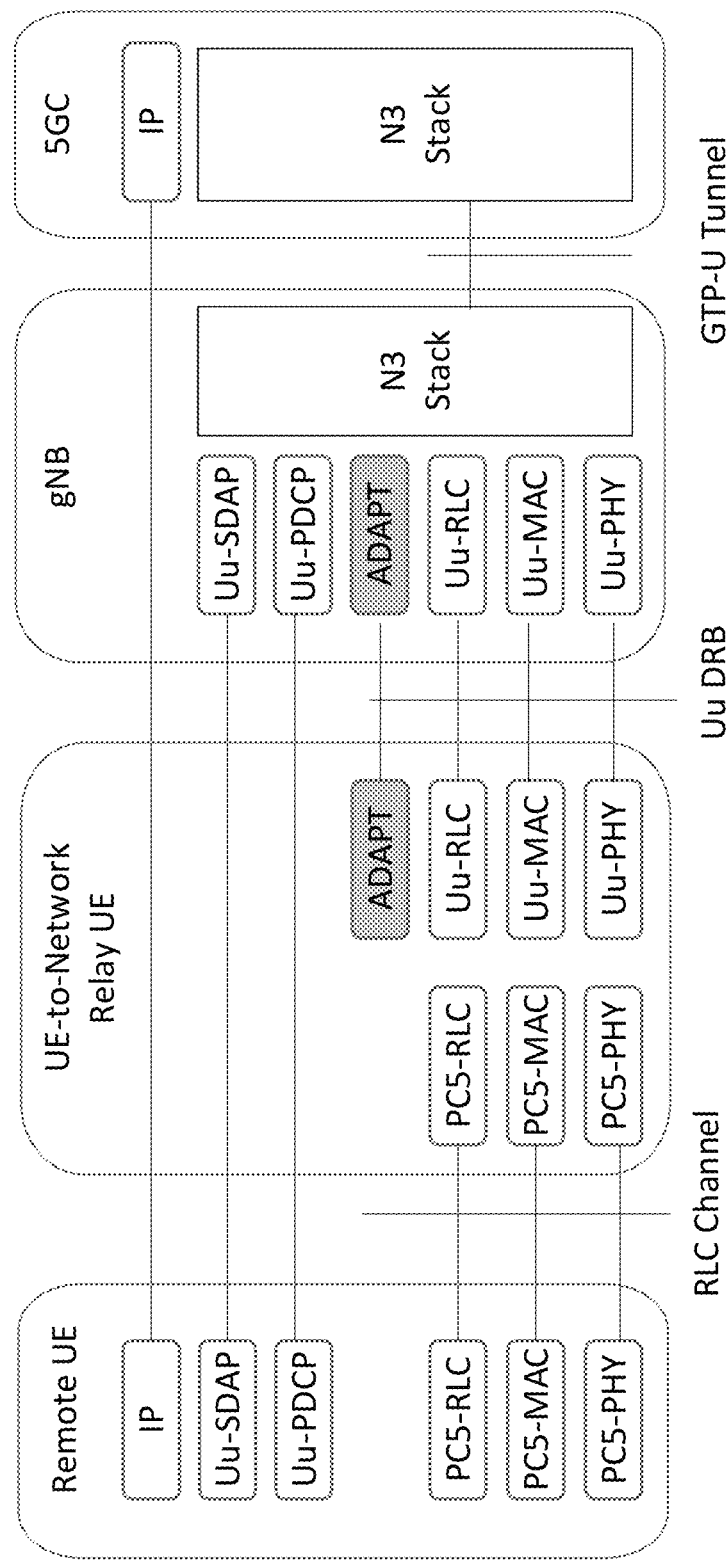
FIG. 14 is a reproduction of FIG. 4.5.1.1-1 of 3GPP TR 38.836 V1.0.0.

FIG. 4.5.1.1-1 of 3GPP TR 38.836 V0.2.0, Entitled "User Plane Protocol Stack for L2 UE-to-Network Relay (Adaptation Layer is not Supported at the PC5 Interface)", is Reproduced as FIG. 14

Figure 15:
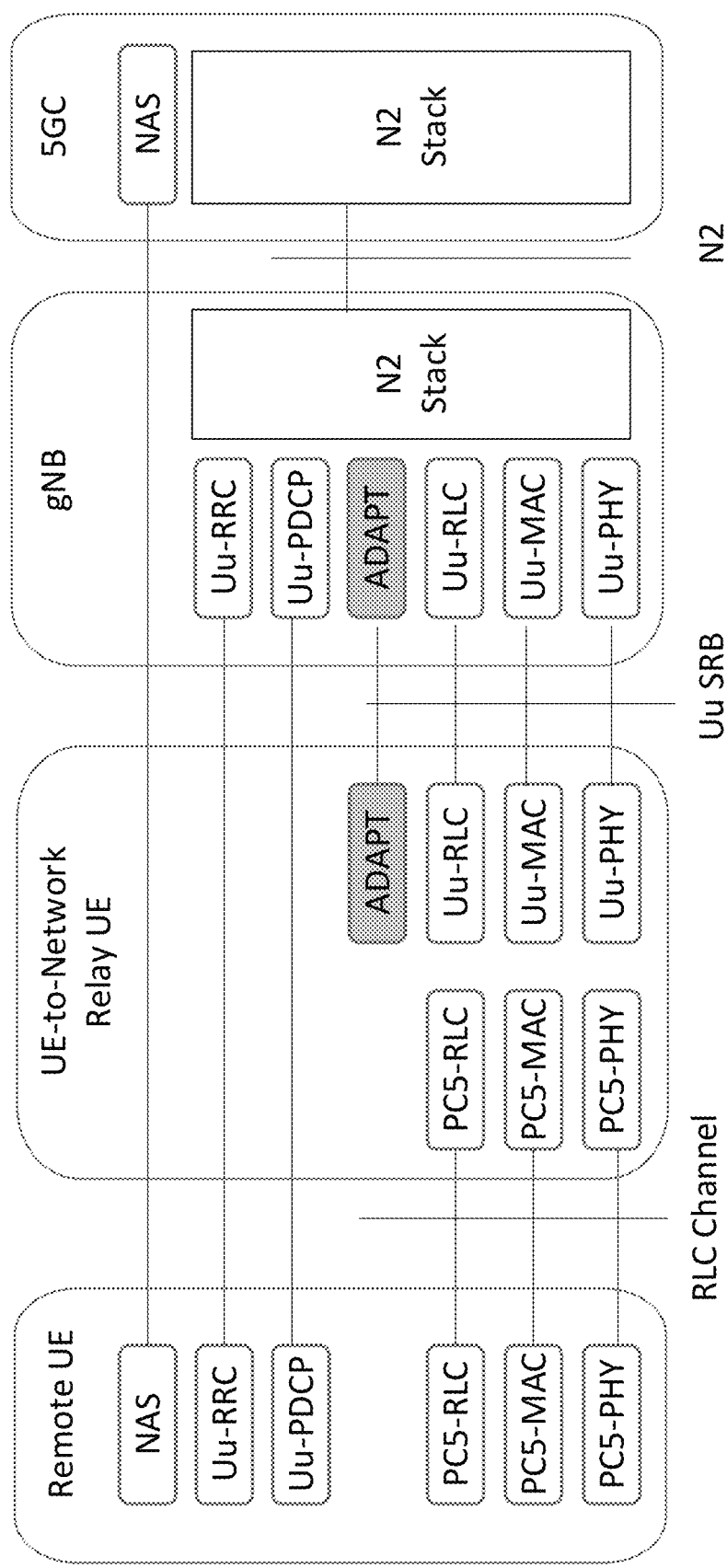
FIG. 15 is a reproduction of FIG. 4.5.1.1-2 of 3GPP TR 38.836 V1.0.0.

FIG. 4.5.1.1-2 of 3GPP TR 38.836 V0.2.0, Entitled "Control Plane Protocol Stack for L2 UE-to-Network Relay (Adaptation Layer is not Supported at the PC5 Interface)", is Reproduced as FIG. 15

Figure 16:
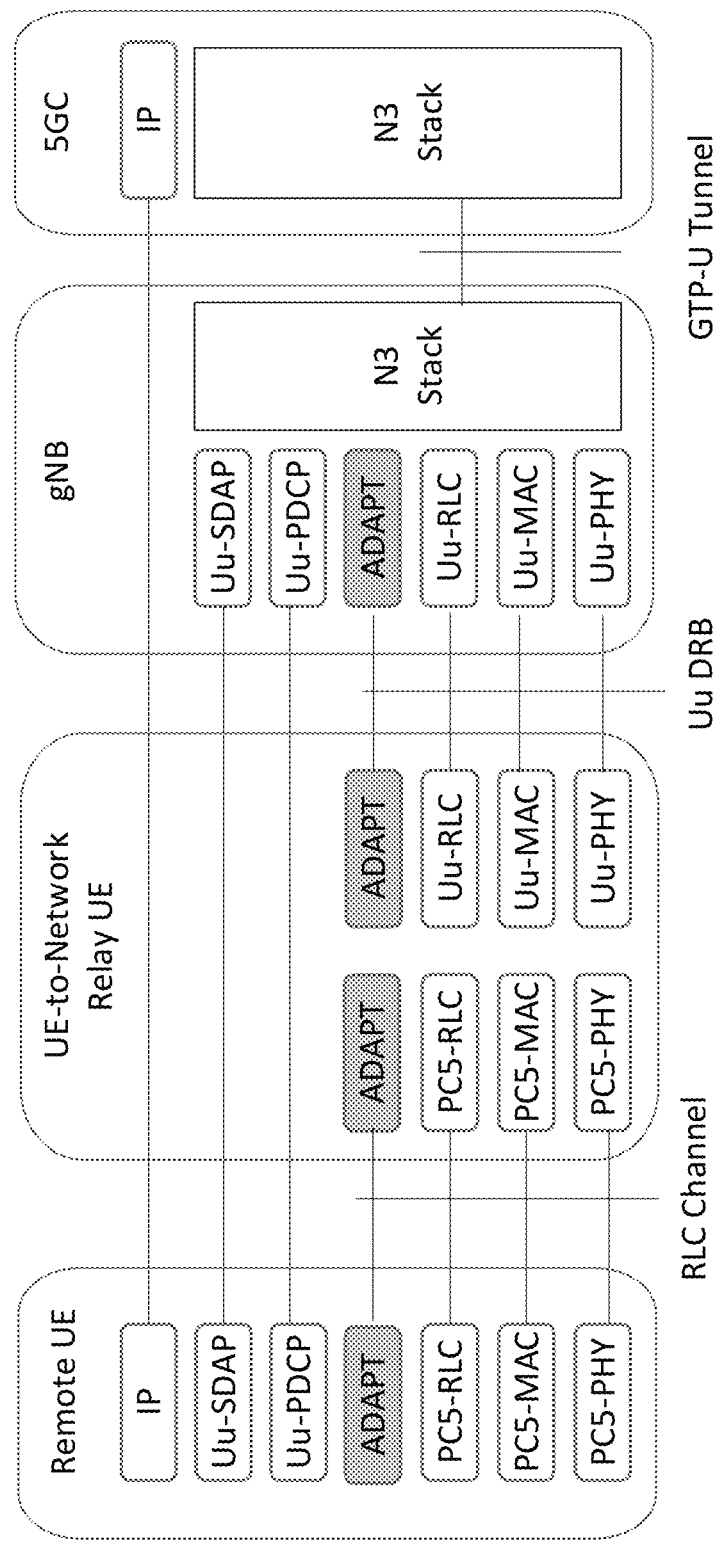
FIG. 16 is a reproduction of FIG. 4.5.1.1-3 of 3GPP TR 38.836 V1.0.0.

FIG. 4.5.1.1-3 of 3GPP TR 38.836 V0.2.0, Entitled "User Plane Protocol Stack for L2 UE-to-Network Relay (Adaptation Layer is Supported at the PC5 Interface)", is Reproduced as FIG. 16

Figure 17:
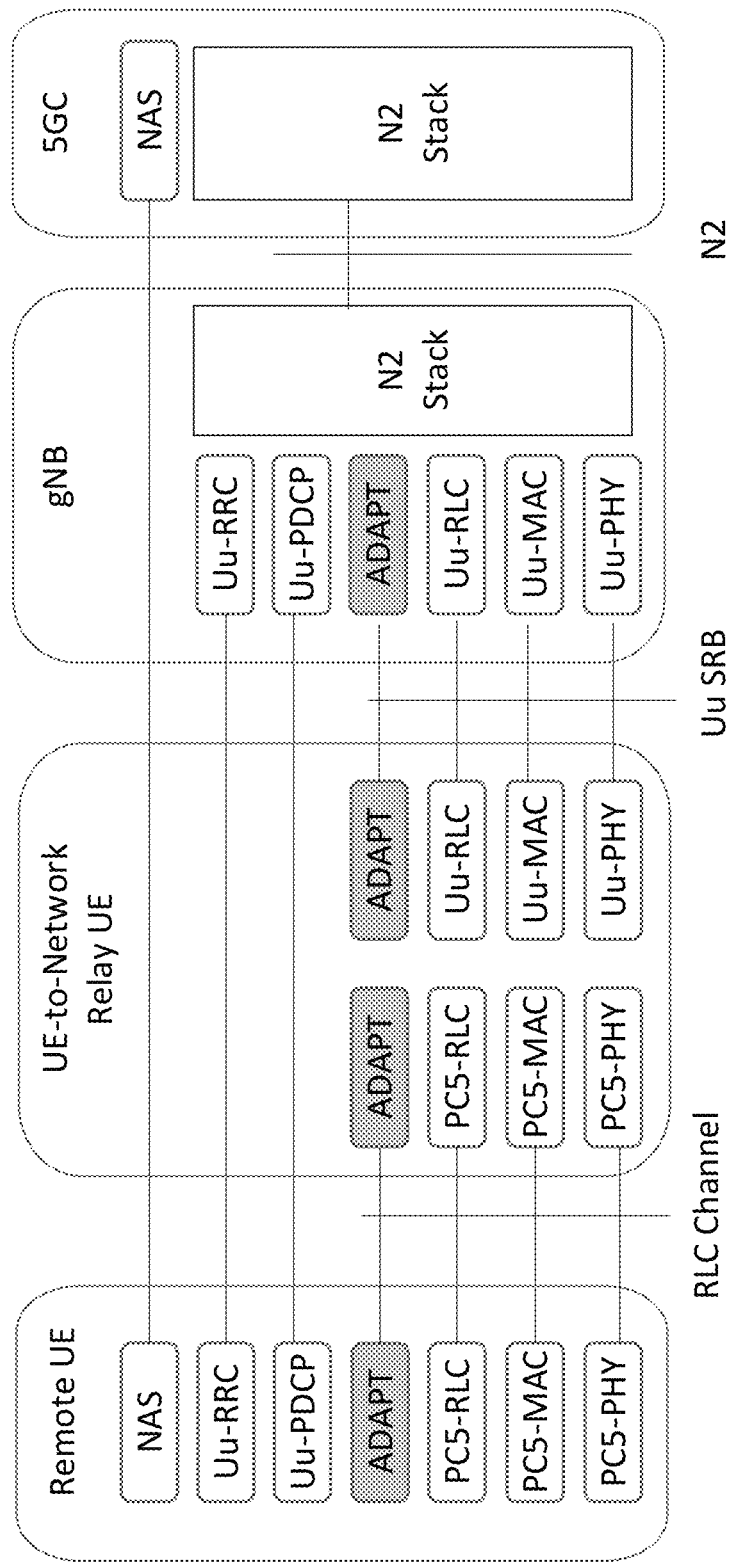
FIG. 17 is a reproduction of FIG. 4.5.1.1-4 of 3GPP TR 38.836 V1.0.0.

FIG. 4.5.1.1-4: Control Plane Protocol Stack for L2 UE-to-Network Relay (Adaptation Layer is Supported at the PC5 Interface)", is Reproduced as FIG. 17

4.5.1.2 Adaptation Layer Functionality
For L2 UE-to-Network Relay, for uplink
  The Uu adaptation layer at Relay UE supports UL bearer mapping between ingress PC5 RLC channels for relaying and egress Uu RLC channels over the Relay UE Uu path. For uplink relaying traffic, the different end-to-end RBs (SRB, DRB) of the same Remote UE and/or different Remote UEs can be subject to N:1 mapping and data multiplexing over one Uu RLC channel.
  The Uu adaptation layer is used to support Remote UE identification for the UL traffic (multiplexing the data coming from multiple Remote UE). The identity information of Remote UE Uu Radio Bearer and Remote UE is included in the Uu adaptation layer at UL in order for gNB to correlate the received data packets for the specific PDCP entity associated with the right Remote UE Uu Radio Bearer of a Remote UE.

For L2 UE-to-Network Relay, for downlink
  The Uu adaptation layer can be used to support DL bearer mapping at gNB to map end-to-end Radio Bearer (SRB, DRB) of Remote UE into Uu RLC channel over Relay UE Uu path. The Uu adaptation layer can be used to support DL N:1 bearer mapping and data multiplexing between multiple end-to-end Radio Bearers (SRBs, DRBs) of a Remote UE and/or different Remote UEs and one Uu RLC channel over the Relay UE Uu path.
  The Uu adaptation layer needs to support Remote UE identification for Downlink traffic. The identity information of Remote UE Uu Radio Bearer and the identity information of Remote UE needs be put into the Uu adaptation layer by gNB at DL in order for Relay UE to map the received data packets from Remote UE Uu Radio Bearer to its associated PC5 RLC channel.

[ . . . ]

4.5.5 Control Plane Procedure
Editor note: Service continuity related CP procedure is captured in 4.5.4.
4.5.5.1 Connection Management Remote UE needs to establish its own PDU sessions/DRBs with the network before user plane data transmission.

PC5-RRC aspects of Rel-16 NR V2X PC5 unicast link establishment procedures can be reused to setup a secure unicast link between Remote UE and Relay UE for L2 UE-to-Network relaying before Remote UE establishes a Uu RRC connection with the network via Relay UE.

For both in-coverage and out-of-coverage cases, when the Remote UE initiates the first RRC message for its connection establishment with gNB, the PC5 L2 configuration for the transmission between the Remote UE and the UE-to-Network Relay UE can be based on the RLC/MAC configuration defined in specifications.

The establishment of Uu SRB1/SRB2 and DRB of the Remote UE is subject to legacy Uu configuration procedures for L2 UE-to-Network Relay.

Figure 18:
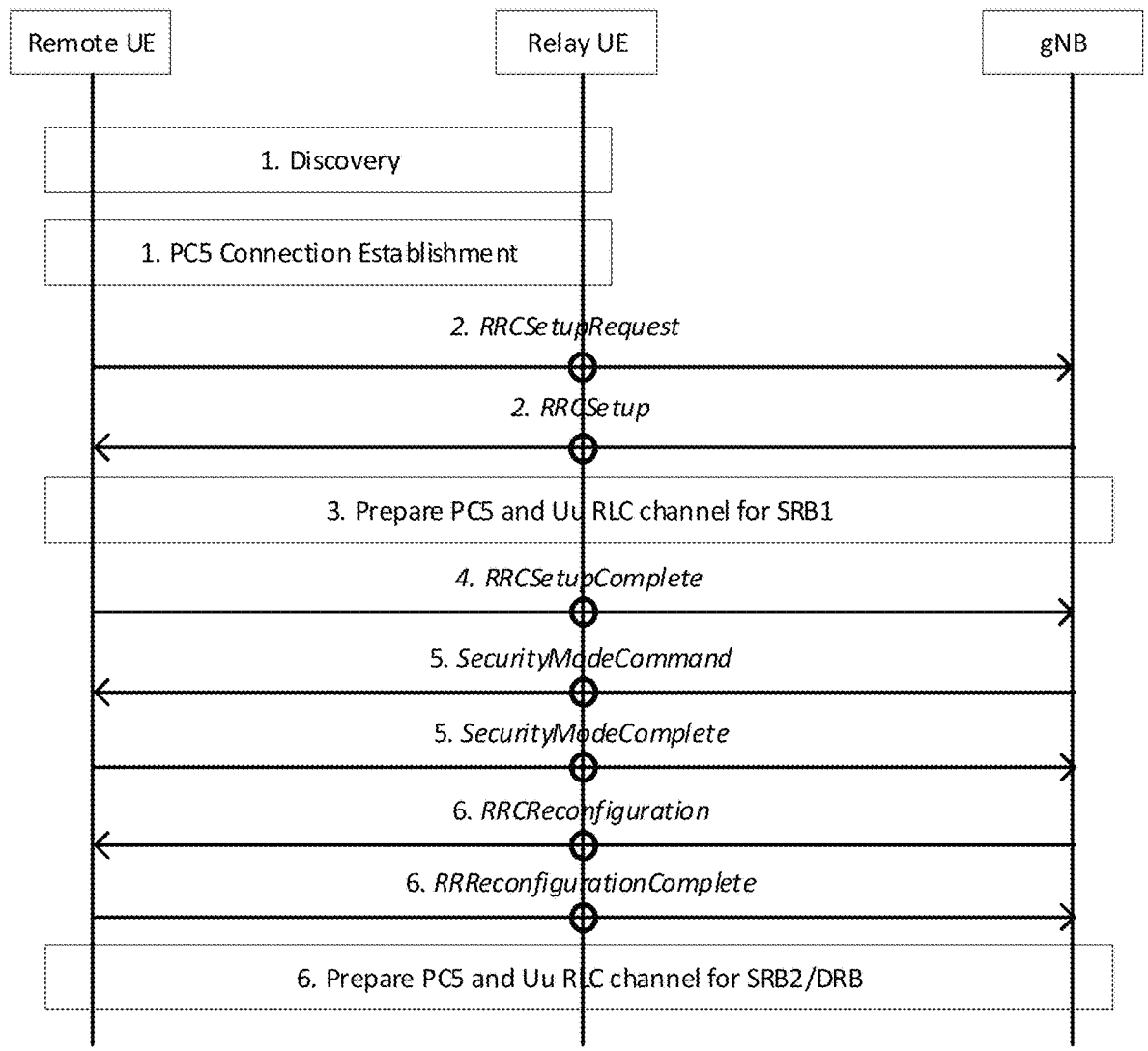
FIG. 18 is a reproduction of FIG. 4.5.5.1-1 of 3GPP TR 38.836 V1.0.0.

The following high level connection establishment procedure applies to L2 UE-to-Network Relay:

FIG. 4.5.5.1-1 of 3GPP TR 38.836 V0.2.0, Entitled "Procedure for Remote UE Connection Establishment", is Reproduced as FIG. 18]

Step 1. The Remote and Relay UE perform discovery procedure, and establish PC5-RRC connection using the legacy Rel-16 procedure as a baseline.

Step 2. The Remote UE sends the first RRC message (i.e., RRCSetupRequest) for its connection establishment with gNB via the Relay UE, using a default L2 configuration on PC5. The gNB responds with an RRCSetup message to Remote UE. The RRCSetup delivery to the Remote UE uses the default configuration on PC5. If the relay UE had not started in RRC_CONNECTED, it would need to do its own connection establishment as part of this step. The details for Relay UE to forward the RRCSetupRequest/RRCSetup message for Remote UE at this step can be discussed in WI phase.

Step 3. The gNB and Relay UE perform relaying channel setup procedure over Uu. According to the configuration from gNB, the Relay/Remote UE establishes an RLC channel for relaying of SRB1 towards the Remote UE over PC5. This step prepares the relaying channel for SRB1. Step 4. Remote UE SRB1 message (e.g. an RRCSetupComplete message) is sent to the gNB via the Relay UE using SRB1 relaying channel over PC5. Then the Remote UE is RRC connected over Uu.

Step 5. The Remote UE and gNB establish security following legacy procedure and the security messages are forwarded through the Relay UE.

Step 6. The gNB sets up additional RLC channels between the gNB and Relay UE for traffic relaying. According to the configuration from gNB, the Relay/Remote UE sets up additional RLC channels between the Remote UE and Relay UE for traffic relaying. The gNB sends an RRCReconfiguration to the Remote UE via the Relay UE, to set up the relaying SRB2/DRBs. The Remote UE sends an RRCReconfigurationComplete to the gNB via the Relay UE as a response. Besides the connection establishment procedure, for L2 UE-to-Network relay,

- The RRC reconfiguration and RRC connection release procedures can reuse the legacy RRC procedure, with the message content/configuration design left to WI phase.
- The RRC connection re-establishment and RRC connection resume procedures can reuse the legacy RRC procedure as baseline, by considering the above connection establishment procedure of L2 UE-to-Network Relay to handle the relay specific part, with the message content/configuration design left to WI phase.

3GPP TS 23.287 introduced the following:

6.3.3 Unicast Mode V2X Communication Over PC5 Reference Point 6.3.3.1 Layer-2 Link Establishment Over PC5 Reference Point To perform unicast mode of V2X communication over PC5 reference point, the UE is configured with the related information as described in clause 5.1.2.1.

FIG. 6.3.3.1-1 shows the layer-2 link establishment procedure for unicast mode of V2X communication over PC5 reference point.

Figure 19:
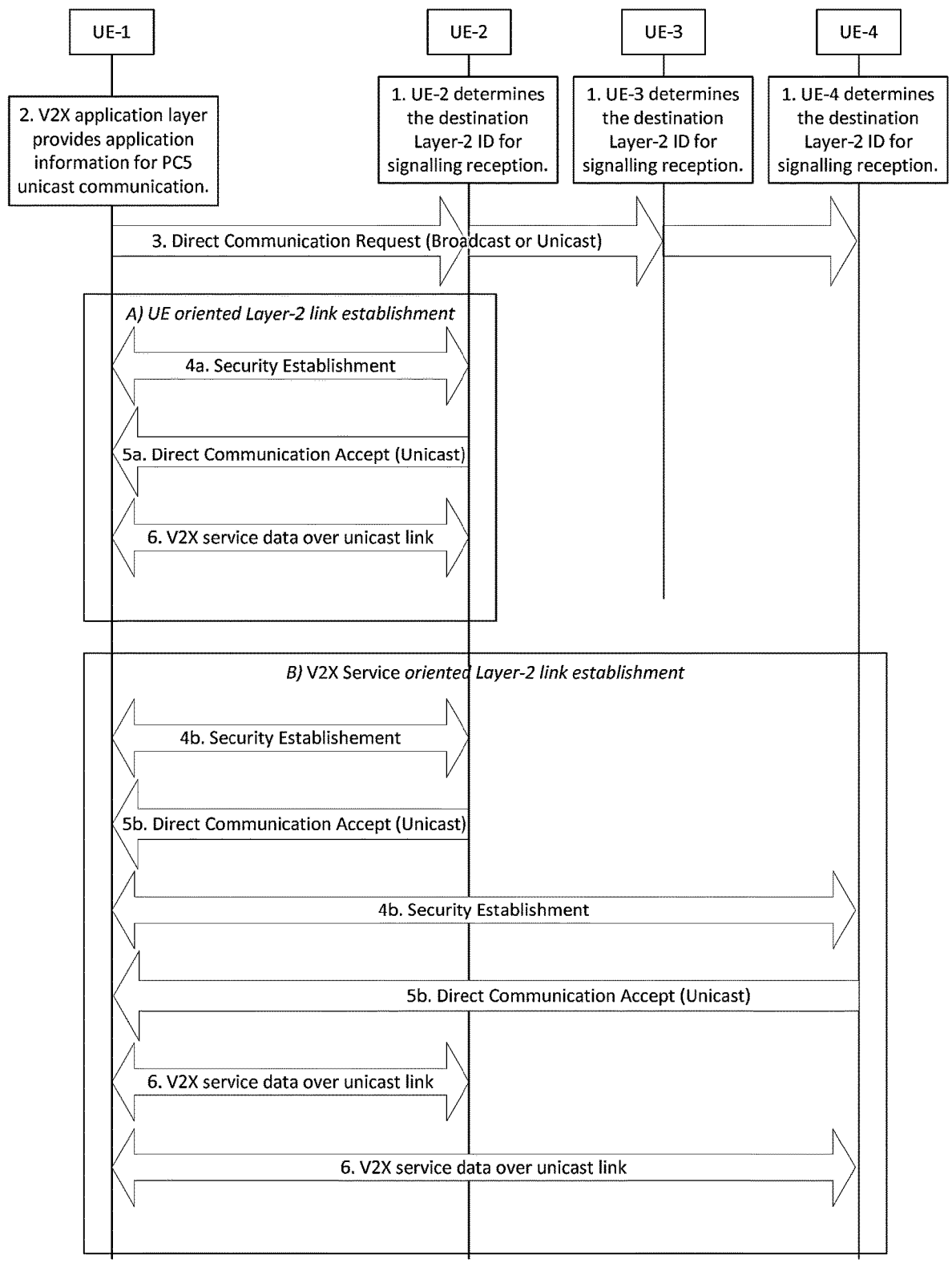
FIG. 19 is a reproduction of FIG. 6.3.3.1-1 of 3GPP TS 23.287 V16.4.0.

FIG. 6.3.3.1-1 of 3GPP TS 23.287 V16.4.0, Entitled "Layer-2 Link Establishment Procedure", is Reproduced as FIG. 19

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the V2X service type(s) and the initiating UE's Application Layer ID. The target UE's Application Layer ID may be included in the application information.
   - The V2X application layer in UE-1 may provide V2X Application Requirements for this unicast communication. UE-1 determines the PC5 QoS parameters and PFI as specified in clause 5.4.1.4.
   - If UE-1 decides to reuse the existing PC5 unicast link as specified in clause 5.2.1.4, the UE triggers Layer-2 link modification procedure as specified in clause 6.3.3.4.
3. UE-1 sends a Direct Communication Request message to initiate the unicast layer-2 link establishment procedure. The Direct Communication Request message includes:
   - Source User Info: the initiating UE's Application Layer ID (i.e. UE-1's Application Layer ID).
   - If the V2X application layer provided the target UE's Application Layer ID in step 2, the following information is included:
     - Target User Info: the target UE's Application Layer ID (i.e. UE-2's Application Layer ID).
   - V2X Service Info: the information about V2X service type(s) requesting Layer-2 link establishment.
   - Security Information: the information for the establishment of security.
   - NOTE 1: The Security Information and the necessary protection of the Source User Info and Target User Info are defined in TS 33.536 [26].
   - The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.
   - UE-1 sends the Direct Communication Request message via PC5 broadcast or unicast using the source Layer-2 ID and the destination Layer-2 ID.
4. Security with UE-1 is established as below:
   4a. If the Target User Info is included in the Direct Communication Request message, the target UE, i.e. UE-2, responds by establishing the security with UE-1.
   4b. If the Target User Info is not included in the Direct Communication Request message, the UEs that are interested in using the announced V2X service type(s) over a PC5 unicast link with UE-1 responds by establishing the security with UE-1.
   - NOTE 2: The signalling for the Security Procedure is defined in TS 33.536 [26].
   - When the security protection is enabled, UE-1 sends the following information to the target UE:
     - If IP communication is used:
       - IP Address Configuration: For IP communication, IP address configuration is required for this link and indicates one of the following values:
         - "IPv6 Router" if IPv6 address allocation mechanism is supported by the initiating UE, i.e., acting as an IPv6 Router; or
         - "IPv6 address allocation not supported" if IPv6 address allocation mechanism is not supported by the initiating UE.
       - Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".
     - QoS Info: the information about PC5 QoS Flow(s) to be added. For each PC5 QoS Flow, the PFI, the corresponding PC5 QoS parameters (i.e. PQI and conditionally other parameters such as MFBR/GFBR, etc.) and the associated V2X service type(s).
   - The source Layer-2 ID used for the security establishment procedure is determined as specified in clauses 5.6.1.1 and 5.6.1.4. The destination Layer-2 ID is set to the source Layer-2 ID of the received Direct Communication Request message.
   - Upon receiving the security establishment procedure messages, UE-1 obtains the peer UE's Layer-2 ID for future communication, for signalling and data traffic for this unicast link.
5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (V2X Service oriented Layer-2 link establishment) If the Target User Info is not included in the Direct Communication Request message, the UEs that are interested in using the announced V2X Service(s) respond to the request by sending a Direct Communication Accept message (UE-2 and UE-4 in FIG. 6.3.3.1-1).

The Direct Communication Accept message includes:

Source User Info: Application Layer ID of the UE sending the Direct Communication Accept message.

QoS Info: the information about PC5 QoS Flow(s) requested by UE-1. For each PC5 QoS Flow, the PFI, the corresponding PC5 QoS parameters (i.e. PQI and conditionally other parameters such as MFBR/GFBR, etc.) and the associated V2X service type(s).

If IP communication is used:

IP Address Configuration: For IP communication, IP address configuration is required for this link and indicates one of the following values:

"IPv6 Router" if IPv6 address allocation mechanism is supported by the target UE, i.e., acting as an IPv6 Router; or "IPv6 address allocation not supported" if IPv6 address allocation mechanism is not supported by the target UE.

Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.

If both UEs (i.e. the initiating UE and the target UE) selected to use link-local IPv6 address, they shall disable the duplicate address detection defined in RFC 4862 [21].

NOTE 3: When either the initiating UE or the target UE indicates the support of IPv6 router, corresponding address configuration procedure would be carried out after the establishment of the layer 2 link, and the link-local IPv6 addresses are ignored.

The V2X layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID) and the corresponding PC5 QoS parameters. This enables the AS layer to maintain the PC5 Link Identifier together with the PC5 unicast link related information.

6. V2X service data is transmitted over the established unicast link as below:

The PC5 Link Identifier, and PFI are provided to the AS layer, together with the V2X service data.

Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer. UE-1 sends the V2X service data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the V2X service data to UE-1 over the unicast link with UE-1.

According to 3GPP TR 23.752, UE-to-Network Relay communication is studied for UE to access network via indirect network communication. Basically, Rel-16 5G architectural design (e.g. flow-based Quality of Service (QoS) communication over PC5/Uu interface) could be taken into consideration. In the scenario of UE-to-Network relay communication, a remote UE would access the network (e.g. 5GC) via a relay UE where the remote UE would be in out-of-coverage while the relay UE would be in-coverage. The remote UE would communicate with the relay UE via PC5 interface (or called sidelink interface) for accessing the network, while the relay UE would communicate with a base station (e.g. gNB) via Uu interface for forwarding traffic between the remote UE and the network.

Figure 20:
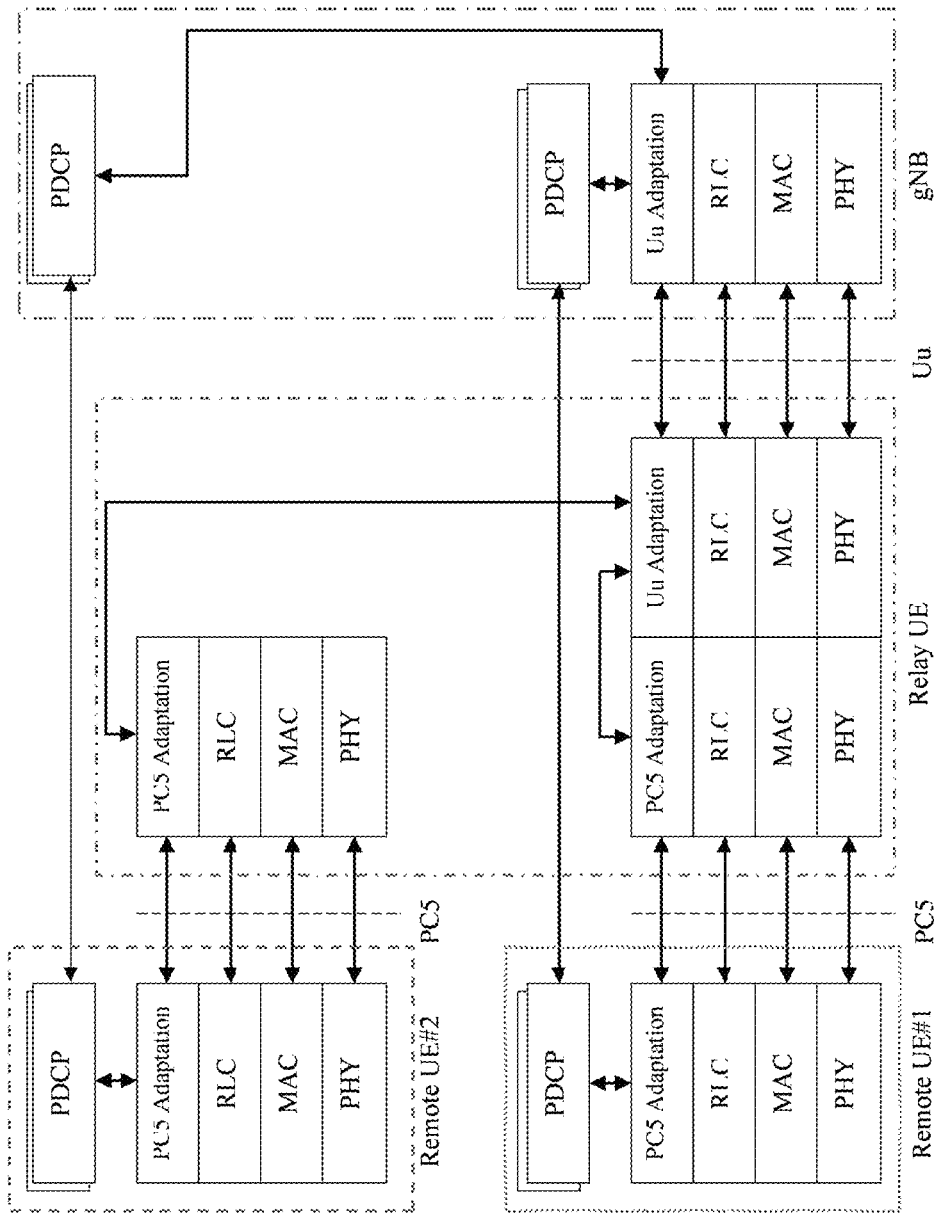
FIG. 20 illustrates an example of protocol stacks for Layer-2 UE-to-Network Relay according to one exemplary embodiment.

According to 3GPP TR 38.836, an adaptation Layer could be introduced for supporting sidelink relay communication. For Layer-2 (L2) UE-to-Network Relay, the adaptation layer could be placed over Radio Link Channel (RLC) sublayer for both CP and UP at the Uu interface between Relay UE and gNB. The Uu Service Data Adaptation Protocol (SDAP)/Packet Data Convergence Protocol (PDCP) and Radio Resource Control (RRC) are terminated between Remote UE and gNB, while RLC, Medium Access Control (MAC) and Physical (PHY) are terminated in each link (i.e. the link between Remote UE and UE-to-Network Relay UE and the link between UE-to-Network Relay UE and the gNB). It could be illustrated in FIG. 20.

On the other hand, according to 3GPP TR 38.836, the Uu adaptation layer will be also supported for Uu Signal Radio Bearers (SRBs) (including e.g. Uu SRB0, Uu SRB1, Uu SRB2, and/or etc.). However, whether the PC5 adaptation layer would be also supported for the Uu SRBs is not clear. It is supposed that the PC5 adaptation layer is also supported for the Uu SRBs.

Figure 21:
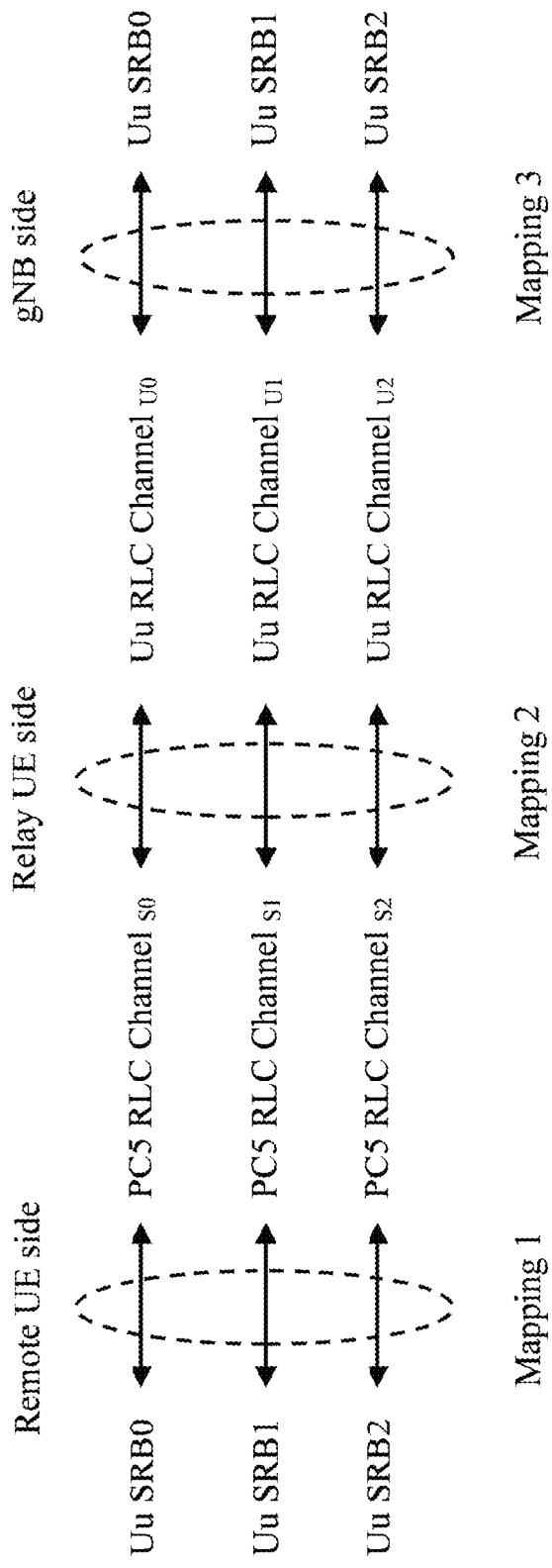
FIG. 21 illustrates an example of association between Uu SRBs, PC5 RLC channels, and Uu RLC channels according to one exemplary embodiment.

FIG. 21 illustrates an example of association between Uu SRBs, PC5 RLC channels and Uu RLC channels according to one embodiment. In FIG. 21, each Uu SRB could be associated with one PC5 RLC channel (i.e. as the mapping 1 shown in FIG. 21), and each PC5 RLC channel could be associated with one Uu RLC channel (i.e. as the mapping 2 shown in FIG. 21). Thus, each Uu RLC channel will be associated with one Uu SRB (i.e. as the mapping 3 shown in FIG. 21). With the mapping information, gNB can know a RRC message received from the Relay UE is sent on which Uu SRB based on which Uu RLC channel on which this RRC message is received. Similarly, the Relay UE could know a RRC message received from gNB is to be sent on which PC5 RLC channel based on which Uu RLC channel on which this RRC message is received. Similarly, the Remote UE could know a RRC message received from the Relay UE is sent on which Uu SRB based on which PC5 RLC channel on which this RRC message is received. Possibly, the associations or the mappings between PC5 RLC channel, Uu RLC channel and Uu SRB could be pre-defined or pre-configured in UE.

If each Uu RLC channel could be associated with one Remote UE, gNB and the Relay UE could further know a RRC message is sent on which Uu SRB of which Remote UE. With the mapping information, gNB could know a RRC message received from the Relay UE is sent on which Uu SRB and is associated with which Remote UE based on association between a Remote UE and a Uu RLC channel and association between a Uu SRB and the Uu RLC channel on which this RRC message is received. Similarly, the Relay UE can know a RRC message received from gNB is to be sent on which PC5 RLC channel of which Remote UE based on association between a Remote UE and a Uu RLC channel and association between a PC5 RLC channel and the Uu RLC channel on which this RRC message is received.

According to 3GPP TR 38.836, both Remote UE and Relay UE could be in RRC_INACTIVE state. Relay UE could enter RRC_INACTIVE (from RRC_CONNECTED) if all Remote UE connected to or served by this Relay UE is not in RRC_CONNECTED. Relay UE entering RRC_INACTIVE could be based on a mean of receiving RRCRelease message from gNB.

In case Remote UE needs to enter RRC_CONNECTED, Remote UE could send a RRCResumeRequest message on Remote UE's Uu SRB0. Remote UE could send the RRCResumeRequest message to Relay UE on the PC5 RLC channel associated with the Remote UE's Uu SRB0. Upon reception of a Common Control Channel (CCCH) Service Data Unit (SDU) (including the RRCResumeRequest) or the RRCResumeRequest on the PC5 RLC channel corresponding to the Remote UE's Uu SRB0, Relay UE could then initiate a Random Access (RA) procedure with gNB. In the RA procedure, Relay UE could send the Remote UE's RRCResumeRequest to gNB in Msg3, and receive Remote UE's RRCResume from gNB in Msg4. Relay UE could then send the Remote UE's RRCResume to Remote UE on the PC5 RLC channel associated with the Remote UE's Uu SRB1.

Figure 23:
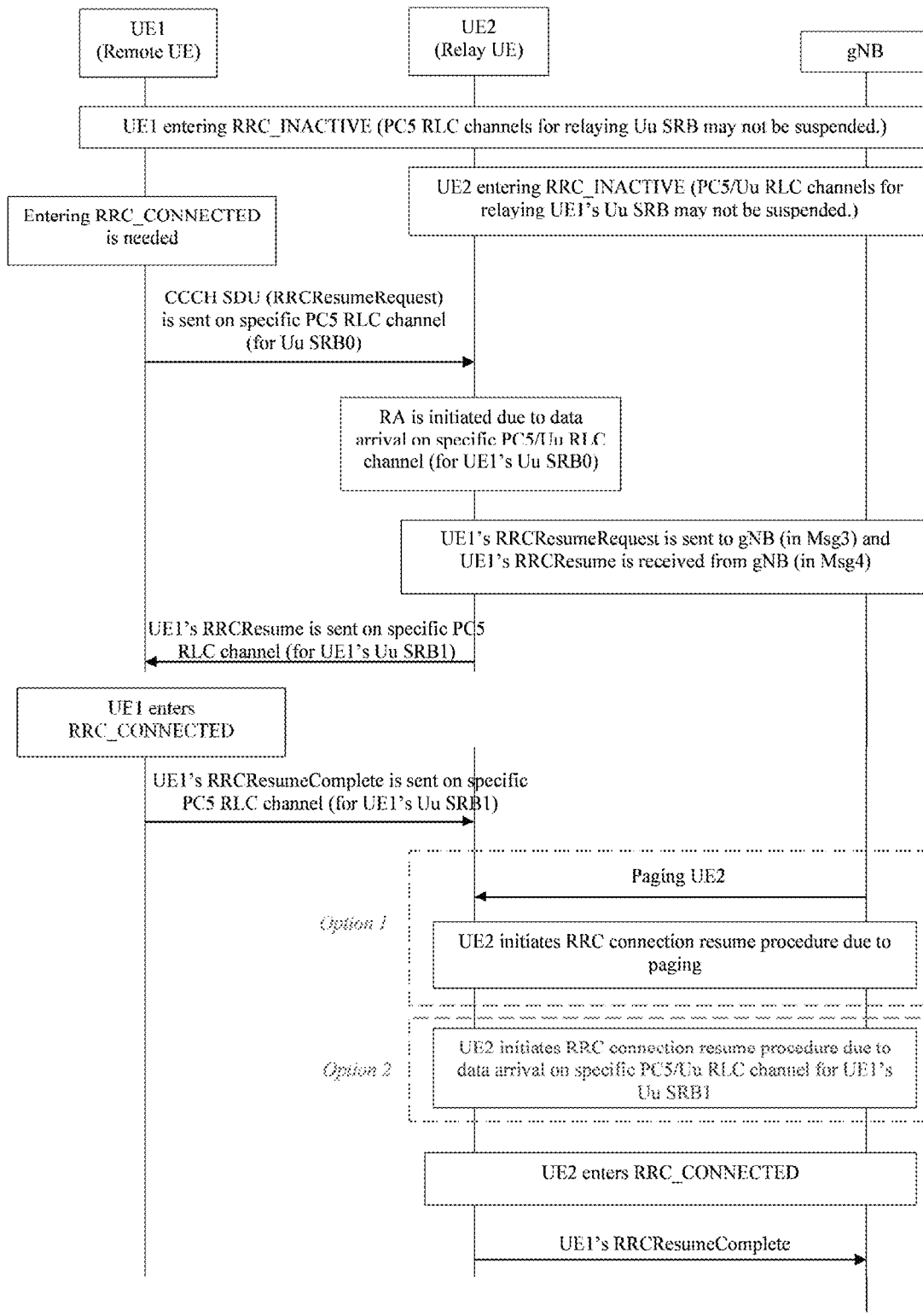
FIG. 23 illustrates an exemplary flow chart for a Relay UE to perform RA procedure for entering RRC_CONNECTED in response to a Remote UE entering RRC_CONNECTED according to one exemplary embodiment.

As introduced in 3GPP TS 38.331, Remote UE could receive the RRCResume and then enter RRC_CONNECTED. Remote UE could then send a RRCResumeComplete to Relay UE on the PC5 RLC channel associated with the Remote UE's Uu SRB1. Since Remote UE enters RRC_CONNECTED, Relay UE may need to enter RRC_CONNECTED for relaying traffic for Remote UE. Possibly, gNB could send a paging to Relay UE. In response to reception of the paging for Relay UE, Relay UE could initiate RRC connection resume procedure via a random access procedure with gNB. This concept could be illustrated in Option 1 of FIG. 23, which shows an example of a flow chart for Relay UE to perform RA procedure for entering RRC_CONNECTED in response to Remote UE entering RRC_CONNECTED according to one embodiment.

However, since UE cannot perform two RA procedures simultaneously, it is possible that UE would abort the current ongoing RA procedure and then initiate another RA procedure based on UE implementation. If this is the case, it would be hard for gNB to trigger Relay UE to initiate a second RA procedure for Relay UE entering RRC_CONNECTED via paging since gNB could not know if a first RA procedure for Remote UE entering RRC_CONNECTED had been completed successfully or not. Thus, an alternative for Relay UE to enter RRC_CONNECTED could be that Relay UE could perform or initiate a RRC connection resume procedure with gNB when/if/in case/after Relay UE receives sidelink packet(s) (including Remote UE's RRC signalling/message, e.g. RRCResumeComplete used for completion of resuming a RRC connection between Remote UE and gNB) on a PC5 RLC channel associated with Remote UE's Uu SRB1/2 (or Remote UE's Uu SRB on which Remote UE transmitting RRC signalling in RRC_CONNECTED) from Remote UE.

Or, Relay UE could perform/initiate the RRC connection resume procedure with gNB when/if/in case/after Relay UE has data (including Remote UE's RRC signalling/message, e.g. RRCResumeComplete used for completion of resuming the RRC connection between Remote UE and gNB) to be sent on a Uu RLC channel associated with Remote UE's Uu SRB1/2 (or Remote UE's Uu SRB on which Remote UE transmitting RRC signalling in RRC_CONNECTED) to gNB. This alternative could be feasible since RRC signalling sent on Uu SRB1/2 from UE to gNB implies UE is in RRC_CONNECTED. With this alternative, Relay UE could send a Relay UE's RRCResumeRequest on Relay UE's Uu SRB0 to gNB. Transmission of the Relay UE's RRCResumeRegeust or a CCCH SDU including the Relay UE's RRCResumeRegeust may trigger Relay UE to initiate a RA procedure with gNB.

Figure 22:
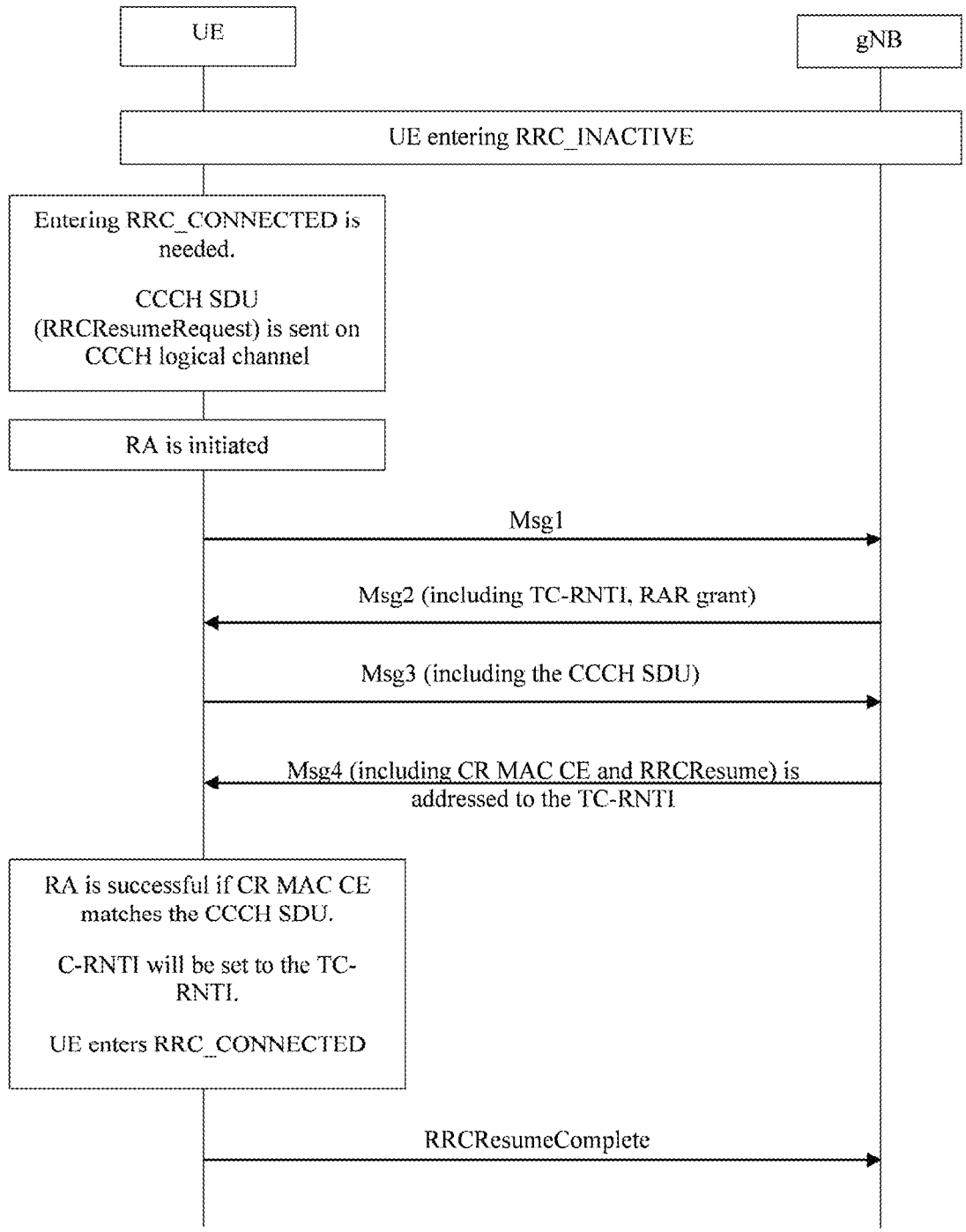
FIG. 22 illustrates an exemplary flow chart for a UE to perform RA procedure for RRC state transition based on 3GPP TS 38.321 and TS 38.331 according to one exemplary embodiment.

FIG. 22 illustrates an exemplary flow chart for a UE to perform RA procedure for RRC state transition based on TS38.321 and TS38.331 according to one embodiment. As illustrated in FIG. 22, Relay UE could receive Relay UE's RRCResume corresponding to the Relay UE's RRCResumeRequest from gNB (in Msg4), and could then transmit Relay UE's RRCResumeComplete corresponding to the Relay UE's RRCResume to gNB after the RA procedure is completed successfully. After Relay UE entering RRC_CONNECTED, Relay UE could then transmit the Remote UE's RRCResumeComplete to gNB on a Uu RLC channel associated with Remote UE's Uu SRB1. The above concept could be illustrated in Option 2 of FIG. 23.

It is also possible that Remote UE is in RRC_IDLE and Relay UE is in RRC_INACTIVE. Thus, Relay UE could perform or initiate a RRC connection resume procedure with gNB when/if/in case/after Relay UE receives sidelink packet(s) (including Remote UE's RRC signalling/message, e.g. RRCSetupComplete used for completion of establishing a RRC connection between Remote UE and gNB) on a PC5 RLC channel associated with Remote UE's Uu SRB1/2 (or Remote UE's Uu SRB on which Remote UE transmitting RRC signalling in RRC_CONNECTED) from Remote UE.

Or, Relay UE could perform/initiate the RRC connection resume procedure with gNB when/if/in case/after Relay UE has data (including Remote UE's RRC signalling/message, e.g. RRCSetupComplete used for completion of establishing the RRC connection between Remote UE and gNB) to be sent on a Uu RLC channel associated with Remote UE's Uu SRB1/2 (or Remote UE's Uu SRB on which Remote UE transmitting RRC signalling in RRC_CONNECTED) to gNB. In this alternative, Relay UE could send a Relay UE's RRCResumeRequest (on Relay UE's Uu SRB0) to gNB. Transmission of the Relay UE's RRCResumeRegeust or a CCCH SDU including the Relay UE's RRCResumeRegeust may trigger Relay UE to initiate a RA procedure with gNB. As illustrated in FIG. 22, Relay UE could receive Relay UE's RRCResume (on Relay UE's Uu SRB1) corresponding to the Relay UE's RRCResumeRequest from gNB (in Msg4), and could then transmit Relay UE's RRCResumeComplete (on Relay UE's Uu SRB1) corresponding to the Relay UE's RRCResume to gNB (after the RA procedure is completed successfully). After Relay UE entering RRC_CONNECTED, Relay UE could then transmit the Remote UE's RRCSetupComplete to gNB on a Uu RLC channel associated with Remote UE's Uu SRB1.

It is also possible that both Relay UE and Remote UE are in RRC_IDLE. Thus, Relay UE could perform/initiate a RRC connection establishment procedure with gNB when/if/in case/after Relay UE receives sidelink packet(s) (including Remote UE's RRC signalling/message, e.g. RRCSetupComplete used for completion of establishing a RRC connection between Remote UE and gNB) on a PC5 RLC channel associated with Remote UE's Uu SRB1/2 (or Remote UE's Uu SRB on which Remote UE transmitting RRC signalling in RRC_CONNECTED) from Remote UE.

Or, Relay UE could perform/initiate the RRC connection establishment procedure with gNB when/if/in case/after Relay UE has data (including Remote UE's RRC signalling/message, e.g. RRCSetupComplete used for completion of establishing the RRC connection between Remote UE and gNB) to be sent on a Uu RLC channel associated with Remote UE's Uu SRB1/2 (or Remote UE's Uu SRB on which Remote UE transmitting RRC signalling in RRC_CONNECTED) to gNB. In this alternative, Relay UE could send a Relay UE's RRCSetupRequest (on Relay UE's Uu SRB0) to gNB. Transmission of the Relay UE's RRCSetupRequest or a CCCH SDU including the Relay UE's RRCSetupRequest may trigger Relay UE to initiate a RA procedure with gNB. As illustrated in FIG. 22, Relay UE could receive Relay UE's RRCSetup (on Relay UE's Uu SRB0) corresponding to the Relay UE's RRCSetupRequest from gNB (in Msg4), and could then transmit Relay UE's RRCSetupComplete (on Relay UE's Uu SRB1) corresponding to the Relay UE's RRCSetup to gNB (after the RA procedure is completed successfully). After Relay UE entering RRC_CONNECTED, Relay UE could then transmit the Remote UE's RRCSetupComplete to gNB on a Uu RLC channel associated with Remote UE's Uu SRB1.

Figure 24:
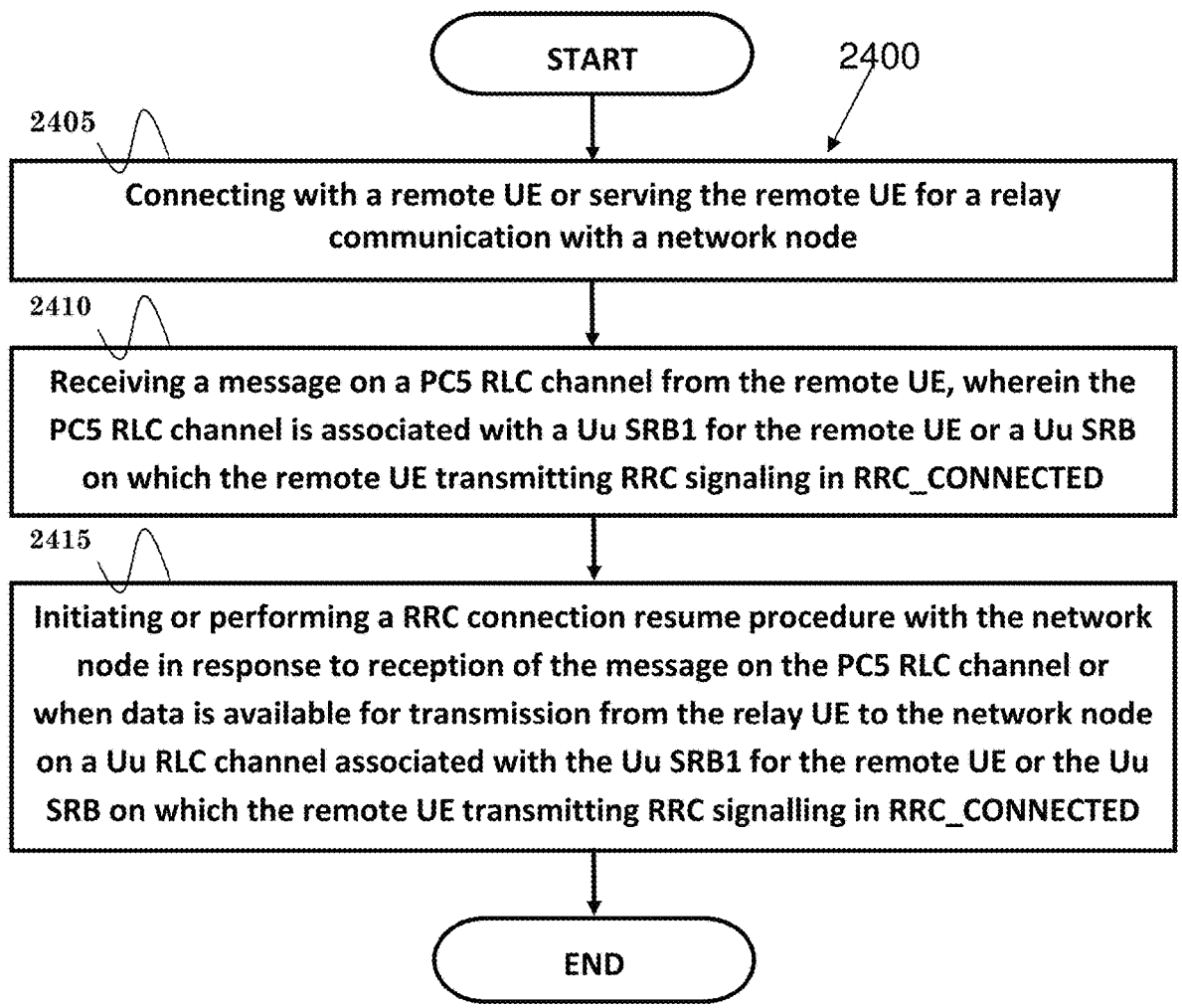
FIG. 24 is a flow chart according to one exemplary embodiment.

FIG. 24 is a flow chart 2400 illustrating a method for a relay UE. In step 2405, the relay UE connects with a remote UE or serving the remote UE for a relay communication with a network node. In step 2410, the relay UE receives a message on a PC5 RLC channel from the remote UE, wherein the PC5 RLC channel is associated with a Uu SRB1 for the remote UE or a Uu SRB on which the remote UE transmitting RRC signaling in RRC_CONNECTED. In step 2415, the relay UE initiates or performs a RRC connection resume procedure with the network node in response to reception of the message on the PC5 RLC channel or when data is available for transmission from the relay UE to the network node on a Uu RLC channel associated with the Uu SRB1 for the remote UE or the Uu SRB on which the remote UE transmitting RRC signalling in RRC_CONNECTED.

In one embodiment, the relay UE could transmit a first RRC message (e.g. RRCResumeRequest) to the network node in the RRC connection resume procedure, wherein the first RRC message is used for request of resuming a RRC connection between the relay UE and the network node. Furthermore, the relay UE could receive a second RRC message (e.g. RRCResume) from the network node in the RRC connection resume procedure, wherein the second RRC message is used for resuming the RRC connection between the relay UE and the network node. In addition, the relay UE could transmit a third RRC message (e.g. RRCResumeComplete) to the network node in the RRC connection resume procedure, wherein the third RRC message is used for completion of resuming the RRC connection between the relay UE and the network node.

In one embodiment, the remote UE could be in RRC_CONNECTED when transmitting the message to the relay UE. The relay UE could be in RRC_INACTIVE when receiving the message from the remote UE, and the relay UE could be in RRC_CONNECTED when transmitting the third RRC message to the network node.

In one embodiment, the network node could be a base station (e.g. gNB).

In one embodiment, the relay UE could receive a first PC5-S message for request of establishing a PC5-S connection from the remote UE. The first PC5-S message could be a Direct Communication Request message. Furthermore, the relay UE could transmit a second PC5-S message for acceptation of establishing the PC5-S connection to the remote UE. The second PC5-S message could be a Direct Communication Accept message.

In one embodiment, the message could be a RRC message (e.g. RRCSetupComplete) used for completing establishment of a RRC connection between the remote UE and the network node, or a RRC message (e.g. RRCResumeComplete) used for completing resume of a RRC connection between the remote UE and the network node.

In one embodiment, the relay UE could transmit the message on the Uu RLC channel to the network node. The data could include the message.

Referring back to FIGS. 3 and 4, in one exemplary embodiment of a method for a relay UE, the relay UE 300 includes a program code 312 stored in the memory 310. The CPU 308 could execute program code 312 to enable the relay UE (i) to connect with a remote UE or serving the remote UE for a relay communication with a network node, (ii) to receive a message on a PC5 RLC channel from the remote UE, wherein the PC5 RLC channel is associated with a Uu SRB1 for the remote UE or a Uu SRB on which the remote UE transmitting RRC signaling in RRC_CONNECTED, or (iii) to initiate or perform a RRC connection resume procedure with the network node in response to reception of the message on the PC5 RLC channel or when data is available for transmission from the relay UE to the network node on a Uu RLC channel associated with the Uu SRB1 for the remote UE or the Uu SRB on which the remote UE transmitting RRC signalling in RRC_CONNECTED. Furthermore, the CPU 308 can execute the program code 312 to perform all of the above-described actions and steps or others described herein.

Figure 25:
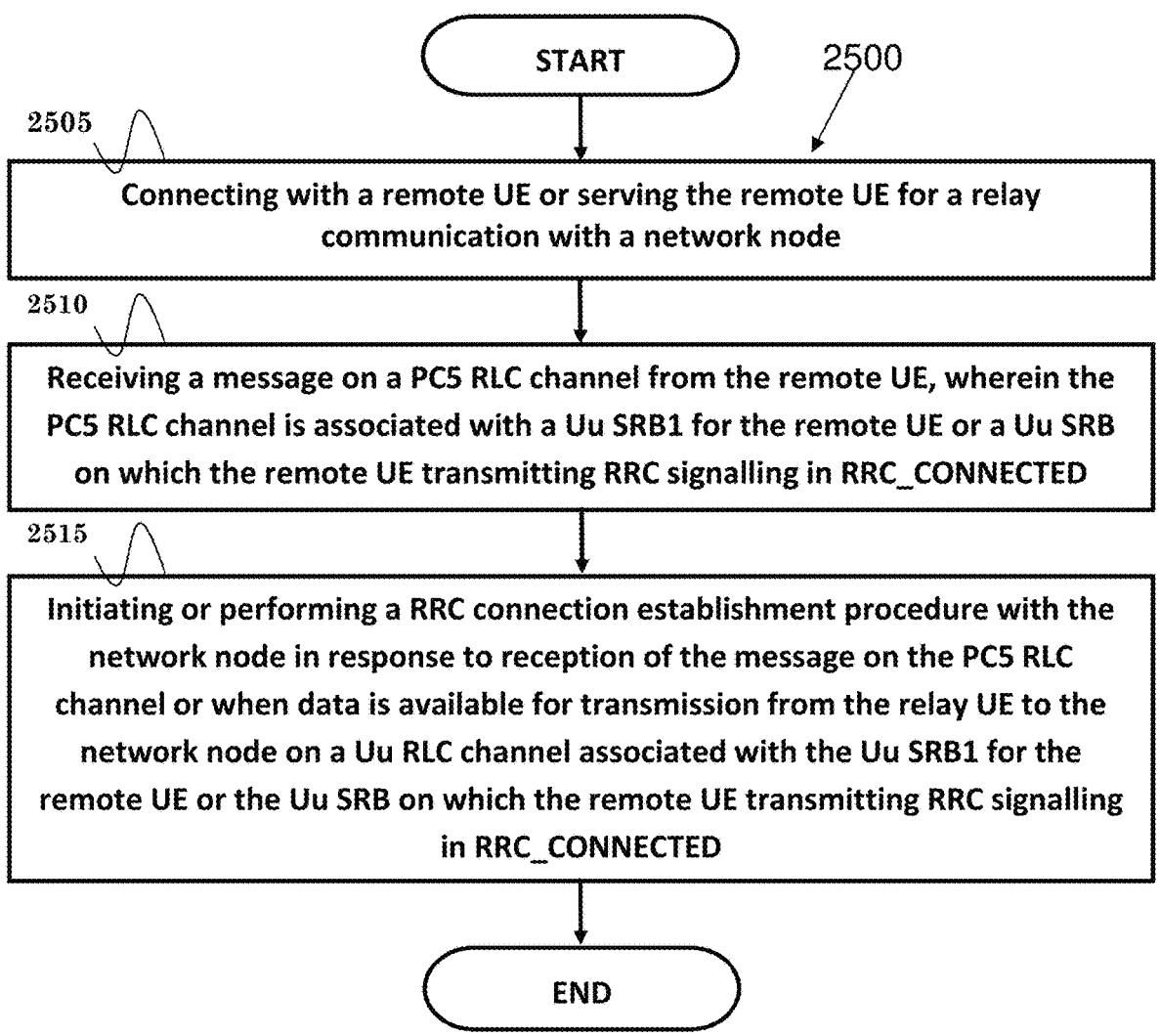
FIG. 25 is a flow chart according to one exemplary embodiment.

FIG. 25 is a flow chart 2500 illustrating a method for a relay UE. In step 2505, the relay UE connects with a remote UE or serving the remote UE for a relay communication with a network node. In step 2510, the relay UE receives a message on a PC5 RLC channel from the remote UE, wherein the PC5 RLC channel is associated with a Uu SRB1 for the remote UE or a Uu SRB on which the remote UE transmitting RRC signalling in RRC_CONNECTED. In step 2515, the relay UE initiates or performs a RRC connection establishment procedure with the network node in response to reception of the message on the PC5 RLC channel or when data is available for transmission from the relay UE to the network node on a Uu RLC channel associated with the Uu SRB1 for the remote UE or the Uu SRB on which the remote UE transmitting RRC signalling in RRC_CONNECTED.

In one embodiment, the relay UE could transmit a first RRC message (e.g. RRCSetupRequest) to the network node in the RRC connection establishment procedure, wherein the first RRC message is used for request of establishing a RRC connection between the relay UE and the network node. Furthermore, the relay UE could receive a second RRC message (e.g. RRCSetup) from the network node in the RRC connection establishment procedure, wherein the second RRC message is used for establishing the RRC connection. In addition, the relay UE could transmit a third RRC message (e.g. RRCSetupComplete) to the network node in the RRC connection establishment procedure, wherein the third RRC message is used for completion of establishing the RRC connection.

In one embodiment, the remote UE could be in RRC_CONNECTED when transmitting the message to the relay UE. Furthermore, the relay UE could be in RRC_IDLE when receiving the message from the remote UE. In addition, the relay UE could be in RRC_CONNECTED when transmitting the third RRC message to the network node.

In one embodiment, the network node could be a base station (e.g. gNB).

In one embodiment, the relay UE could receive a first PC5-S message for request of establishing a PC5-S connection from the remote UE. The first PC5-S message could be a Direct Communication Request message. The relay UE could transmit a second PC5-S message for acceptation of establishing the PC5-S connection to the remote UE. The second PC5-S message could be a Direct Communication Accept message.

In one embodiment, the message could be a RRC message (e.g. RRCSetupComplete) used for completing establishment of a RRC connection between the remote UE and the network node.

In one embodiment, the relay UE could transmit the message on the Uu RLC channel to the network node. The data could include the message.

Referring back to FIGS. 3 and 4, in one exemplary embodiment of a method for a relay UE, the relay UE 300 includes a program code 312 stored in the memory 310. The CPU 308 could execute program code 312 to enable the relay UE (i) to connect with a remote UE or serving the remote UE for a relay communication with a network node, (ii) to receive a message on a PC5 RLC channel from the remote UE, wherein the PC5 RLC channel is associated with a Uu SRB1 for the remote UE or a Uu SRB on which the remote UE transmitting RRC signalling in RRC_CONNECTED, and (iii) to initiate or perform a RRC connection establishment procedure with the network node in response to reception of the message on the PC5 RLC channel or when data is available for transmission from the relay UE to the network node on a Uu RLC channel associated with the Uu SRB1 for the remote UE or the Uu SRB on which the remote UE transmitting RRC signalling in RRC_CONNECTED. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences.

In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a relay User Equipment (UE), comprising:
   connecting with a remote UE or serving the remote UE for a relay communication with a network node;
   receiving a message on a PC5 Radio Link Control (RLC) channel from the remote UE, wherein the PC5 RLC channel is associated with a Uu SRB1 for the remote UE or a Uu Signalling Radio Bearer (SRB) on which the remote UE transmitting Radio Resource Control (RRC) signalling in RRC_CONNECTED;
   in response to reception of the message on the PC5 RLC channel or when data is available for transmission from the relay UE to the network node on a Uu RLC channel associated with the Uu SRB1 for the remote UE or the Uu SRB on which the remote UE transmitting RRC signalling in RRC CONNECTED, initiating or performing a RRC connection resume procedure with the network node; and
   at least one of:
     transmitting a first RRC message to the network node in the RRC connection resume procedure, wherein the first RRC message is used for request of resuming a RRC connection between the relay UE and the network node;
     receiving a second RRC message from the network node in the RRC connection resume procedure, wherein the second RRC message is used for resuming the RRC connection between the relay UE and the network node; or
     transmitting a third RRC message to the network node in the RRC connection resume procedure, wherein the third RRC message is used for completion of resuming the RRC connection between the relay UE and the network node.

2. The method of claim 1, wherein the remote UE is in RRC_CONNECTED when transmitting the message to the relay UE.

3. The method of claim 1, wherein the relay UE is in RRC_INACTIVE when receiving the message from the remote UE, and the relay UE is in RRC_CONNECTED when transmitting the third RRC message to the network node.

4. The method of claim 1, wherein the network node is a base station.

5. The method of claim 1, wherein at least one of the relay UE is in RRC_INACTIVE when receiving the message from the remote UE, or the relay UE is in RRC_CONNECTED when transmitting the third RRC message to the network node.

6. A relay User Equipment (UE), comprising:
   a control circuit;
   a processor installed in the control circuit; and
   a memory installed in the control circuit and operatively coupled to the processor;
   wherein the processor is configured to execute a program code stored in the memory to:
     connect with a remote UE or serving the remote UE for a relay communication with a network node;
     receive a message on a PC5 Radio Link Control (RLC) channel from the remote UE, wherein the PC5 RLC channel is associated with a Uu SRB1 for the remote UE or a Uu Signalling Radio Bearer (SRB) on which the remote UE transmitting Radio Resource Control (RRC) signalling in RRC_CONNECTED;
     in response to reception of the message on the PC5 RLC channel or when data is available for transmission from the relay UE to the network node on a Uu RLC channel associated with the Uu SRB1 for the remote UE or the Uu SRB on which the remote UE transmitting RRC signalling in RRC CONNECTED, initiate or perform a RRC connection resume procedure with the network node; and
     at least one of:
       transmit a first RRC message to the network node in the RRC connection resume procedure, wherein the first RRC message is used for request of resuming a RRC connection between the relay UE and the network node;
       receive a second RRC message from the network node in the RRC connection resume procedure, wherein the second RRC message is used for resuming the RRC connection between the relay UE and the network node; or
       transmit a third RRC message to the network node in the RRC connection resume procedure, wherein the third RRC message is used for completion of resuming the RRC connection between the relay UE and the network node.

7. The relay UE of claim 6, wherein the remote UE is in RRC_CONNECTED when transmitting the message to the relay UE.

8. The relay UE of claim 6, wherein the relay UE is in RRC_INACTIVE when receiving the message from the remote UE, and the relay UE is in RRC_CONNECTED when transmitting the third RRC message to the network node.

9. The relay UE of claim 6, wherein the network node is a base station.

10. The relay UE of claim 6, wherein at least one of the relay UE is in RRC_INACTIVE when receiving the message from the remote UE, or the relay UE is in RRC_CONNECTED when transmitting the third RRC message to the network node.

11. A method for a relay User Equipment (UE), comprising:

connecting with a remote UE or serving the remote UE for a relay communication with a network node;

receiving a message on a PC5 Radio Link Control (RLC) channel from the remote UE, wherein the PC5 RLC channel is associated with a Uu SRB1 for the remote UE or a Uu Signalling Radio Bearer (SRB) on which the remote UE transmitting Radio Resource Control (RRC) signalling in RRC_CONNECTED;

in response to reception of the message on the PC5 RLC channel or when data is available for transmission from the relay UE to the network node on a Uu RLC channel associated with the Uu SRB1 for the remote UE or the Uu SRB on which the remote UE transmitting RRC signalling in RRC_CONNECTED, initiating or performing a RRC connection establishment procedure with the network node; and at least one of:
transmitting a first RRC message to the network node in the RRC connection establishment procedure, wherein the first RRC message is used for request of establishing a RRC connection between the relay UE and the network node;
receiving a second RRC message from the network node in the RRC connection establishment procedure, wherein the second RRC message is used for establishing the RRC connection; or
transmitting a third RRC message to the network node in the RRC connection establishment procedure, wherein the third RRC message is used for completion of establishing the RRC connection.

12. The method of claim 11, wherein the remote UE is in RRC_CONNECTED when transmitting the message to the relay UE.

13. The method of claim 11, wherein the relay UE is in RRC_IDLE when receiving the message from the remote UE, and the relay UE is in RRC_CONNECTED when transmitting the third RRC message to the network node.

14. The method of claim 11, wherein the network node is a base station.

15. The method of claim 11, wherein at least one of the relay UE is in RRC_IDLE when receiving the message from the remote UE, or the relay UE is in RRC_CONNECTED when transmitting the third RRC message to the network node.

16. A relay User Equipment (UE), comprising:
a control circuit;
a processor installed in the control circuit; and
a memory installed in the control circuit and operatively coupled to the processor;
wherein the processor is configured to execute a program code stored in the memory to:
connect with a remote UE or serving the remote UE for a relay communication with a network node;
receive a message on a PC5 Radio Link Control (RLC) channel from the remote UE, wherein the PC5 RLC channel is associated with a Uu SRB1 for the remote UE or a Uu Signalling Radio Bearer (SRB) on which the remote UE transmitting Radio Resource Control (RRC) signalling in RRC_CONNECTED;
in response to reception of the message on the PC5 RLC channel or when data is available for transmission from the relay UE to the network node on a Uu RLC channel associated with the Uu SRB1 for the remote UE or the Uu SRB on which the remote UE transmitting RRC signalling in RRC_CONNECTED, initiate or perform a RRC connection establishment procedure with the network node; and
at least one of:
transmit a first RRC message to the network node in the RRC connection establishment procedure, wherein the first RRC message is used for request of establishing a RRC connection between the relay UE and the network node;
receive a second RRC message from the network node in the RRC connection establishment procedure, wherein the second RRC message is used for establishing the RRC connection; or
transmit a third RRC message to the network node in the RRC connection establishment procedure, wherein the third RRC message is used for completion of establishing the RRC connection.

17. The relay UE of claim 16, wherein the remote UE is in RRC_CONNECTED when transmitting the message to the relay UE.

18. The relay UE of claim 16, wherein the relay UE is in RRC_IDLE when receiving the message from the remote UE, and the relay UE is in RRC_CONNECTED when transmitting the third RRC message to the network node.

19. The relay UE of claim 16, wherein the network node is a base station.

20. The relay UE of claim 16, wherein at least one of the relay UE is in RRC_IDLE when receiving the message from the remote UE, or the relay UE is in RRC_CONNECTED when transmitting the third RRC message to the network node.

* * * * *